(12) United States Patent
Yin et al.

(10) Patent No.: US 12,544,342 B2
(45) Date of Patent: Feb. 10, 2026

(54) PHARMACEUTICAL COMPOSITION CONTAINING TAXANE NANOAGGREGATES AND USE THEREOF

(71) Applicants: Fulgent Pharma, LLC, Temple City, CA (US); ANP Technologies, Inc., Newark, DE (US)

(72) Inventors: Ray Yin, El Monte, CA (US); Jing Pan, El Monte, CA (US); Yubei Zhang, El Monte, CA (US); Bingsen Zhou, El Monte, CA (US); Yun Yen, El Monte, CA (US); Li Wang, El Monte, CA (US); Lin Wang, El Monte, CA (US); Yilong Zhang, El Monte, CA (US); Ming Hseih, El Monte, CA (US)

(73) Assignee: Fulgent Genetics, Inc., El Monte, CA (US)

( * ) Notice: Subject to any disclaimer, the term of this patent is extended or adjusted under 35 U.S.C. 154(b) by 0 days.

(21) Appl. No.: 18/365,555

(22) Filed: Aug. 4, 2023

(65) Prior Publication Data
US 2024/0016754 A1 Jan. 18, 2024

Related U.S. Application Data

(63) Continuation of application No. PCT/US2022/016368, filed on Feb. 15, 2022.

(60) Provisional application No. 63/149,538, filed on Feb. 15, 2021.

(51) Int. Cl.
A61K 9/51 (2006.01)
A61K 31/337 (2006.01)
A61K 45/06 (2006.01)
A61P 35/00 (2006.01)
B82Y 5/00 (2011.01)

(52) U.S. Cl.
CPC .......... *A61K 9/5146* (2013.01); *A61K 31/337* (2013.01); *A61K 45/06* (2013.01); *A61P 35/00* (2018.01); *B82Y 5/00* (2013.01)

(58) Field of Classification Search
CPC ...... A61K 9/5146; A61K 31/337; A61P 35/00
See application file for complete search history.

(56) References Cited

U.S. PATENT DOCUMENTS

| | | | |
|---|---|---|---|
| 5,919,442 A | 7/1999 | Yin | |
| 6,177,414 B1 | 1/2001 | Tomalia | |
| 7,754,500 B2 | 7/2010 | Yin | |
| 2002/0013430 A1 | 1/2002 | Klaerner | |
| 2002/0041898 A1 | 4/2002 | Unger | |
| 2003/0187178 A1 | 10/2003 | Kohlstruk | |
| 2004/0009229 A1 | 1/2004 | Unger | |
| 2006/0041058 A1 | 2/2006 | Yin | |
| 2006/0051315 A1 | 3/2006 | Scaria | |
| 2006/0127350 A1 | 6/2006 | Heegaard | |
| 2007/0128118 A1* | 6/2007 | Yu | A61K 47/42 424/9.322 |
| 2008/0114077 A1 | 5/2008 | Yin | |
| 2011/0060036 A1 | 3/2011 | Nie | |
| 2014/0314664 A1* | 10/2014 | Qin | A61K 31/4375 424/9.1 |
| 2014/0328918 A1 | 11/2014 | Fetzer | |
| 2017/0119889 A1* | 5/2017 | Yu | A61K 31/4745 |
| 2018/0235884 A1 | 8/2018 | Qin | |
| 2018/0326081 A1 | 11/2018 | Owen | |
| 2019/0262460 A1 | 8/2019 | Shinde | |
| 2020/0113877 A1 | 4/2020 | Shinde | |
| 2020/0206356 A1 | 7/2020 | Alargova | |
| 2020/0289553 A1* | 9/2020 | Ervin | A61K 47/02 |

FOREIGN PATENT DOCUMENTS

WO 200149268 W 7/2001

OTHER PUBLICATIONS

Hanan Abumanhal-Masarweh et al., Sodium bicarbonate nanoparticles modulate the tumor pH and enhance the cellular uptake of doxorubicin, J of Controlled Release, 296, 1-13. (Year: 2019).*
Vijaya L Galic et al., Paclitaxel poliglumex for ovarian cancer, Expert Opinion on Investigational Drugs, 20, 813-821.*
L.Harivardhan Reddy et al., Drug delivery design for intravenous route with integrated physicochemistry, pharmacokinetics and pharmacodynamics: Illustration with the case of taxane therapeutics, Advanced Drug Delivery Reviews, 71, 34-57. (Year: 2014).*
L. Harivardhan Rdyye et al., Drug delivery design for intravenous toute with integrated physiochemistry, pharmacokenitics and pharmacodynamics: Ilustration with the case of taxane therapeutics, Advanced Drug Delivery Reviews, 71, 34-57. (Year: 2014).*
Vijaya L. Galic et al., Paclitaxel poliglumex for ovarian cancer, Expert Opinion on Investigational Drugs, 20, 813-821. (Year: 2011).*
N .Raghunandetal. Enhancement of chemotherapy by manipulation of tumour pH, British J Cancer, 80(7), 1005-1011. (Year: 1999).*

(Continued)

*Primary Examiner* — Michael G. Hartley
*Assistant Examiner* — Jagadishwar R Samala
(74) *Attorney, Agent, or Firm* — Greenberg Traurig, LLP

(57) ABSTRACT

This disclosure is directed to a pharmaceutical composition comprising sodium bicarbonate and a polymer-drug nanoaggregate having a polymer and a taxane. The polymer is water soluble and comprises at least one first terminal group modified with a hydrophobic moiety and a second terminal group modified with a hydrophilic moiety and can be a modified symmetrically or asymmetrically branched polymers. The taxane can include paclitaxel, docetaxel, cabazitaxel, larotaxel, milataxel, ortataxel, tesetaxel, derivatives therefrom or a combination thereof, which are water insoluble or poorly water soluble. Such polymer-drug nanoaggregates can improve drug solubility, stability, in vivo availability and efficacy, and reduce side effects such as renal toxicity. This invention is also directed to a process for producing the pharmaceutical composition comprising the polymer-drug nanoaggregate. This invention is further directed to a method for treating a disease including cancer using the pharmaceutical composition disclosed herein.

29 Claims, 21 Drawing Sheets

(56) References Cited

OTHER PUBLICATIONS

L.Harivardhan Reddy et al., Drug delivery design for intravenous route with integrated physiochemistry, pharmacokenitics and pharmacodynamics: Illustration with the case of taxane therapeutics, Advanced Drug Delivery Reviews, 71,34-57. (Year: 2014).*
ClinicalTrials.gov FID-007 in Treating Participants with Advanced Solid Tumors.
International Search Report issued Jun. 21, 2022 in International Application No. PCT/US22/16368.
Thomas, J. S., et al., "A phase 1 trial of FID-007, a novel nanoparticle paclitaxel formulation, in patients with solid tumors", Journal of Clinical Oncology 39, No. 15_suppl (May 20, 2021) 3021-3021.
Thomas, J., et al., "A Phase 1 Trial of FID-007, a Novel Nanoparticle Paclitaxel Formulation, in Patients with Solid Tumors" https://classic.clinicaltrials.gov/ct2/show/NCT03537690, 1 page, May 5, 2021.
Cheng, Y., et al., "New Insights into the Interactions between Dendrimers and Surfactants: 2. Design of New Drug Formulations Based on Dendrimer-Surfactant Aggregates" The Journal of Physical Chemistry B 2009, 113 (24) , 8339-8346.
D'Emanuele, A., et al., "Dendrimer-drug interactions" Adv Drug Deliv Rev. Dec. 14, 2005;57(15):2147-62. doi: 10.1016/j.addr.2005.09.012.
Gillies, E. R., et al., "pH-Responsive copolymer assemblies for controlled release of doxorubicin" Bioconjug Chem. Mar.-Apr. 2005;16(2):361-8. doi: 10.1021/bc049851c.
Guillerm, B., et al., "Novel Investigations on Kinetics and Polymerization Mechanism of Oxazolines Initiated by Iodine" Macromolecules, 43, 5964-5970, Jul. 2010, 10.1021/ma1009808.
Hoogenboom, R., "Poly(2-oxazoline)s: a polymer class with numerous potential applications" Angew Chem Int Ed Engl. 2009;48(43):7978-94. doi: 10.1002/anie.200901607.
Lee, S.C., et al., "Polymeric micelles of poly(2-ethyl-2-oxazoline)-block-poly(epsilon-caprolactone) copolymer as a carrier for paclitaxel" J Control Release. May 20, 2003;89(3):437-46. doi: 10.1016/s0168-3659(03)00162-7.
Microstructure Development in Particulate Compositions Coatings by Cryo-SEM 2007, ProQuest, p. 127.
Rapp RP, Bivins BA, "Final in-line filtration: removal of contaminants from IV fluids and drugs" Hosp Formul 1983; 18:1124-1128 Abstract only.
Tan, S., et al., "Aggregation of a hydrophobically modified poly(propylene imine) dendrimer" Eur Phys J E Soft Matter. Oct. 2008;27(2):205-11. doi: 10.1140/epje/i2008-10373-8.
Wolinsky, et al., "Therapeutic and diagnostic applications of dendrimers for cancer treatment" Adv Drug Deliv Rev. Jun. 10, 2008;60(9):1037-55. doi: 10.1016/j.addr.2008.02.012.

* cited by examiner

Dendrimers

Dendrigrafts

Regular Comb-branches

Star-branched

Polypropyleneimine Dendrimer-4

Polypropyleneimine Dendrimer-8

Random ABP　　　　　　　Regular ABP

Polymer and polymer-drug aggregates with the polymer concentration at 25 mg/mL in saline Polymer and Polymer-Drug Aggregates at 2.5 mg/mL in Saline

PHARMACEUTICAL COMPOSITION CONTAINING TAXANE NANOAGGREGATES AND USE THEREOF

CROSS REFERENCE

This application is a continuation of International Application No. PCT/US22/16368, filed Feb. 15, 2022, which claims the benefit of U.S. Provisional Application No. 63/149,538, filed Feb. 15, 2021 all of which are herein incorporated by reference in their entirety.

FIELD OF THE INVENTION

The present disclosure relates to an injectable pharmaceutical composition that can be used for cancer treatment in patients. The composition can comprise a nanoaggregate formed from a water-soluble polymer and a water insoluble bioactive agent, such as a taxane.

BACKGROUND

Synthetic polymers have been shown to have important applications in pharmaceutical formulations as an effective delivery vehicle or other types of excipient.

Symmetrically branched polymers (SBP), such as dendritic polymers including Starburst dendrimers (or Dense Star polymers) and Combburst dendrigrafts (or hyper comb-branched polymers), are some of the examples. Those polymers often possess: (a) a well-defined core molecule, (b) at least two concentric dendritic layers (generations) with symmetrical (equal length) branches and branch junctures and (c) exterior surface groups, such as, polyamidoamine (PAMAM)-based branched polymers and dendrimers described in U.S. Pat. Nos. 4,435,548; 4,507,466; 4,568,737; 4,587,329; 5,338,532; 5,527,524; and 5,714,166. Other examples include polyethyleneimine (PEI) dendrimers, such as those disclosed in U.S. Pat. No. 4,631,337; polypropyleneimine (PPI) dendrimers, such as those disclosed in U.S. Pat. Nos. 5,530,092; 5,610,268; and 5,698,662; Frechet-type polyether and polyester dendrimers, core shell tectodendrimers and others, as described, for example, in, "Dendritic Molecules," edited by Newkome et al., VCH Weinheim, 1996, "Dendrimers and Other Dendritic Polymers," edited by Frechet & Toroalia, John Wiley & Sons, Ltd., 2001; and U.S. Pat. No. 7,754,500.

Combburst dendrigrafts are constructed with a core molecule and concentric layers with symmetrical branches through a stepwise synthetic method. In contrast to dendrimers, Combburst dendrigrafts or polymers are generated with monodisperse linear polymeric building blocks (U.S. Pat. Nos. 5,773,527; 5,631,329 and 5,919,442). Moreover, the branch pattern is different from that of dendrimers. For example, Combburst dendrigrafts form branch junctures along the polymeric backbones (chain branches), while Starburst dendrimers often branch at the termini (terminal branches). Due to the living polymerization techniques used, the molecular weight distributions (Mw/Mn) of those polymers (core and branches) often are narrow. Thus, Combburst dendrigrafts produced through a graft-on-graft process are well defined with Mw/Mn ratios often approaching 1.

SBPs, such as dendrimers, are produced predominantly by repetitive protecting and deprotecting procedures through either a divergent or a convergent synthetic approach. Since dendrimers utilize small molecules as building blocks for the cores and the branches, the molecular weight distribution of the dendrimers often is defined. In the case of lower generations, a single molecular weight dendrimer often is obtained. While dendrimers often utilize small molecule monomers as building blocks, dendrigrafts use linear polymers as building blocks.

In addition to dendrimers and dendrigrafts, other SBPs can include symmetrical star-shaped or comb-shaped polymers, such as, symmetrical star-shaped or comb-shaped polyethyleneoxide (PEO), polyethyleneglycol (PEG), polyethyleneimine (PEI), polypropyleneimine (PPI), polyoxazoline (PDX), polymethyloxazoline (PMOX), polyethyloxazoline (PEOX), polystyrene, polymethylmethacrylate (PMMA), or polydimethylsiloxane.

Asymmetrically branched polymers (ABP) can have two different types: regular ABP and random ABP. Asymmetrically branched dendrimers or regular ABPs (reg-ABPs), often possess a core, controlled and well-defined asymmetrical (unequal length) branches and asymmetrical branch junctures as described in U.S. Pat. Nos. 4,289,872; 4,360,646; and 4,410,688. On the other hand, a random ABP (ran-ABP) possesses: a) no core, b) functional groups both at the exterior and in the interior, c) random/variable branch lengths and patterns (i.e., termini and chain branches), and d) unevenly distributed interior void spaces.

The synthesis and mechanisms of ran-ABPs, such as those made from PEI, were reported by Jones et al., J. Org. Chem. 9, 125 (1944), Jones et al., J. Org. Chem. 30, 1994 (1965) and Dick et al., J. Macromol. Sci. Chem., A4 (6), 1301-1314, (1970)). Ran-ABP, such as those made of PDX, poly(2-methyloxazoline) (PMOX) and poly(2-ethyloxazoline) (PEOX), was reported by Litt (J. Macromol. Sci. Chem. A9(5), 703-727 (1975)) and Warakomski (J. Polym. Sci. Polym. Chem. 28, 3551 (1990)). The synthesis of ran-ABP's often can involve a one-pot divergent or a one-pot convergent method.

A polymer can also be a homopolymer or a copolymer. A copolymer is a polymer, or a polymer backbone, polymerized from different monomers or different monomer repeating units. A homopolymer can relate to a polymer or a polymer backbone composed of the same repeat unit, that is, the homopolymer is generated from the same monomer. The monomer can be a simple compound or a complex or an assemblage of compounds where the assemblage or complex is the repeat unit in the homopolymer.

Taxane is derived from the Pacific Yew tree, *Taxus brevifolia* (Wan et al., J. Am. Chem. Soc. 93:2325, 1971). Different products of taxane, such as paclitaxel (for example, Taxol® sold by Bristol-Myers Squibb, under respective trademark) and docetaxel (also sold as Taxotere® by Sanofi-Aventis under respective trademark), are used to treat various cancers, including, breast, ovarian and lung cancers, as well as colon, and head and neck cancers. Other taxanes, such as cabazitaxel, larotaxel, milataxel, ortataxel and tesetaxel are being developed or trialed for use in cancer treatment. Taxanes, such as those mentioned above, are water insoluble and hampered the widespread use thereof. Currently, Taxol® and generics thereof are formulated using a 1:1 solution of ethanol:Cremaphor® (polyethyoxylated castor oil) to solubilize the drug. The presence of Cremaphor® has been linked to severe hypersensitivity reactions and consequently requires medication of patients with corticosteroids (e.g., dexamethasone) and antihistamines. Modified forms of taxane can be water soluble such as those modified with acid, ammonium, alkyls, or aryls. However, report on successful clinical use is limited.

Alternatively, conjugated paclitaxel, for example, Abraxane® (at least U.S. Pat. No. 7,820,788, sold by Celgene Corporation under respective trademark), which is produced by mixing paclitaxel with human serum albumin, has eliminated the need for corticosteroids and antihistamine injections. However, Abraxane® generates undesirable side effects, such as, severe cardiovascular events, including chest pain, cardiac arrest, supraventricular tachycardia, edema, thrombosis, pulmonary thromboembolism, pulmonary emboli, hypertension, etc., which prevents patients with high cardiovascular risk from using the drug.

Although branched polymers, including SBPs and ABPs, have been used for drug delivery, those attempts are focused primarily on the chemical attachment of the drug to the polymer, or physical encapsulation of such drugs in the interior through unimolecular encapsulation (such as those described in U.S. Pat. Nos. 5,773,527; 5,631,329; 5,919,442; and 6,716,450). For example, dendrimers and dendrigrafts are believed to physically entrap bioactive molecules using unimolecular encapsulation approaches, as described in U.S. Pat. Nos. 5,338,532; 5,527,524; and 5,714,166 for dense star polymers, and U.S. Pat. No. 5,919,442 for hyper comb-branched polymers. Similarly, the unimolecular encapsulation of various drugs using SBPs to form a "dendrimer box" was reported in Tomalia et al., Angew. Chem. Int. Ed. Engl., 1990, 29, 138, and in "Dendrimers and Other Dendritic Polymers", edited by Frechet & Tomalia, John Wiley & Sons, Ltd., 2001, pp. 387-424.

Branched core shell polymers with a hydrophobic core and a hydrophilic shell may be used to entrap a poorly water soluble drug through molecular encapsulation. Randomly branched and hyperbranched core shell structures with a hydrophilic core and a hydrophobic shell have also been used to carry a drug through unimolecular encapsulation and pre-formed nanomicelles (U.S. Pat. No. 6,716,450 and Liu et al., Biomaterials 2010, 10, 1334-1341). However, those unimolecular and pre-formed micelle structures are generated in the absence of a drug.

Block copolymers, such as, miktoarm polymers (i.e., Y shaped/AB2-type star polymers) and linear (A)-dendritic (B) block copolymers, were observed to form stereocomplexes with paclitaxel (Nederberg et al., Biomacromolecules 2009, 10, 1460-1468 and Luo et al., Bioconjugate Chem. 2010, 21, 1216). Those block copolymers closely resemble traditional lipid or AB-type linear block copolymers, which are well known surfactants used for the generation of micelles. However, such branched block copolymers are difficult to make and thus, are not suitable for mass production.

There is no description of modifying branched or linear homopolymers with a hydrophobic group for controlled drug delivery. There is a continued need for new pharmaceutical formulations that can deliver drug more effectively and with less toxicity.

SUMMARY

The present invention is directed to a pharmaceutical composition comprising: a salt component comprising sodium bicarbonate; a nanoaggregate comprising a polymer and at least one bioactive agent, wherein the salt component and the nanoaggregate are mixed in an aqueous solution; and optionally a pharmaceutical suitable carrier; wherein the polymer is water soluble and comprises at least one first terminal group modified with a hydrophobic moiety and a second terminal group modified with a hydrophilic moiety; wherein the bioactive agent is water insoluble or poorly water soluble prior to forming the nanoaggregate; and wherein the pharmaceutical composition has a pH value in a range of from about 7.1 to about 10.

The present invention is also directed to a process for producing a pharmaceutical composition, the process comprising the steps of: (1) forming a nanoaggregate comprising a polymer and at least one bioactive agent by mixing the polymer and the bioactive agent, and optionally, sodium bicarbonate; wherein the nanoaggregate is produced by: dissolving the polymer in a first solvent selected from an aqueous solution, a first organic solvent or a combination thereof, to form a polymer solution; dissolving the bioactive agent in a second organic solvent to form a bioactive agent solution; and mixing the polymer solution and the bioactive agent solution to form the nanoaggregate; wherein the first organic solvent and the second organic solvent are the same or different; and wherein the second organic solvent is a water miscible organic solvent; (2) removing the first solvent and the second organic solvent from the nanoaggregate to form a dried nanoaggregate and dissolving the dried nanoaggregate to form an aqueous nanoaggregate solution; (3) lyophilizing the aqueous nanoaggregate solution to form a lyophilized nanoaggregate; and (4) mixing the lyophilized nanoaggregate with a saline, a sodium bicarbonate solution, water or a combination thereof, and, optionally, a pharmaceutical suitable carrier to form the pharmaceutical composition; wherein the polymer is water soluble and comprises at least one first terminal group modified with a hydrophobic moiety and a second terminal group modified with a hydrophilic moiety; wherein the bioactive agent is water insoluble or poorly water soluble prior to forming the nanoaggregate; and wherein the pharmaceutical composition can have a pH value in a range of from about 7.1 to about 10.0. The pharmaceutical composition can have a pH value in a range of from about 7.1 to 10.0, particularly, about 7.6 to about 10.0 and can comprise sodium bicarbonate in a range of from 0.01% to 10%, percentage based on the total weight of the pharmaceutical composition.

The present invention is further directed to a method for treating a disease of a subject in need thereof, the method comprising administering the subject with an effective dosage of the aforementioned pharmaceutical composition or a pharmaceutical composition produced from any of the aforementioned processes and administering an aqueous basic solution comprising sodium bicarbonate prior to, during, or after administering the pharmaceutical composition to the subject. The disease can include cancer or other neoplastic diseases.

BRIEF DESCRIPTION OF THE FIGURES

FIG. 2A: A dendrimer with 4-PPI. FIG. 2B: A dendrimer with additional 8-PPI.

FIG. 6A: Chemical modification reactions of random asymmetrically branched PEI homopolymers. FIG. 6B: Example of a one-pot synthesis of hydrophobically modified, randomly branched poly(2-ethyloxazoline) with a primary amino group at the focal point of the polymer. The initiator/surface group (I) is a brominated hydrocarbon. The reaction opens the oxazoline ring.

FIG. 18D: Biodistribution of FID-007 and paclitaxel (PTX) in Kidney, Normal (FID007-S and PTX-S in saline) vs. Alkaline Physiological Condition in the presence of sodium bicarbonate (FID007-SB and PTX-SB). FIG. 18E: Biodistribution of FID-007 in Tumor, Normal FID-007 (Saline) vs. Alkaline Physiological Condition in the presence of sodium bicarbonate (FID007-SB).

DETAILED DESCRIPTION

Figure 1A:
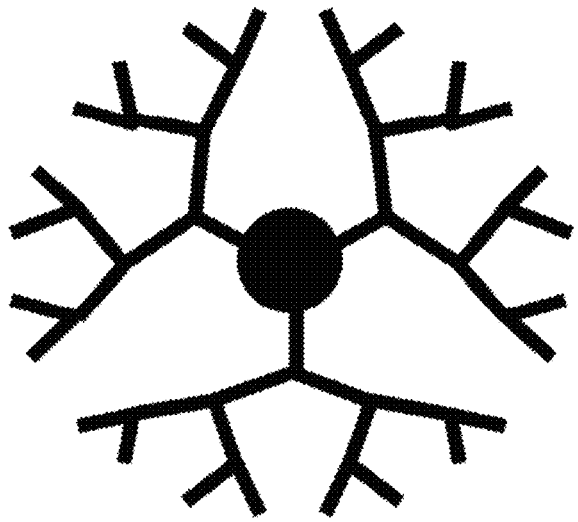
FIG. 1A-FIG. 1D. Examples of SBPs including (FIG. 1A) a dendrimer, (FIG. 1B) a dendrigraft, (FIG. 1C) a regular comb-branched polymer and (FIG. 1D) a star-branched polymer. All have a core, either globular or linear.
Figure 1B:
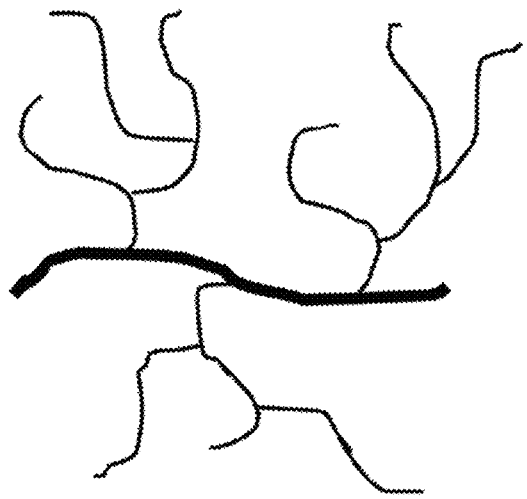
Figure 1C:
Figure 1D:
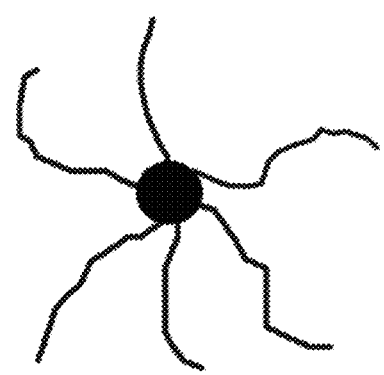
Figure 2A:
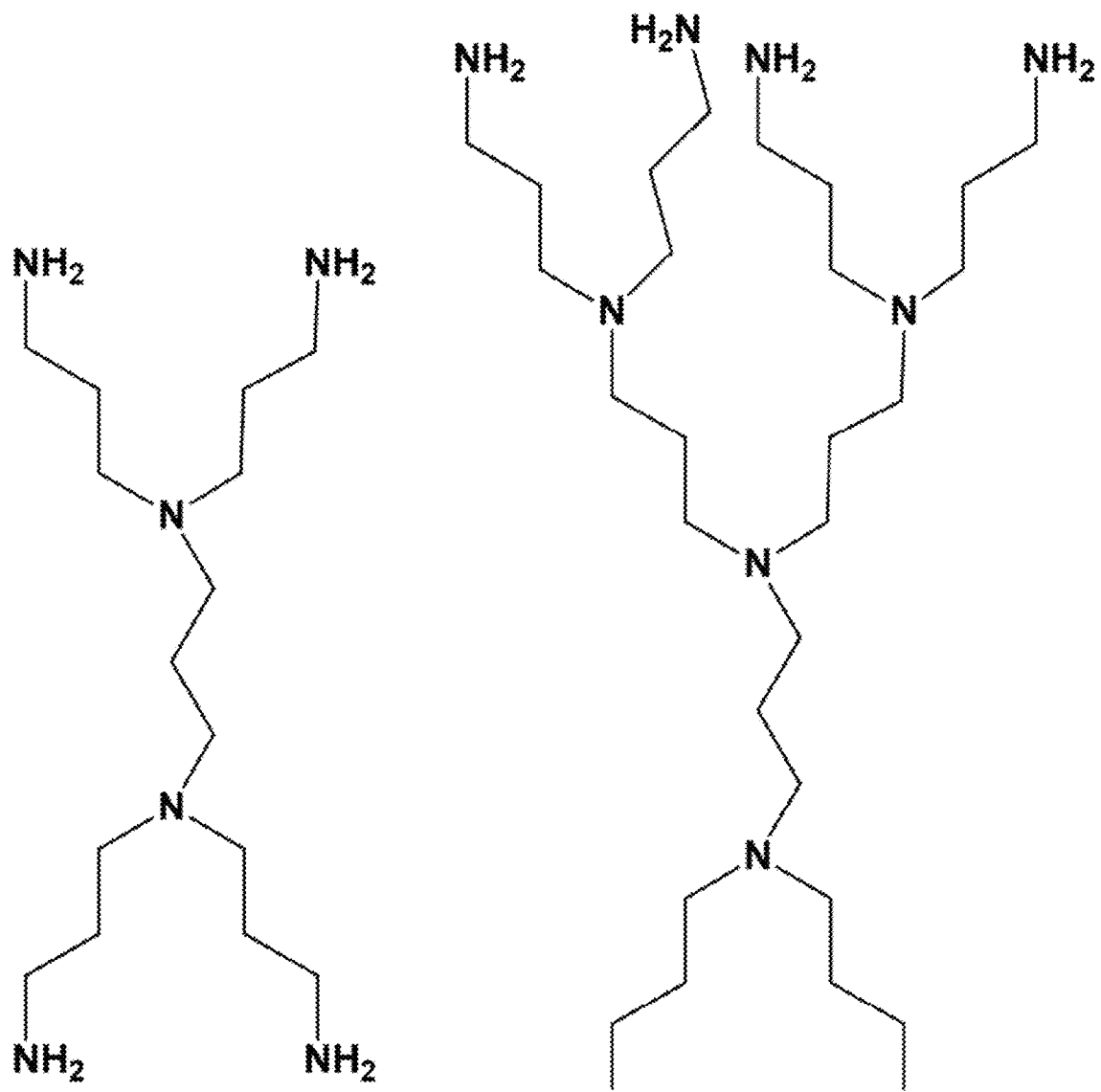
FIG. 2A and FIG. 2B. Examples of chemical structures of symmetrically branched polypropyleneimine (PPI) dendrimers.
Figure 2B:
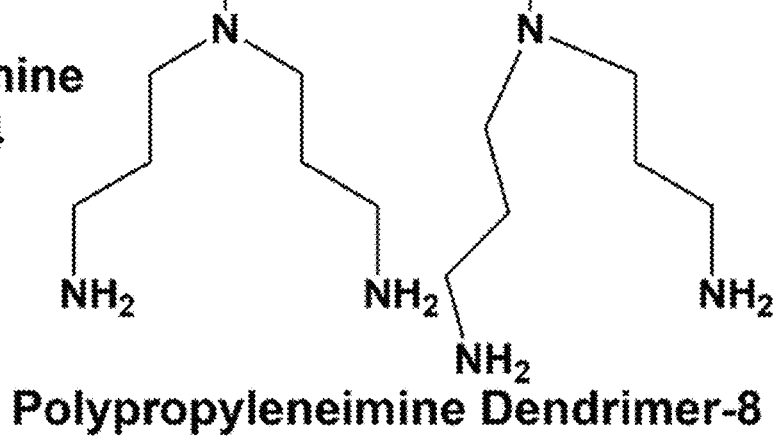

Features and advantages of the present invention will be more readily understood, by those of ordinary skill in the art, from reading the following detailed description. It is to be appreciated that certain features of the invention, which are described above and below in the context of separate embodiments, may also be provided in combination in a single embodiment. Conversely, various features of the invention that are, for brevity, described in the context of a single embodiment, may also be provided separately or in any combination or sub-combination. In addition, references in the singular may also include the plural (for example, "a" and "an" may refer to one, or one or more) unless the context specifically states otherwise.

Use of numerical values in the various ranges specified in this application, unless expressly indicated otherwise, are stated as approximations as though minimum and maximum values within the stated ranges were both proceeded by the word, "about." In this manner, slight variations above and below the stated ranges can be used to achieve substantially the same results as values within the ranges. Also, disclosure of ranges is intended as a continuous range including every value between the minimum and maximum values and including the minimum and maximum cited values.

The drug solubility in the instant disclosure is defined as, relative to parts of solvent required to solubilize one part of bioactive agent or drug, <30 (soluble), 30-100 (poorly soluble) and >100 (insoluble). Water solubility is defined herein as, relative to parts of water required to solubilize one part of bioactive agent or drug, <30 (water soluble), 30-100 (poorly water soluble) and >100 (water insoluble).

For the purposes of the instant disclosure, a randomly branched PEI, although there are branches of different length and branches occur randomly, is considered as a homopolymer because that branched polymer is composed of a single monomer, the ethyleneimine or aziridine repeat unit. A polymer having a structure of "(AB)-(AB)-(AB)- . . . " can also be considered as a homopolymer because of the (AB) repeating unit. The homopolymer may be linear or branched. Also, one or more of the monomer or complex monomer components can be modified, substituted, derivatized and so on, for example, modified to carry a functional group. Such molecules are homopolymers for the purposes of the instant disclosure as the polymer backbone is composed of a single type of simple or complex monomer.

This invention is directed to a pharmaceutical composition comprising:
  a salt component comprising sodium bicarbonate;
  a nanoaggregate comprising a polymer and at least one bioactive agent, wherein the salt component and the nanoaggregate are mixed in an aqueous solution; and
  optionally a pharmaceutical suitable carrier;
  wherein the polymer is water soluble and comprises at least one first terminal group modified with a hydrophobic moiety and a second terminal group modified with a hydrophilic moiety;
  wherein the bioactive agent is water insoluble or poorly water soluble prior to forming the nanoaggregate; and
  wherein the pharmaceutical composition has a pH value in a range of from about 7.1 to about 10.

The pharmaceutical composition can comprise both sodium bicarbonate and a salt of the acid disclosed herein in one example, sodium bicarbonate only in another example, and a salt of the acid disclosed herein in yet another example. The pharmaceutical composition can have a pH value in a range of from about 7.1 to about 10.0. The pharmaceutical composition is free from free acid. In one particular example, the pharmaceutical composition can have a pH value in a range of from about 7.1 to about 10.0. Any pH value or values in the range specified herein can be suitable. In examples, the pharmaceutical composition can have a pH value in a range of from 7.1 to 10.0, 7.2 to 10.0, 7.3 to 10.0, 7.4 to 10.0, or 7.5 to 10.0. In further examples, the pharmaceutical composition can have a pH value in a range of from 7.1 to 10.0, 7.2 to 9.5, 7.2 to 9.5, 7.3 to 9.5, 7.4 to 9.5, or 7.5 to 9.5. In examples, the pharmaceutical composition can have a pH value in a range of from 7.6 to 10.0, 7.6 to 9.5, 7.6 to 9.0, 7.6 to 8.5, 7.6 to 8.0, or 7.6 to 7.9. In even further examples, the pharmaceutical composition can have a pH value in a range of from 7.8 to 10.0, 7.8 to 9.5, 7.8 to 9.0, 7.8 to 8.5, 7.9 to 9.5, 7.9 to 8.5, or 7.9 to 8.2. The pH values can be selected so that the nanoaggregate, the pharmaceutical composition or both the nanoaggregate and the pharmaceutical composition can be free from free acid. In further examples, a pharmaceutical composition of this invention can comprise the nanoaggregate disclosed herein and a salt component comprising sodium bicarbonate in the aqueous solution, wherein the pharmaceutical composition has a pH value in a range of from about 7.9 to about 8.5 and the nanoaggregate is free from free acid. The pharmaceutical compositions in these examples are free from free acid.

In some cases, the salt component can consist of sodium bicarbonate. In some cases, the salt component can consist of sodium bicarbonate, sodium chloride, water, and a combination thereof.

The polymer disclosed above and hereafter can comprise a linear polymer, a branched polymer, a symmetrically branched polymer, an asymmetrically branched polymer, a dendrimer, a dendrigraft polymer, a comb-branched polymer, a star-branched polymer, or a combination thereof. The polymer is water soluble. In examples, the polymer can be dissolved in water to produce a 12% weight percent or higher water solution.

In the pharmaceutical composition disclosed herein, the first terminal group can comprise hydrophobic moiety comprising saturated or unsaturated aliphatic hydrocarbon having 1 to about 22 carbons, an aromatic hydrocarbon, or a combination thereof, and the second terminal group can comprise a group modified by an amine, amide, imine, imide, carboxyl, hydroxyl, ester, acetate, phosphate, or a combination thereof. The first terminal group can comprise a hydrocarbon having 2 to 22 carbons in one example, 4 to 22 carbons in another example, 6 to 22 carbons in yet another example, 8 to 22 carbons in yet another example, 10 to 22 carbons in yet another example, 12 to 22 carbons in yet another example, 14 to 22 carbons in yet another example, 16 to 22 carbons in yet another example, and 18 to 22 carbons in a further example. In one particular example, the first terminal group can comprise 18 carbons, such as a $(CH_3(CH_2)_{17})$— group. The second terminal group can comprise a group modified by an ammonia, a derivative of ammonia, an ethylenediamine (EDA), a derivative of ethylenediamine, a piperazine, a derivative of piperazine, tris(2 aminoethyl)amine, 4-(aminomethyl)piperidine, 1,3-diaminopropane, 2,2'-(ethylenedioxy)bis(ethylamine), diethylenetriamine, 1,4,7,10-tetraazacyclododecane, hexamethylenediamine, triethylenetetramine, 1,8-diaminooctane, or a combination thereof. In yet another example, the second terminal group can comprise a group modified by an ethylenediamine (EDA), a derivative of ethylenediamine, or a combination thereof. Any derivative of ethylenediamine disclosed herein can be suitable. The polymer can have a reaction challenge molar ratio of polyoxazoline reactive chain end to EDA in a range of from 1:1 to 1:100. The polymer can have a reaction challenge molar ratio of polyoxazoline reactive chain end to EDA in a range of from 1:1 to 1:100 in one example, 1:2 to 1:100 in another example, 1:2 to 1:50 in yet another example, 1:2 to 1:40 in yet another example, 1:2 to 1:30 in a further example, 1:2 to 1:20 in yet another example, 1:2 to 1:15 in yet another example, and 1:5 to 1:15 in a further example. In further examples, a polymer can have a reaction challenge molar ratio of polyoxazoline reactive chain end to EDA at a ratio of about 1:10. The EDA modified polyoxazoline disclosed herein can provide functional groups that can have pH-dependent changes in polymer charge as disclosed herein. In some cases, a pharmaceutical composition disclosed herein can comprise a polymer that can have a molar ratio of polyoxazoline reactive chain end to EDA of about 1:10.

In any of pharmaceutical compositions disclosed above and hereafter, the polymer can comprise a polyoxazoline (PDX) that comprises a linear portion, a branched portion, or a combination thereof. The polymer can comprise a plurality of linear portions joined together in one example, one or more linear portions joined with one or more branched portions in another example, one or more branched portions joined together in yet another example, such as those schematically depicted in FIG. 1A through FIG. 10B. Each of the linear portions can be independently of various lengths, modifications, or a combination thereof. Each of the branched portions can be independently of various lengths, number of branches, modifications, or a combination thereof.

The polyoxazoline (PDX) can comprise poly(2-substituted oxazoline) that comprises poly(2-methyloxazoline), poly(2-ethyloxazoline), poly(2-propyloxazoline), poly(2-butyloxazoline), or a combination thereof. The PDX can comprise poly(2-methyloxazoline) (PMOX) in one example, poly(2-ethyloxazoline) (PEOX) in another example, poly(2-propyloxazoline) (PPDX) in yet another example, poly(2-butyloxazoline) (PBOX) in a further example, or a combination of two or more of the poly(2-substituted oxazoline)s in yet a further example, wherein the two or more of the poly(2-substituted oxazoline)s can be a repeating unit, also referred to as complex monomer, in the polyoxazoline polymer. The polyoxazoline (PDX) is hydrophilic. The polyoxazoline (PDX) can be free from monomers, either simple or complex monomers, having hydrophobic side chains.

Some of examples of symmetrically branched polymers (SBP) are schematically depicted in FIG. 1A-FIG. 1D and FIG. 2A-FIG. 2B with symmetric branches, wherein all the homopolymers of interest possess a core and exhibit symmetric branch junctures consisting either of terminal or chain branches throughout the homopolymer. The functional groups are present predominantly at the exterior of the polymer.

The modified SBP's can be obtained, for example, through chemically linking functional groups on, for example, symmetrically branched PAMAM or PPI dendrimers, commercially available from Aldrich, polyether dendrimers, polyester dendrimers, comb-branched/star-branched polymers, such as, those containing PEO, PEG, PMOX or PEOX, polystyrene, and comb-branched dendrigrafts, such as, those containing PEOX, PMOX or PEI. The synthetic procedures for making such SBP's/dendrimers are known and described above and hereafter.

The higher branching densities of SBP's render the polymers molecularly compact with a well-defined interior void space, which makes such molecules suitable as a carrier for a taxane entrapped or encased, therein.

The surface modifications can enhance the properties and uses of the resulting modified SBP's. For example, with suitable modification, a water insoluble SBP can become water soluble, while an SBP with a high charge density can be modified to carry very low or no charge on the polymer or at the polymer surface. On the other hand, a water soluble SBP can be modified with hydrophobic surface groups to enhance the ability to solubilize water insoluble or poorly water soluble drugs at the surface or in the interior thereof. Modification can occur at any site of a polymer, for example, at a terminus, a branch, a backbone residue and so on.

In one embodiment of the instant disclosure, the SBP (for example, either a symmetrically branched PEI dendrimer, a PPI dendrimer, a PAMAM dendrimer or a symmetrically branched PEI dendrigraft) can be modified with different kinds of, for example, primary amine groups through, for example, Michael addition or an addition of acrylic esters onto amine groups of the homopolymer. Thus, for example, through a Michael addition reaction, methyl acrylate can be introduced onto the primary and/or secondary amino groups of PEI, PPI and polylysine (PLL) homopolymers. The ester groups then can be derivatized further, for example, by an amidation reaction. Thus, for example, such an amidation reaction with, for example, ethylenediamine (EDA), can yield the addition of an amino group at the terminus of the newly formed branch. Other modifications to the homopolymer can be made using known chemistries, for example, as provided in "Poly(amines) and Poly(ammonium salts)," in "Handbook of Polymer Synthesis," (Part A), Kricheldorf ed., New York, Marcel Dekker, 1994; and "Dendrimers and Other Dendritic Polymers" Frechet & Tomalia, eds., John Wiley & Sons, Ltd., 2001. Derivatives of EDA also can be used and include any molecular entity that comprises a reactive EDA, a substituted EDA or, for example, other members of the polyethylene amine family, such as, diethylenetriamine, triethylenetetramine, tetraethylenepentamine, pentaethylenehexamine, and so on including polyethylene amine, tetramethylethylenediamine and so on. The amidation reaction with, for example, ethylenediamine (EDA), can also modify polymer charge density at the terminus of the newly formed branch. As disclosed herein, polymer having such amidation groups can have pH-dependent change in charge leading to change in pH-dependent polymer charge density.

Figure 3:
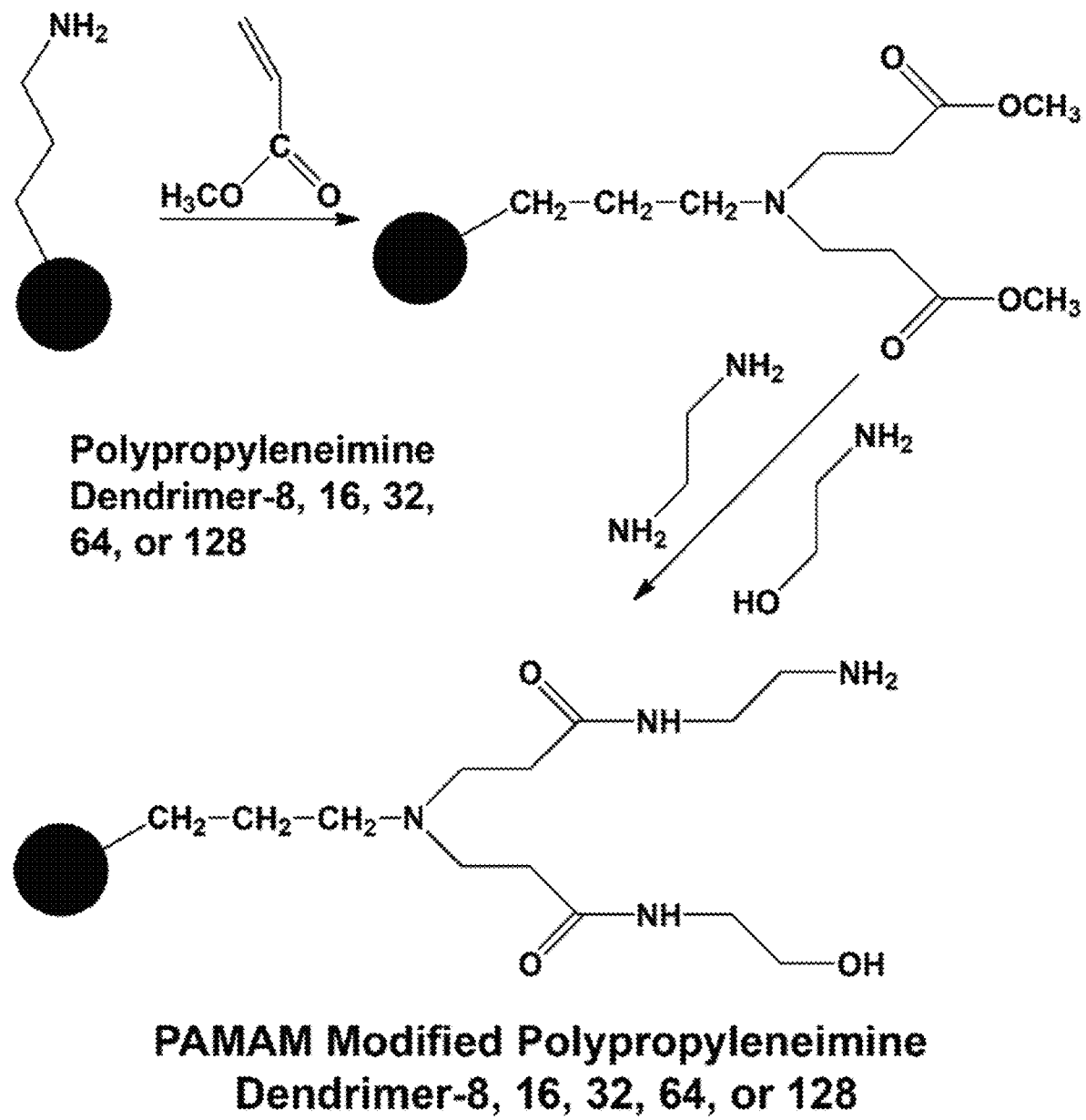
FIG. 3. Examples of chemical modification reactions of symmetrically branched PPI dendrimers. The numbers, 8, 16, 32, 64, 128 and so on, indicate the number of reactive groups at the surface of the dendrimer.

In some embodiments, a modification can comprise a moiety that contributes to or enhances hydrophobicity of a polymer or a portion thereof. For example, hydrophobic functional groups, such as, aliphatic chains including hydrocarbon chains comprising 1 to about 22 carbons that can be saturated or unsaturated, linear, cyclic or branched, aromatic structures (e.g. containing one or more aromatic rings, which may be fused) or combinations thereof, can be used as a modifying agent and added to a polymer as taught herein practicing chemistries as provided herein. On such addition, a modified SBP, such as, a modified PEI, PPI, PAMAM dendrimer or PEI dendrigraft, can be formed. An example of PAMAM modified PPI dendrimer is shown in FIG. 3. As an extension of the SBP, such as PPI and PEI, the resulting modified SBP also is symmetrically branched. Depending on the solvent environment (i.e. pH or polarity), the surface functional groups can carry different charge and/or charge density, and/or hydrophobic groups. The molecular shape and surface functional group locations (i.e., surface functional group back folding) then can be tuned further, based on those characteristic properties.

In another embodiment of the disclosure, the modified SBP's can be produced using any of a variety of synthetic schemes that, for example, are known to be amenable to reaction with a suitable site on the homopolymer. Moreover, any of a variety of reagents can be used in a synthetic scheme of choice to yield any of a variety of modifications or additions to the homopolymer backbone. Thus, for example, in the case of the Michael addition reaction to an amine described above, the addition of any of a variety of substituents can be used, for example, at the alkylation stage, using for example, any of a variety of acrylate reagents, such as, an acrylate comprising a hydrocarbon substituent, such as saturated or unsaturated hydrocarbons comprising 1 to about 22 carbons, which may be substituted, aliphatic, aromatic, ringed, saturated at one or more bonds or a combination thereof. Thus, suitable reactants include, methyl acrylate, ethyl acrylate, propyl acrylate, butyl acrylate, pentyl acrylate, hexyl acrylate, heptyl acrylate, octyl acrylate, nonyl acrylate, decyl acrylate, undecyl acrylate, dodecyl acrylate and so on, and mixtures thereof. Similarly, at the amidation stage in the example exemplified above, any of a variety of amines can be used. For example, EDA, monoethanolamine, tris(hydroxymethyl)aminomethane, alkyl amine, allyl amine or any amino-modified polymer, including those comprising PEG, PEO, perfluoropolymers, polystyrene, polyethylene, polydimethylsiloxane, polyacrylate, polymethylmethacrylate and the like, and mixtures thereof, can be used.

Such a synthetic strategy would allow not only symmetric growth of the molecule, where more branches with different chemical compositions can be introduced, but also the addition of multiple functional groups at the exterior of the polymer structure. The precursor homopolymer can be modified, and continuously, using the same or a different synthetic process until the desired SBPs with appropriate molecular weight and functional groups are attained. In addition, the hydrophobic and hydrophilic properties, as well as charge densities of such polymers, can be tailored to fit specific application needs using appropriate monomers for constructing the homopolymer and suitable modification reactions.

In another embodiment of the disclosure, if a divergent synthetic procedure is used, the chain end of symmetrically star-branched or comb-branched homopolymer, such as, a poly(2-substituted oxazoline), including, for example, poly (2-methyloxazoline), poly(2-ethyloxazoline), poly(2-propyloxazoline) and poly(2-butyloxazoline, etc.), PEI, PEO/glycol, polyvinylpyrrolidone (PVP), polyphosphate, polyvinyl alcohol (PVA) or polystyrene, can be modified with another small molecule or polymer to generate various functional groups at the homopolymeric chain ends including a primary, secondary or tertiary amine, carboxylate, hydroxyl, aliphatic (e.g., hydrocarbon chain), aromatic, fluoroalkyl, aryl, PEG, PEO, acetate, amide and/or ester groups. Alternatively, various initiators also can be utilized so that the same type of functional groups can be introduced at the chain end if a convergent synthetic approach is utilized ("Dendritic Molecules," Newkome et al., eds., VCH, Weinheim, 1996; "Dendrimers and Other Dendritic Polymers," Frechet & Tomalia, eds., John Wiley & Sons, Ltd., 2001; and J. Macromol. Sci. Chem. A9(5), pp. 703-727 (1975)).

The initiator can comprise a hydrophobic electrophilic molecule, including hydrocarbons, aliphatic hydrocarbons, aromatic hydrocarbons or a combination thereof, along with a halide functional group, such as, alkyl halides, aralkyl halides, acyl halides or combinations thereof. Examples of such compounds can include monofunctional initiators such as hydrocarbons containing from 1 to about 22 hydrocarbons with either saturated or unsaturated chemical bonds, such as, methyl iodide/bromide/chloride, ethyl iodide/bromide/chloride, 1-iodo/bromo/chloro butane, 1-iodo/bromo/chloro hexane, 1-iodo/bromo/chloro dodecane, 1-iodo/bromo/chloro octadodecane, benzyl iodide/bromide/chloride and so on. Other initiators can include allyl bromides/chlorides. Acyl halides, such as, acyl bromide/chloride, benzoyl bromide/chloride and tosyl group-containing compounds, such as, p-toluenesulfonic acid, methyl tosylate and other tosylate esters can also be used. Any one or more initiators can be used in combination.

During polymerization, an initiator can be used to start polymerization. When used, various molar ratios of monomer to initiator can be used to obtain particular polymers. The particular polymers can have differing properties, such as, molecular weight, size of branching and other properties including those unexpectedly discovered by Applicants as disclosed herein. In some cases, suitable monomer to initiator molar ratios can be 20:1 to 80:1, such as, 25:1, 35:1, 40:1, 45:1, 50:1, 55:1, 60:1, 65:1, 70:1 or 75:1 including 21:1, 22:1, 23:1, 24:1, 26:1, 27:1, 28:1, 29:1, 31:1, 32:1, 33:1, 34:1, 36:1, 37:1, 38:1, 39:1, 41:1, 42:1, 43:1, 44:1, 46:1, 47:1, 48:1, 49:1, 51:1, 52:1, 53:1, 54:1, 56:1, 57:1, 58:1, 59:1, 61:1, 62:1, 63:1, 64:1, 66:1. 67:1, 68:1, 69:1, 71:1, 72:1, 73:1, 74:1, 76:1, 77:1, 78:1, 79:1 and so on. In some cases, the polyoxazoline disclosed herein can comprise a molar ratio of monomer to initiator in a range of from to 80:1, meaning that a molar ratio of monomer to initiator in a range of from 50:1 to 80:1 is used to produce the polymer of choice.

Figure 4A:
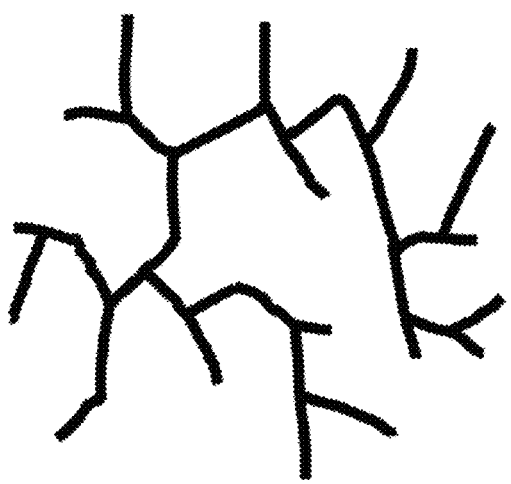
FIG. 4A and FIG. 4B. Schematic examples of random (FIG. 4A) and regular (FIG. 4B) asymmetrically branched polymers (ABPs) with asymmetric branch junctures and patterns.
Figure 4B:
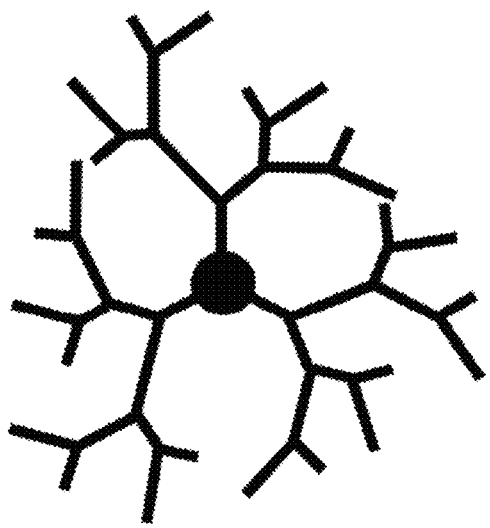

Some examples of asymmetrically branched polymers (ABP) are schematically depicted in FIG. 4A-FIG. 4B with asymmetric branches, wherein some of the polymers of interest possess no core and exhibit asymmetrical branch junctures consisting of both chain and terminal branches throughout the entire homopolymer. The junctional groups often are present both at the exterior and in the interior. However, when a larger functional group (e.g., a large hydrophobic or hydrophilic group) is used, the functional groups often can be attached preferentially and perhaps necessarily at the exterior of the ABP, for example, possibly due to steric effects. Therefore, such surface modified branched polymers (MBP) can be utilized for solubilization of or nanoaggregate formation with a water insoluble or poorly water soluble drug.

The modified ABP's can be obtained, for example, through chemically linking functional groups on regular ABP's, such as, polylysine (e.g., branched PLL), on random ABP's, such as, PEI's (commercially available from Aldrich, Polysciences, or BASF under the trade name, Lupasol®) or polyoxazolines, which can be prepared according to the procedure of Litt (J. Macromol. Sci. Chem. A9(5), pp. 703-727 (1975)). Other ABP's can include, but are not limited to, polyacrylamides, polyphosphates, PVP's, PVA's etc. The random asymmetrically branched PEI's can be produced primarily through cationic ring opening polymerization of ring-strained cyclic imine monomers, such as, aziridines (ethyleneimine) and azetidines (propyleneimine), with Lewis or Bronsted acids as initiators (Dernier et al., "Ethylenediamine and Other Aziridines," Academic Press, New York, (1969); and Pell, J. Chem. Soc. 71 (1959)). Since many of the methods are essentially one-pot processes, large quantities of random ABP's can be produced readily.

The synthetic processes for making ABP's often generate various branch junctures within the macromolecule. In other words, a mixture of terminal and chain branch junctures is distributed throughout the molecular structure. The branching densities of the random ABP's can be lower, and the molecular structure can be more open when compared with dendrimers and dendrigrafts. Although the branch pattern is random, the average ratio of primary, secondary and tertiary amine groups can be relatively consistent with a ratio of about 1:2:1, as described by Dick et al., J. Macromol. Sci. Chem., A4 (6), 1301-1314 (1970) and Lukovkin, Eur. Polym. J. 9, 559(1973). In one example, the polymer disclosed herein can comprise a ratio of primary, secondary and tertiary amine groups of about 1:2:1.

The presence of the branch junctures can make the random ABP's, such as, asymmetrically branched PEI's, form macromolecules with a possible spherical, ovoid or similar configuration. Within the globular structure, there are various sizes of pockets formed from the imperfect branch junctures at the interior of the macromolecule. Unlike dendrimers and dendrigrafts where interior pockets are always located around the center core of the molecule, the pockets of random ABP's are spread unevenly throughout the entire molecule. As a result, random ABP's possess both exterior and unevenly distributed interior functional groups that can be reacted further with a variety of molecules, thus forming new macromolecular architectures, a modified random ABP of interest.

Although having a core, the functional groups of the regular ABP can also be distributed both at the exterior and in the interior, which is very similar to the random ABP. One such homopolymer is PLL, which can be made as described in U.S. Pat. Nos. 4,289,872; 4,360,646; and 4,410,688. Such homopolymers also can be modified in a manner similar as that for random ABP's, as taught herein, and as known in the art.

In an embodiment of the disclosure, the ABP (for example, either a random asymmetrically branched PEI or a regular asymmetrically branched PLL) is modified with different kinds of primary amine and/or secondary amino groups through, for example, Michael addition or an addition of acrylic esters onto amines of the polymer, for example, PEI and PLL homopolymers. The ester groups then can be further derivatized, for example, by an amidation reaction. Thus, for example, such an amidation reaction with, for example, EDA, can yield the addition of an amino group at the terminus of the newly formed branch. Other modifications to the polymer can be made using known chemistries, for example, as provided in aforementioned "Poly(amines) and Poly(ammonium salts)". On such addition, a modified ABP, such as, a modified PEI or PLL homopolymer, is formed. As an extension of the ABP, such as PEI and PLL, the resulting modified ABP also is branched, asymmetrically. Depending on the solvent environment (i.e. pH or polarity), the surface functional groups can carry different charge and charge density. The molecular shape and functional group locations (i.e., functional group back folding) then cars be further tuned, based on those characteristic properties.

Figure 5:
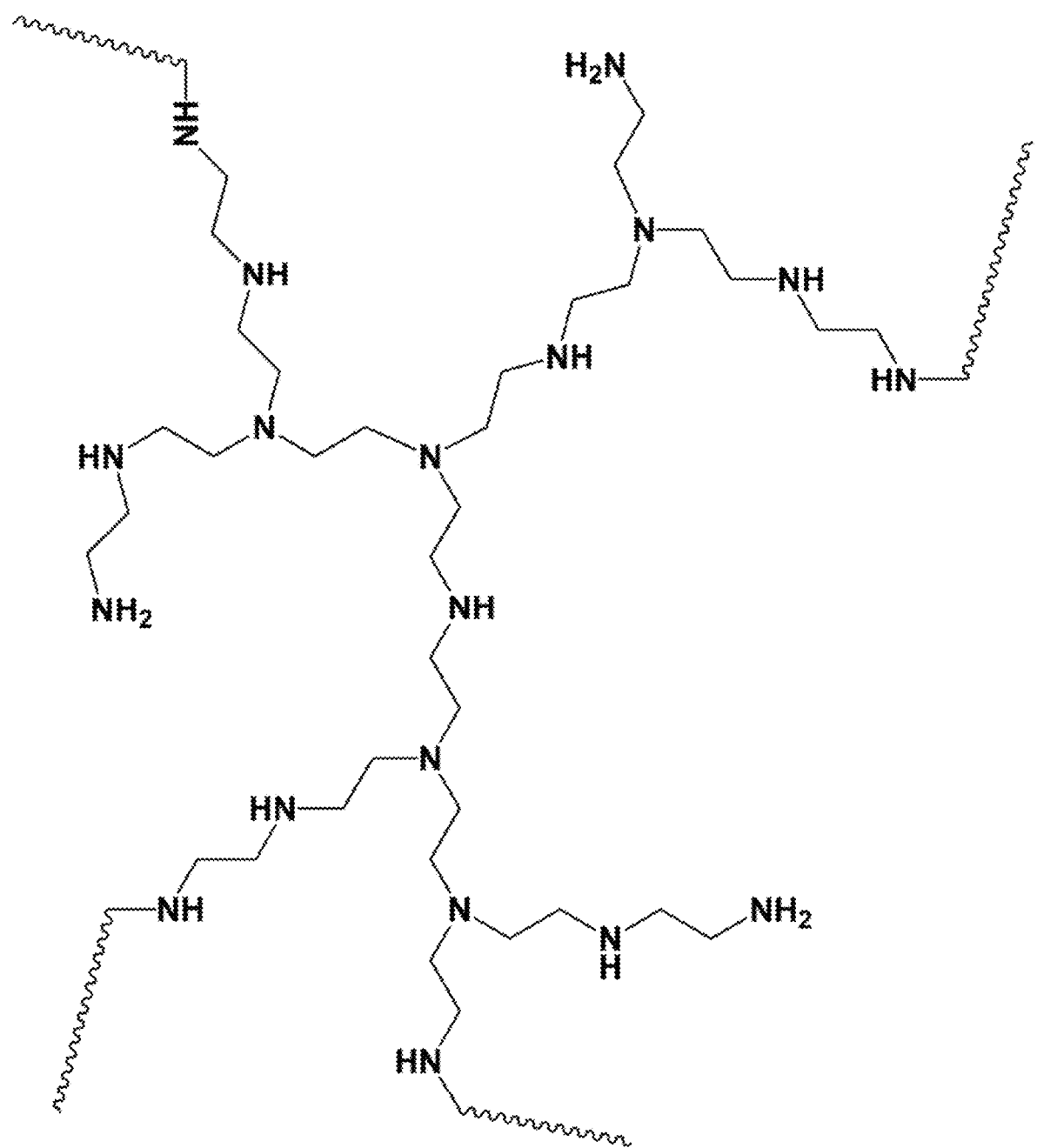
FIG. 5. An example of a chemical structure of a random asymmetrically branched PEI homopolymer.
Figure 6A:
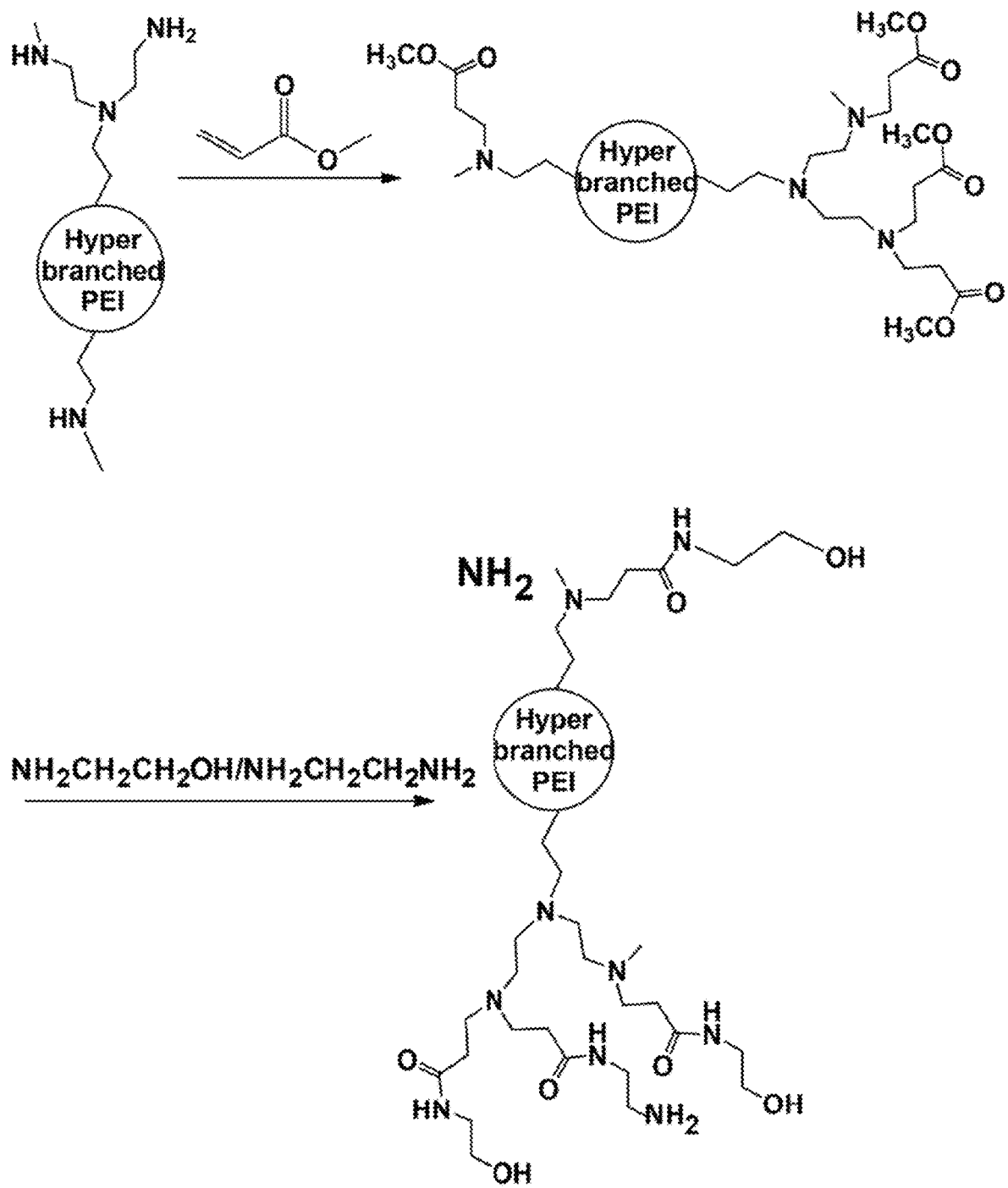
FIG. 6A and FIG. 6B. Examples of synthetic schemes.

In another embodiment, the modified ABP's can be produced using any of a variety of synthetic schemes that, for example, are known to be amenable to reaction with a suitable site on the homopolymer. Moreover, any of a variety of reagents can be used in a synthetic scheme of choice to yield any of a variety of modifications or additions to the polymer backbone. Thus, for example, in the case of the Michael addition reaction to an amine described above, the addition of any of a variety of substituents can be used at the alkylation stage, as provided hereinabove, for example, with an acrylate, which can comprise a saturated or unsaturated hydrocarbon, such as one comprising one carbon to about 22 carbons, which may be aliphatic, branched, saturated, aromatic, ringed or combination thereof. The hydrocarbon can have 2 to 22 carbons in one example, 4 to 22 carbons in another example, 6 to 22 carbons in yet another example, 8 to 22 carbons in yet another example, 10 to 22 carbons in yet another example, 12 to 22 carbons in yet another example, 14 to 22 carbons in yet another example, 16 to 22 carbons in yet another example, and 18 to 22 carbons in a further example. In one particular example, the first terminal group can comprise 18 carbons, such as a $(CH_3(CH_2)_{17})$— group. Suitable reactants include methyl acrylate, ethyl acrylate, propyl, acrylate, butyl acrylate, pentyl acrylate, hexyl acrylate, heptyl acrylate, octyl acrylate, nonyl acrylate, decyl acrylate, undecyl acrylate, dodecyl acrylate and the like, and mixtures thereof. Similarly, at the amidation stage in the example exemplified above, any of a variety of amines can be used in the methods provided herein and known in the art. For example, EDA, monoethanolamine, tris(hydroxymethyl)aminomethane, alkyl amine, allyl amine or any aminomodified polymers, including PEG, perfluoropolymers, polystyrene, polyethylene, polydimethylsilixane, polyacrylate, polymethylmethacrylate and the like, and mixtures thereof, can be used. In addition, the linking of the hydrophobic groups, including aliphatic (e.g., hydrocarbons from $C_1$ to about $C_{22}$) groups, aromatic groups, polyethylene polymers, polystyrene polymers, perfluoropolymers, polydimethylsiloxanes, polyacrylates, polymethylmethacrylates, as well as, hydrophilic groups, including a OH group, hydrophilic polymers, such as, PEOX, PEG, PEO etc. to a modified ABP can be achieved by using, for example, epoxy reactions, amidation reactions, Michael addition reactions, including using a —SH or an —$NH_2$ group reacted with maleimide, aldehyde/ketone-amine/hydrazide coupling reactions, iodo/iodoacetyl-SH coupling reactions, hydroxylamine-aldehyde/ketone coupling reactions etc. Such synthetic strategies allow not only asymmetric growth of the molecule, where more pockets are introduced, but also the addition of multiple functional groups at both the interior and the exterior of the structure. The homopolymer can be modified further using the same or a different synthetic process until the desired ABP's with appropriate molecular weight and functional groups are attained. In addition, the hydrophobic and hydrophilic properties, as well as charge density of such homopolymers, can be tailored to fit specific application needs using appropriate monomers for constructing the homopolymer and suitable modification reactions. An example of a modified ABP is shown in FIG. 5. A modified hyperbranched PEI is shown in FIG. 6A.

Figure 6B:
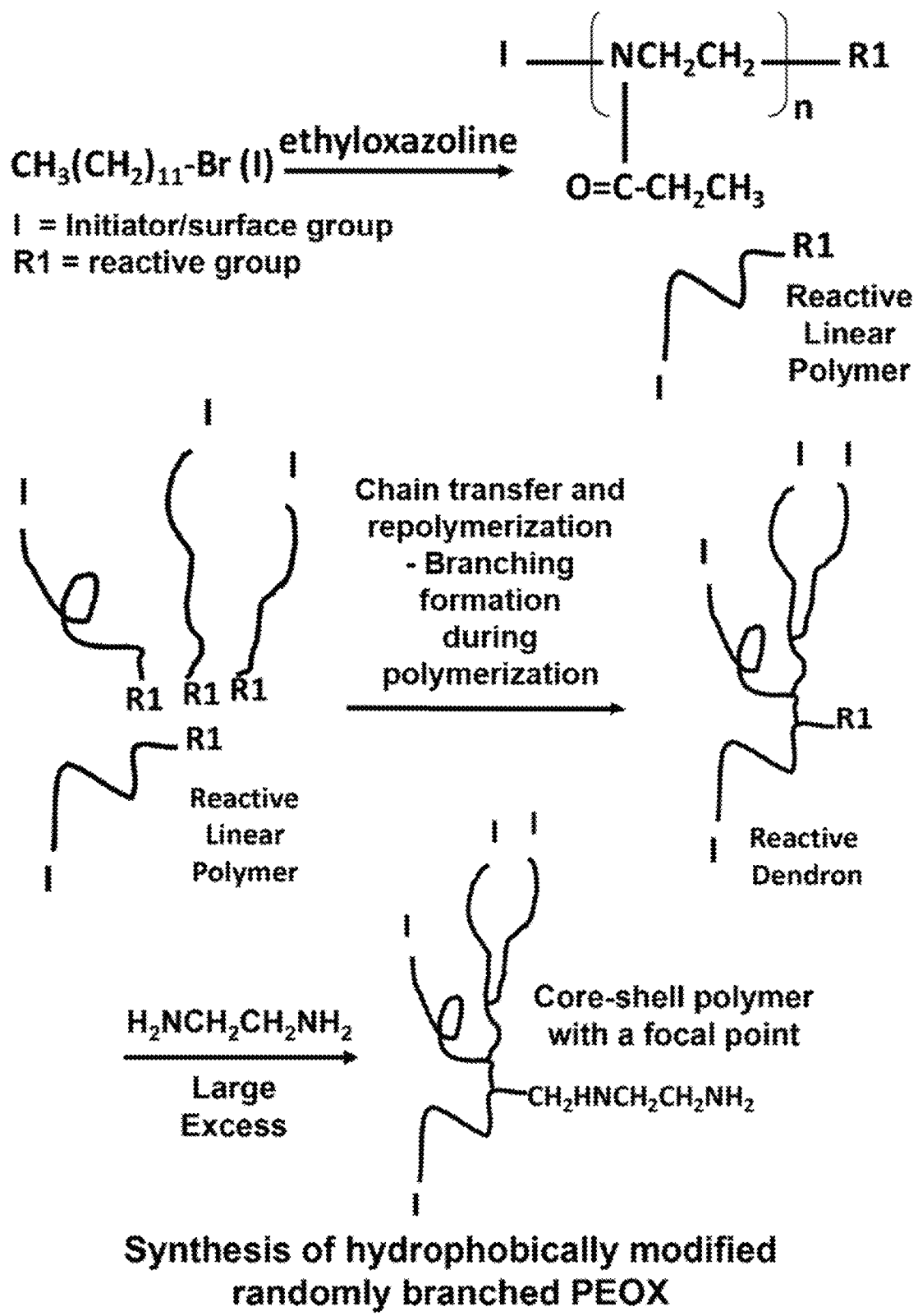
Figures 7A, 7B:
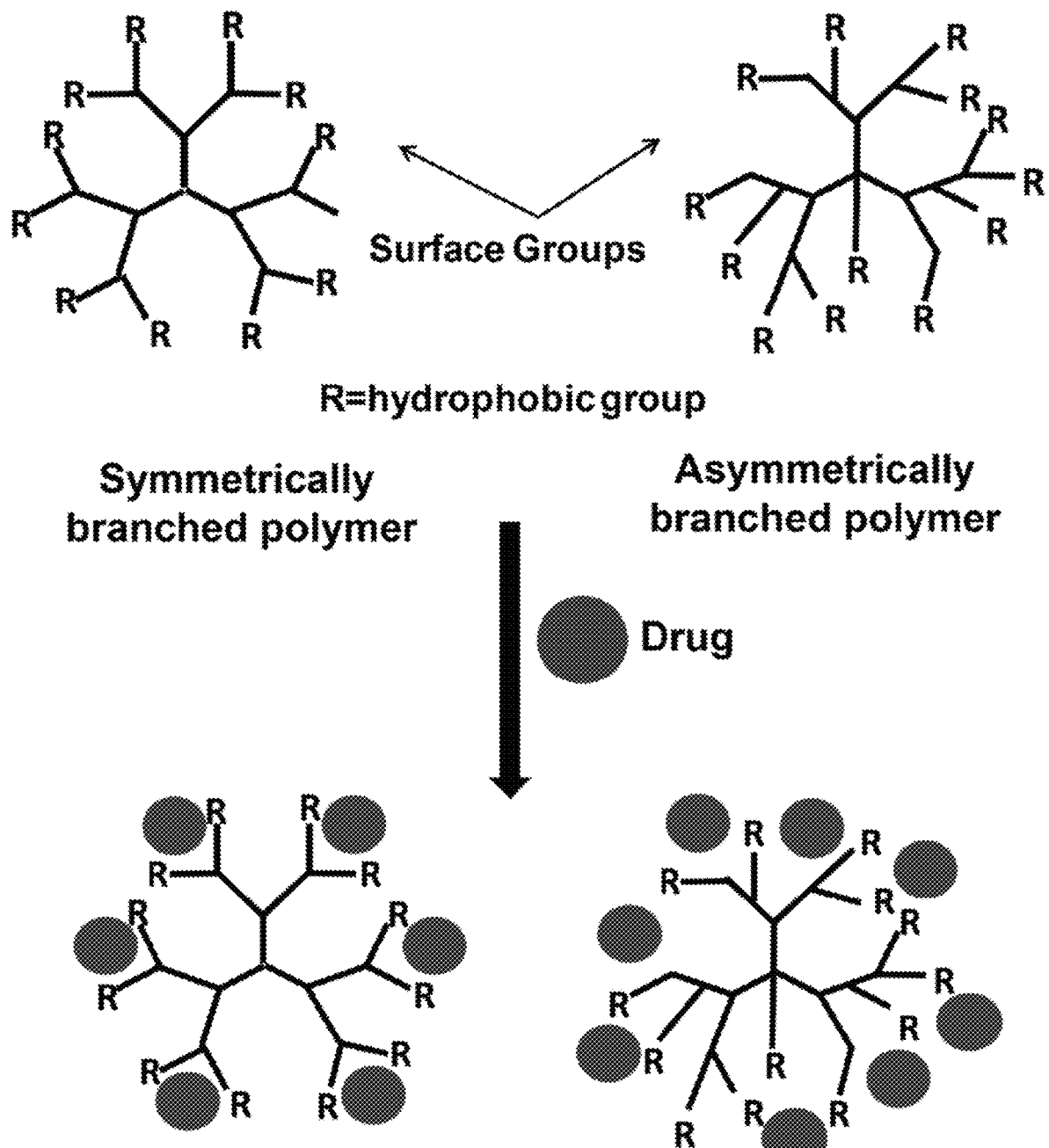
FIG. 7A and FIG. 7B. Schematic examples of illustrations of a drug loaded in or at the surface domain or region of the branched polymer (FIG. 7A) SBP's and (FIG. 7B) ABP's. In this and other figures, R indicates a surface group and a solid circle depicts a bioactive agent, such as a drug of interest.
Figure 8:
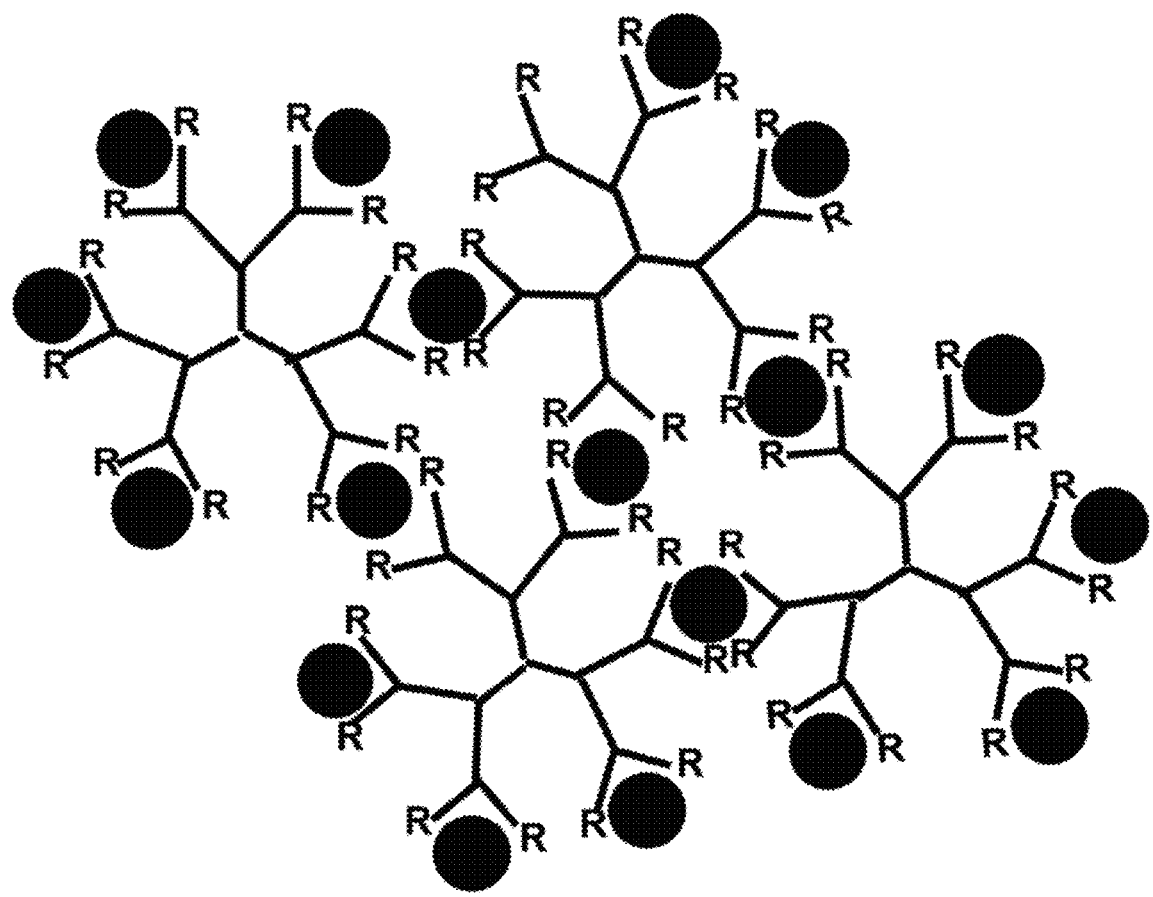
FIG. 8. A schematic illustration of an example of nanoparticles containing both drug molecules (solid circle) and branched polymers with surface groups (R).

In another embodiment of the disclosure, a focal point (merged from various reactive chain ends during a convergent synthesis) of a random ABP, such as, PDX, can be terminated or reacted with another small molecule to generate various functional groups at the homopolymeric chain ends, including primary, secondary or tertiary amines, carboxylate, hydroxyl, alkyl, fluoroalkyl, aryl, PEG, acetate, amide and/or ester groups. Alternatively, various initiators also can be utilized so that the same type of functional group can be introduced at the surface groups where a polymerization begins during a convergent synthesis (J. Macromol. Sci. Chem. A9 (5), pp. 703-727(1975)), An alkyl surface-modified, randomly branched poly(2-ethyloxazoline) with a primary amine group at the focal point of the branched polymer can be prepared using the Litt and Warakomski procedures, supra. For example, $CH_3(CH_2)_{17}$—Br can be utilized as an initiator for 2-ethyloxazoline polymerization through a cationic ring opening process to generate a randomly branched polymer, followed by quenching with N-ten-butyloxycarbonylpiperazine (N-Boc-piperazine) or EDA. The termination with a large excess of EDA allows the hydrophobically modified branched poly(2-ethyloxazoline) polymer to be functionalized with a primary amine group at the focal point (FIG. 6B). Alternatively, N-Boc-piperazine-terminated hydrophobically-modified branched poly(2-ethyloxazoline) polymer also can be deprotected to generate a free amino group at the focal point. If not terminated, the focal point of the polymer can be hydrolyzed to, for example, a hydroxyl group on dissolving in water (e.g., containing, for example, 1N $Na_2CO_3$). In one example, the polymer can comprise a modified branched poly(2-ethyloxazoline) functionalized with primary, secondary or tertiary amines, carboxylate, hydroxyl, alkyl, fluoroalkyl, aryl, PEG, acetate, amide or ester groups at a focal point of the polymer where two or more reactive chain ends merged during a convergent synthesis.

Figures 9A, 9B:
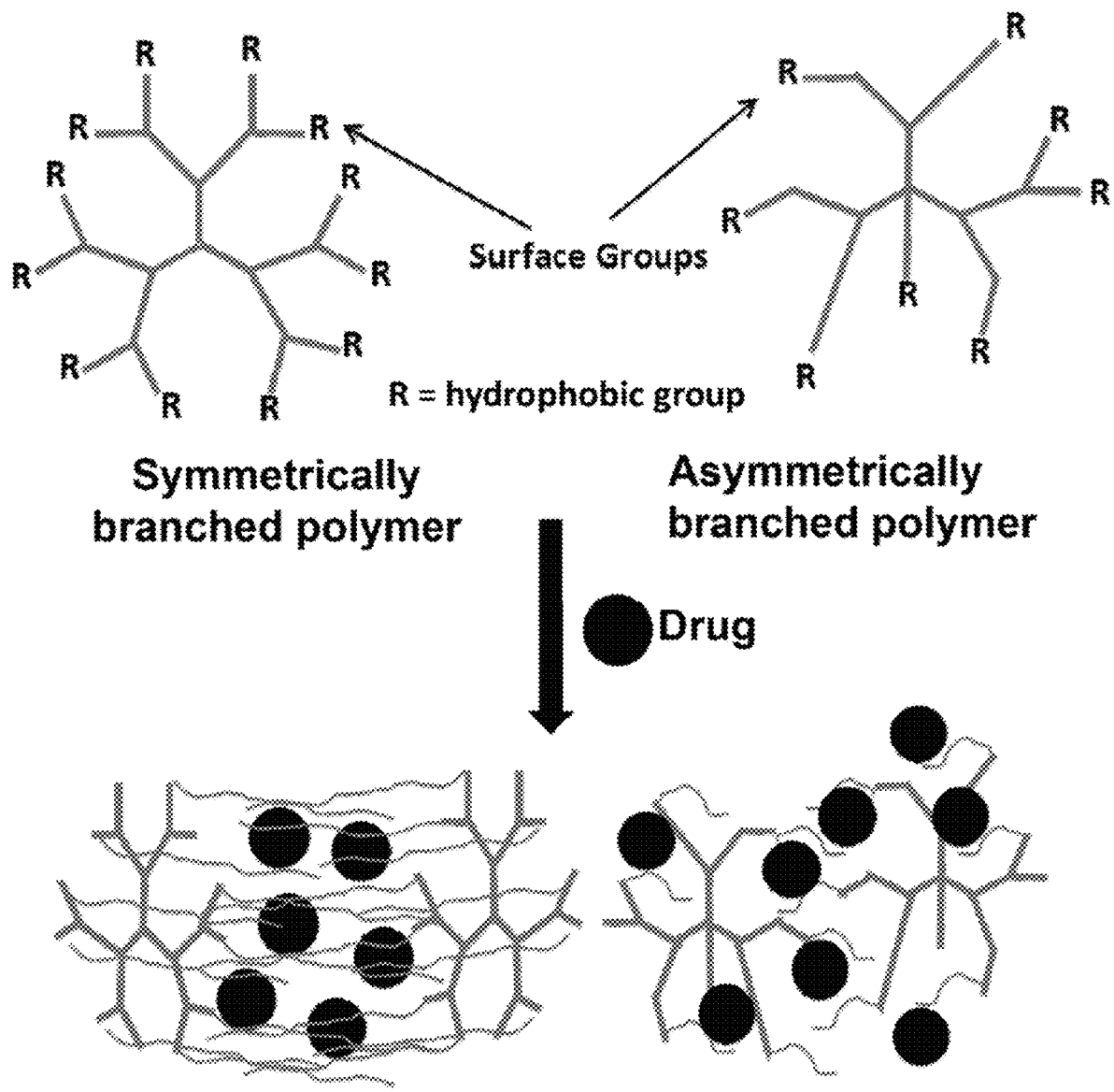
FIG. 9A and FIG. 9B. Schematic examples of illustrations of a water insoluble or poorly water soluble drug that is loaded at hydrophobic surface groups of branched polymers (FIG. 9A) SBP's and/or (FIG. 9B) ABP's. In this and other figures, a thin wavy line depicts a hydrophobic surface group.
Figure 10A:
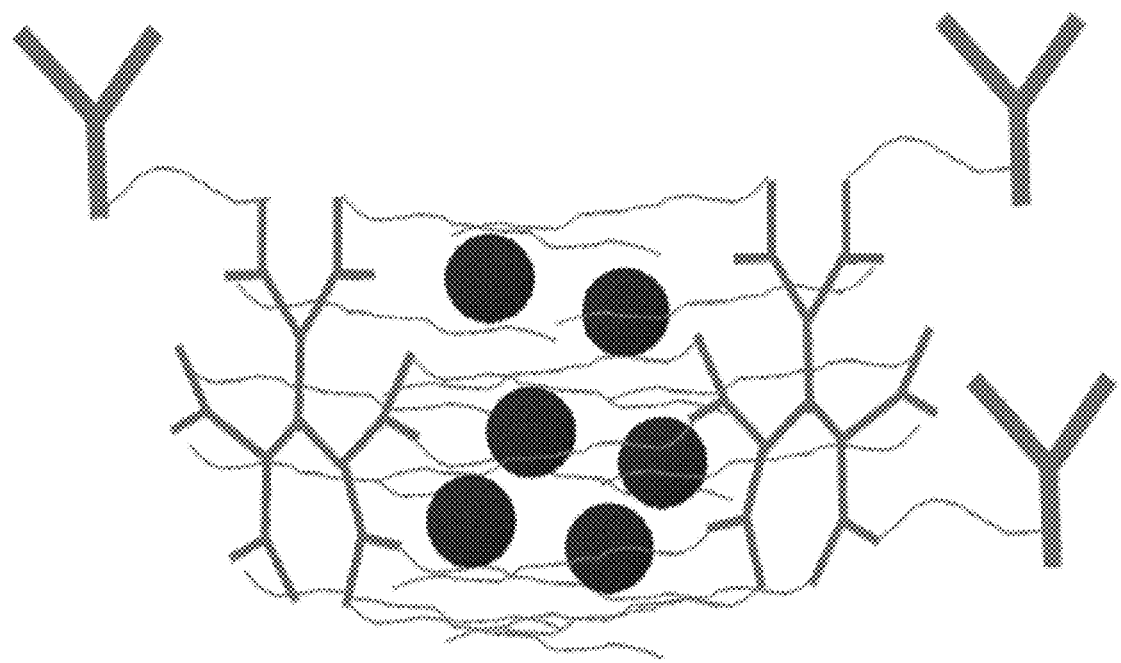
FIG. 10A and FIG. 10B. Schematic examples of various drug-containing nanoparticles (FIG. 10A) SBP and (FIG. 10B) ABP also carrying at least one targeting group or moiety, such as, an antibody, depicted herein and in other figures as a "Y".
Figure 10B:
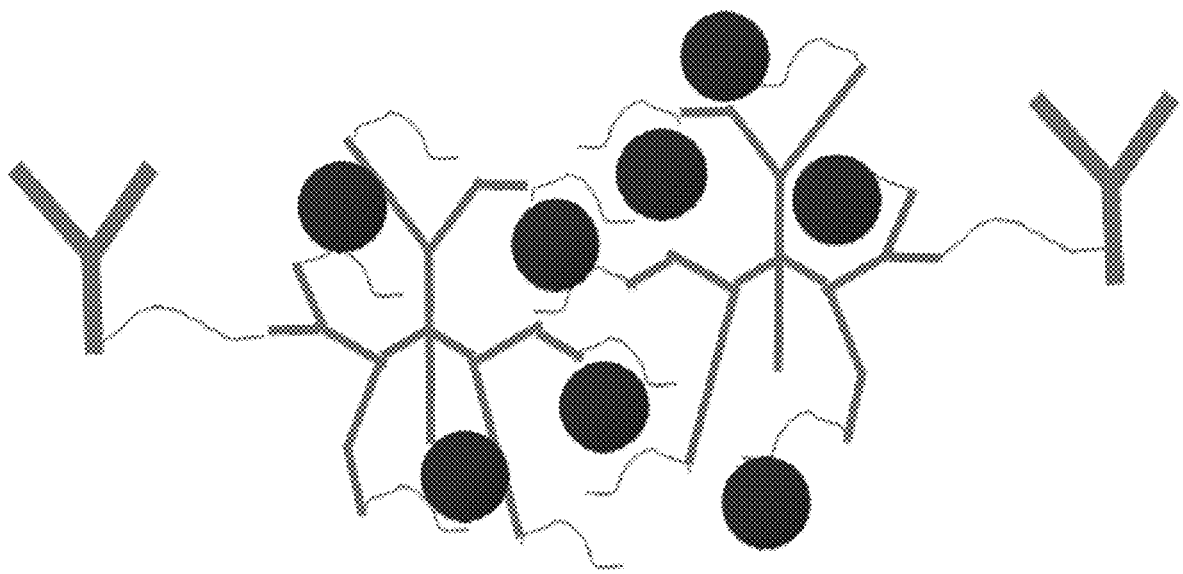

While the introduction of a primary amine group to a hydrophobically-modified branched poly(2-oxazoline) homopolymer enhances drug solubility and produces taxane-induced nanoaggregates (such as shown in FIG. 7A-FIG. 7B, FIG. 8, FIG. 9A-FIG. 9B), the primary amine group also allows the attachment of various targeting groups, such as, an antibody, antigen-binding portion thereof an antigen or a member of a binding pair, such as, to the hydrophobically modified branched poly(2-oxazoline) polymer (FIG. 10A-FIG. 10B). Such nanoaggregates or nanoparticles containing such targeting groups and modifications thereto can provide a targeting ability on the nanoaggregate with a taxane and enable taxane to be released preferentially or solely at desired treatment locations.

As disclosed herein, modified branched polymers (MBP), such as, a hydrophobically-modified homopolymers, including SBP's, ABP's, or a combination thereof, can be used to generate an encapsulating polymer or nanocapsule for solubilizing water insoluble or poorly water soluble taxanes, or for forming taxane-induced nanoparticles with water insoluble or poorly water soluble taxanes, such as, paclitaxel. In an organic solvent environment, the hydrophilic or amphiphilic interior can be poly(2-oxazoline), poly(2-substituted oxazolines), wherein the poly(2-substituted oxazoline) can comprise poly(2-methyloxazoline), poly(2-ethyloxazoline), poly(2-propyloxazoline), poly(2-butyloxazoline), or a combination thereof, PEG, PEO, polyphosphonate and the like. The hydrophobic exterior can comprise aliphatic hydrocarbons (such as, from $C_1$ to about $C_{22}$), aromatic hydrocarbons, polyethylene polymers, polystyrene polymers, perfluoropolymers, polydimethylsiloxanes, polyacrylates, polymethylmethacrylates and the like. In an aqueous environment, the reverse is true. In the drug-induced nanoaggregates in an aqueous environment, the drug molecules such as taxanes are associated with the hydrophobic groups/domains of the MBP's (FIG. 9A-FIG. 9B). The branching density (e.g., from low generation, such as, star and comb homopolymers, to high generation of dendrimers and dendrigrafts), as well as the amount of hydrophobic surface group coverage (e.g., from 0% to 100% coverage) of the branched homopolymers can affect significantly homopolymer solubility, which in turn, also affects the ability to dissolve or to adsorb/absorb a taxane. For example, the increase in branching density and the amount of hydrophobic group coverage will make the homopolymer more compatible with a taxane.

In further examples, the ABP's and SBP's with from about 0.1 to about 30% or more surface hydrophobic component by weight are effective at solubilizing or dispersing poorly water soluble or water insoluble taxanes, such as, paclitaxel. In addition, the branched homopolymers utilized, for example, a PDX, a PEOX, a PMOX, PEO/PEG, polyacrylamides, polyphosphates, PVP's and PVA's are soluble in both water and in various organic solvents, thereby facilitating forming various taxane-containing nanoparticles or nanoaggregates. The good water solubility along with good hydrophobic drug miscibility in an aqueous solution, with or without other organic solvents, makes such homopolymers useful for enhancing the solubility of poorly water soluble taxanes. For example, the homopolymers of interest simplify manufacturing processes and decrease production cost by reducing formulation steps, processing time, as well as the need to use complex and expensive equipment currently used in the pharmaceutical industry. If additional branching densities are needed, the SBP's or ABP's first can be modified with additional groups as described herein, and then, for example, attached with additional hydrophobic functional groups for enhancing taxane solubility.

In one example, the polymer is configured to have effective branching density, amount of hydrophobic groups at the surface of the polymer, or a combination thereof, for encapsulate a taxane that is in water insoluble form in the nanoaggregate. The effective branching density, the amount of hydrophobic groups at the surface of the polymer, or a combination thereof, can be modified as described above and hereafter.

In one example, the polymer can have hydrophobic groups, including aliphatic (e.g., hydrocarbons from $C_1$ to about $C_{22}$) groups, aromatic groups, polyethylene polymers, polystyrene polymers, perfluoropolymers, polydimethylsiloxanes, polyacrylates, polymethylmethacrylates, linked to a PDX polymer including a PEOX polymer and further modified by EDA. The PDX polymer can be a homopolymer polymerized from a repeating unit comprising single monomer or a repeating unit comprising two or more monomers in each repeating unit.

In any of pharmaceutical compositions disclosed above and hereafter, the polyoxazoline can comprise a molar ratio of monomer to initiator in a range of from 50:1 to 80:1.

The polymer can have a pH-dependent change in polymer zeta potential, polymer particle size, polymer charge, polymer charge density, or a combination thereof. The pH-dependent change can be measured in aqueous solutions. The polymer in the pharmaceutical composition disclosed above and hereafter can comprise at least one functional group that has a pH-dependent change in electric charge. In one example, the second terminal group of the polymer can comprise an amine group, an imine group, or a combination thereof. In a further example, the second terminal group can comprise an ethylenediamine (EDA) or a derivative of ethylenediamine. The second terminal group can comprise protonated primary amine, protonated secondary amine, protonated tertiary amine, quaternary ammonium, non-protonated amine including primary amine, secondary amine and tertiary amine, or a combination thereof, in a pH value ranging from about 6 to 10. The second terminal group can comprise protonated primary amine, protonated secondary amine, protonated tertiary amine, quaternary ammonium, or a combination thereof, at one pH; and the second terminal group can comprise protonated amine, non-protonated amine, or a combination thereof, at another pH or a range of pH values. Functional groups having dual pKa values that are significantly different from each other can be particularly suitable as the second terminal group, thereby providing a wide range of polymer charges in a broad range of pH values, including physiological pH. Ethylenediamine (EDA) or a derivative of ethylenediamine can be particularly suitable as a second terminal group due to its dual pKa values, for example, $pKa_1$ 6.84 and $pKa_2$ 9.92. Some examples of EDA modified polymers are shown in FIG. 3 and FIG. 6A. The protonation and charge can be reflected and measured in electrokinetic potential, also known as zeta g) potential. The polymer can have a pH-dependent change in polymer aggregate size. Polymer concentration may also contribute to the pH-dependent change in polymer particle size. The polymer can further have pH-dependent and polymer concentration dependent changes in polymer zeta potential, polymer particle size, polymer charge, polymer charge density, or a combination thereof. Representative examples are described hereafter. The polymer can be dissolved in water or saline to produce a polymer solution that can have a pH in a range of from 8.0 to 11.0 in one example, 8.0 to 10.0 in another example and 8.0 to 9.5 in yet another example. In a particular example, the polymer can be dissolved in water or saline to produce a polymer solution that can have a pH at about 9.0. The nanoaggregate comprising the polymer and at least one bioactive agent can be dissolved in water or saline to produce an aqueous nanoaggregate solution having a pH in a range of from 8.0 to 11.0 in one example, 8.0 to 10.0 in another example and 8.0 to 9.5 in yet another example. In a particular example, the nanoaggregate comprising the polymer and at least one bioactive agent can be dissolved in water or saline to produce an aqueous nanoaggregate solution having a pH at about 9.0.

The pharmaceutical composition can comprise additional polymers selected from ABPs, ABps, MBPs, such as symmetrically branched PAMAM or PPI dendrimers, polyether dendrimers, polyester dendrimers, comb-branched/star-branched polymers, such as, those containing PEO, PEG, PMOX or PEOX, polystyrene, and comb-branched dendrigrafts, such as, those containing PEOX, PMOX, PEI, polylysine (e.g., branched PLL), polyacrylamides, polyphosphates, PVP's, PVA's or a combination thereof. The random asymmetrically branched PEI's can be produced primarily through cationic ring opening polymerization of ring-strained cyclic imine monomers, such as, aziridines (ethyleneimine) and azetidines (propyleneimine), or a combination thereof. The additional polymers can be simply mixed with the nanoaggregate disclosed herein. In one example, one or more additional polymers can be mixed with the nanoaggregate after the nanoaggregate has formed.

The term "bioactive agent" or "bioactive agents" refers to a molecule, a compound, a complex of one or more compounds or molecules, or a combination thereof that can provide a biological activity in vivo, in vitro, or a combination thereof. A bioactive agent can include pharmaceutically active agents (PAAs), such as, the taxanes of interest and other bioactive or inert compounds, can be carried, and include emollients, bleaching agents, antiperspirants, pharmaceuticals, moisturizers, scents, colorants, pigments, dyes, antioxidants, oils, fatty acids, lipids, inorganic salts, organic molecules, opacifiers, vitamins, pharmaceuticals, keratolytic agents, UV blocking agents, tanning accelerators, depigmenting agents, deodorants, perfumes, insect repellants, or a combination thereof.

In any of pharmaceutical compositions disclosed above and hereafter, a bioactive agent can be a taxane selected from paclitaxel, docetaxel, cabazitaxel, larotaxel, milataxel, ortataxel, tesetaxel, or a combination thereof. The taxane can be a taxane salt, a taxane base, a taxane derivative or a combination thereof. If only one bioactive agent is comprised in the pharmaceutical composition, the bioactive agent is water insoluble or poorly water soluble prior to forming the nanoaggregate. The pharmaceutical composition can comprise two or more bioactive agents, wherein at least one of the two or more bioactive agents is water insoluble or poorly water soluble and any of the bioactive agents disclosed above and hereafter can be suitable. The pharmaceutical composition can comprise a taxane selected from any of aforementioned taxane and one or more additional bioactive agents selected from gemcitabine, rapamycin, temozolomide, platinum-based antineoplastic agent, daunorubicin, doxorubicin, epirubicin, mitomycin, methotrexate, fluorouracil, carboplatin, carmustine (bis-chloroethylnitrosourea, also known as BCNU or BiCNU), methyl-CCNU, cisplatin, vinorelbine, capecitabine or a combination thereof. The pharmaceutical composition can comprise two or more bioactive agents in the nanoaggregate. The pharmaceutical composition can comprise at least one water insoluble or poorly water soluble bioactive agent in nanoaggregate and one or more additional bioactive agents that are either included in the nanoaggregate or not included in the nanoaggregate. The pharmaceutical composition can comprise a nanoaggregate comprises a polymer and two or more bioactive agents that each is water insoluble or poorly water soluble. The pharmaceutical composition can comprise a nanoaggregate comprises a polymer and at least one bioactive agent that is water insoluble or poorly water soluble, and one or more additional bioactive agents that each is water soluble. The pharmaceutical composition can comprise a nanoaggregate comprising a taxane and a gemcitabine in one example, a nanoaggregate comprising a taxane and a rapamycin in another example and a nanoaggregate comprising a taxane and a temozolomide in yet another example. The pharmaceutical composition can comprise a gemcitabine and a nanoaggregate comprising a taxane in one example, a rapamycin and a nanoaggregate comprising a taxane in another example, a temozolomide and a nanoaggregate comprising a taxane in yet another example, and a combination of gemcitabine, rapamycin or temozolomide and a nanoaggregate comprising a taxane in yet a further example. In yet a further example, the pharmaceutical composition can comprise a nanoaggregate comprise two or more bioactive agents, such as taxane and one or more bioactive agent selected from gemcitabine, rapamycin, temozolomide, platinum-based antineoplastic agent, daunorubicin, doxorubicin, epirubicin, mitomycin, methotrexate, fluorouracil, carboplatin, carmustine (bis-chloroethylnitrosourea, also known as BCNU or BiCNU), methyl-CCNU, cisplatin, vinorelbine, capecitabine or a combination thereof.

The bioactive agent can be a natural or synthetic small molecule-based drug, inorganic-based drug, biological drug, natural or synthetic large molecule-based drug, modifications and/or derivatives thereof, or a combination thereof, as disclosed herein. The bioactive agent can include a natural or synthetic small molecule-based drug, inorganic-based drug, biological drug, natural or synthetic large molecule-based drug, modifications and/or derivatives thereof, or a combination thereof, wherein at least one drug is poorly water soluble or water insoluble. A drug of interest can be a small molecule, a salt thereof in which the molecule is modified to be water insoluble or poorly water soluble or can be a biological molecule which is modified to be water insoluble or poorly water soluble, particularly when a drug has improved properties, such as improved bioavailability, less toxicity, better pharmacokinetics, or a combination thereof, in a water insoluble or poorly water soluble form. Suitable examples can include drugs which are poorly water soluble or water insoluble or can be modified to be water insoluble or poorly water soluble for an improved property, which include, growth agents, AIDS adjunct agents, alcohol abuse preparations, such as, agents for treating dependence or withdrawal, Alzheimer's Disease treatments, Amyotrophic Lateral Sclerosis treatments, analgesics, anesthetics, anticonvulsants, antidiabetic agents, antidotes, antifibrosis therapies, antihistamines, anti-infective agents, such as, antibiotics, antivirals, antifungals, amebicides, antihelmintics, antimalarials, leprostatics and so on, antineoplastics, antiparkinsonian agents, antirheumatic agents, appetite stimulants, biological response modifiers, biologicals, blood modifiers, such as, anticoagulants, colony stimulating factors, hemostatics, plasma extenders, thrombin inhibitors and so on, bone metabolism regulators, cardioprotective agents, cardiovascular agents, such as, adrenergic blockers, adrenergic stimulators, ACE inhibitors, antiarrhythmics, antilipemic agents, calcium channel blockers, diuretics, vasopressors and so on, CNS stimulants, cholinesterase inhibitors, contraceptives, fertility treatments, ovulation stimulators, cystic fibrosis managements agents, detoxifying agents, diagnostics, dietary supplements, dopamine receptor agonists, endometriosis management agents, enzymes, erectile dysfunction treatments, foot care products, GI agents, such as antacids, antidiarrheals, antiemetics, antiflatulants, bowel evacuants, digestive enzymes, histamine receptor agonists, laxatives, proton pump inhibitors, prostaglandins and so on, Gaucher's Disease treatments, gout treatments, homeopathic remedies, skin treatments, vitamins, nutrients, hormones, hypercalcemia management treatments, hypocalcemia management treatments, immunomodulators, immunosuppressants, levocarnitine deficiency treatments, mast cell stabilizers, migraine treatments, motion sickness products, such as, benadryl and phenergan, decongestants, antihistamines, cough suppressants, multiple sclerosis treatments, muscle relaxants, nasal preparations, such as, antiinflammatories, smoking cessation aids, appetite suppressants, nucleoside analogs, obesity managements, ophthalmic preparations, such as, antibiotics, antiglaucoma agents, artificial tears, lubricants and so on, sexual aids, lubricants, osteoporosis treatments, otic preparations, such as, antiinfectives and cerumenolytics, minerals, oxytocics, parasympatholytics, parasympathomimetics, patent ductus arteriosus agents, phosphate binders, porphyria agents, prostaglandins, psychotherapeutic agents, radiopaque agents, respiratory agents, such as, antiinflammatories, antitussives, bronchodilators, decongestants, expectorants, leukotrienes antagonists, surfactants and so on, salt substitutes, sedatives, hypnotics, skin and mucous membrane preparations, such as, acne treatments, anorectal treatments, such as, hemorrhoid treatments and enemas, antiperspirants, antipruritics, antipsoriatic agents, antiseborrheic agents, burn treatments, cleansing agents, depigmenting agents, emollients, hair growth retardants, hair growth stimulators, keratolytics, hair problem treatments, mouth and throat problem treatments, photosensitizing agents, wart treatments, wound care treatments and so on, over the counter pharmaceutics and products, such as, deodorants, Tourette's Syndrome agents, tremor treatments, urinary tract agents, such as, acidifiers, alkalinizers, antispasmodics, benign prostatic hyperplasia treatments, calcium oxalate stone preventors, enuresis management agents and so on, vaginal preparations, such as, antiinfectives, hormones and so on, vasodilators, vertigo treatments, Wilson's Disease treatments and so on.

The immunosuppressant, also known as immunosuppressive drug or immunosuppressive agent, can comprise corticosteroids comprising prednisone (Deltasone, Orasone), budesonide (Entocort EC) or prednisolone (Millipred); calcineurin inhibitors comprising cyclosporine (Neoral, Sandimmune, SangCya) or tacrolimus (Astagraf XL, Envarsus XR, Prograf); mTOR inhibitors comprising sirolimus (Rapamune, Rapamycin) or everolimus (Afinitor, Zortress); IMDH inhibitors comprising azathioprine (Azasan, Imuran), leflunomide (Arava) or mycophenolate (CellCept, Myfortic); biological drugs including monoclonal antibodies comprising abatacept (Orencia), adalimumab (Hum ira), anakinra (Kineret), certolizumab (Cimzia), etanercept (Enbrel), golimumab (Simponi), infliximab (Remicade), ixekizumab (Taltz), natalizumab (Tysabri), rituximab (Rituxan), secukinumab (Cosentyx), tocilizumab (Actemra), ustekinumab (Stelara), vedolizumab (Entyvio), basiliximab (Simulect), daclizumab (Zinbryta) or muromonab (Orthoclone OKT3).

Further examples of bioactive agent can include forms of drugs which may be modified, for example, as salts, ionized or hydrophilic forms that can be modified to remove such functional groups, modifications and the like to yield non-modified or other forms of bioactive agents which are poorly water soluble or water insoluble. If two or more bioactive agents are comprised in the pharmaceutical composition, at least one of the bioactive agents is or has been modified to be water insoluble or poorly water soluble. Examples of such bioactive agents can include, analgesics/antipyretics (e.g., aspirin, acetaminophen, ibuprofen, naproxen sodium, buprenorphine hydrochloride, propoxyphene hydrochloride, propoxyphene napsylate, meperidine hydrochloride, hydromorphone hydrochloride, morphine sulfate, oxycodone hydrochloride, codeine phosphate, dihydrocodeine bitartrate, pentazocine hydrochloride, hydrocodone bitartrate, levorphanol tartrate, diflunisal, trolamine salicylate, nalbuphine hydrochloride, mefenamic acid, butorphanol tartrate, choline salicylate, butalbital, phenyltoloxamine citrate, diphenhydramine citrate, methotrimeprazine, cinnamedrine hydrochloride, meprobamate and the like); anesthetics (e.g., cyclopropane, enflurane, halothane, isoflurane, methoxyflurane, nitrous oxide, propofol and the like); antiasthmatics (e.g., azelastine, ketotifen, traxanox, amlexanox, cromolyn, ibudilast, montelukast, nedocromil, oxatomide, pranlukast, seratrodast, suplatast tosylate, tiaramide, zafirlukast, zileuton, beclomethasone, budesonide, dexamethasone, flunisolide, triamcinolone acetonide and the like); antibiotics (e.g., neomycin, streptomycin, chloramphenicol, cephalosporin, ampicillin, penicillin, tetracycline and the like); antidepressants (e.g., nefopam, oxypertine, doxepin hydrochloride, amoxapine, trazodone hydrochloride, am itriptyline hydrochloride, maprotiline hydrochloride, phenelzine sulfate, desipramine hydrochloride, nortriptyline hydrochloride, tranylcypromine sulfate, fluoxetine hydrochloride, doxepin hydrochloride, imipramine hydrochloride, imipramine pamoate, nortriptyline, amitriptyline hydrochloride, isocarboxazid, trimipramine maleate, protriptyline hydrochloride and the like); antidiabetics (e.g., biguanides, hormones, sulfonylurea derivatives, and the like); antifungal agents (e.g., griseofulvin, ketoconazole, amphotericin B, nystatin, candicidin and the like); antihypertensive agents (e.g., propanolol, propafenone, oxyprenolol, nifedipine, reserpine, trimethaphan camsylate, phenoxybenzamine hydrochloride, pargyline hydrochloride, deserpidine, diazoxide, guanethidine monosulfate, minoxidil, rescinnamine, sodium nitroprusside, rauwolfia serpentina, alseroxylon, phentolamine mesylate, reserpine and the like); antiinflammatories (e.g., non-steroidal compounds, such as, indomethacin, naproxen, ibuprofen, ramifenazone, piroxicam and so on, and steroidal compounds, such as, cortisone, dexamethasone, fluazacort, hydrocortisone, prednisolone, prednisone and the like); antineoplastics (e.g., adriamycin, cyclophosphamide, actinomycin, bleomycin, daunorubicin, doxorubicin, epirubicin, gemcitabine, mitomycin, methotrexate, fluorouracil, carboplatin, carmustine (BCNU), methyl-CCNU, cisplatin, etoposide, interferons, camptothecin and derivatives thereof, phenesterine, Taxol and derivatives thereof, taxotere and derivatives thereof, vinblastine, vincristine, tamoxifen, etoposide, piposulfan and the like); antianxiety agents (e.g., lorazepam, buspirone hydrochloride, prazepam, chlordiazepoxide hydrochloride, oxazepam, clorazepate dipotassium, diazepam, hydroxyzine pamoate, hydroxyzine hydrochloride, alprazolam, droperidol, halazepam, chlormezanone, dantrolene and the like); immunosuppressive agents (e.g., cyclosporine, azathioprine, mizoribine, FK506 (tacrolimus), rapamycin and the like); antimigraine agents (e.g., ergotamine tartrate, propanolol hydrochloride, isometheptene mucate, dichloralphenazone and the like); sedatives/hypnotics (e.g., barbiturates (e.g., pentobarbital, pentobarbital sodium, secobarbital sodium and the like) or benzodiazapines (e.g., flurazepam hydrochloride, triazolam, tomazeparm, midazolam hydrochloride and the like); antianginal agents (e.g., beta-adrenergic blockers, calcium channel blockers (e.g., nifedipine, diltiazem hydrochloride and the like) and nitrates (e.g., nitroglycerin, isosorbide dinitrate, pentaerythritol tetranitrate, erythrityl tetranitrate and the like)); antipsychotic agents (e.g., haloperidol, loxapine succinate, loxapine hydrochloride, thioridazine, thioridazine hydrochloride, thiothixene, fluphenazine hydrochloride, fluphenazine decanoate, fluphenazine enanthate, trifluoperazine hydrochloride, chlorpromazine hydrochloride, perphenazine, lithium citrate, prochlorperazine and the like); antimanic agents (e.g., lithium carbonate); antiarrhythmics (e.g., bretylium tosylate, esmolol hydrochloride, verapamil hydrochloride, amiodarone, encamide hydrochloride, digoxin, digitoxin, mexiletine hydrochloride, disopyramide phosphate, procainamide hydrochloride, quinidine sulfate, quinidine gluconate, quinidine polygalacturonate, flecamide acetate, tocamide hydrochloride, lidocaine hydrochloride and the like); antiarthritic agents (e.g., phenylbutazone, sulindac, penicillamine, salsalate, piroxicam, azathioprine, indomethacin, meclofenamate sodium, gold sodium thiomalate, ketoprofen, auranofin, aurothioglucose, tolmetin sodium and the like); antigout agents (e.g., colchicine, allopurinol and the like); anticoagulants (e.g., heparin, heparin sodium, warfarin sodium and the like); thrombolytic agents (e.g., urokinase, streptokinase, altoplase and the like); antifibrinolytic agents (e.g., aminocaproic acid); hemorheologic agents (e.g., pentoxifylline); antiplatelet agents (e.g., aspirin, empirin, ascriptin and the like); anticonvulsants (e.g., valproic acid, divalproate sodium, phenyloin, phenyloin sodium, clonazepam, prim idone, phenobarbitol, phenobarbitol sodium, carbamazepine, amobarbital sodium, methsuximide, metharbital, mephobarbital, mephenyloin, phensuximide, paramethadione, ethotoin, phenacemide, secobarbitol sodium, clorazepate dipotassium, trimethadione and the like); antiparkinson agents (e.g., ethosuximide and the like); antihistamines/antipruritics (e.g., hydroxyzine hydrochloride, diphenhydramine hydrochloride, chlorpheniramine maleate, brompheniramine maleate, cyproheptadine hydrochloride, terfenadine, clemastine fumarate, triprolidine hydrochloride, carbinoxamine maleate, diphenylpyraline hydrochloride, phenindamine tartrate, azatadine maleate, tripelennamine hydrochloride, dexchlorpheniramine maleate, methdilazine hydrochloride, trimprazine tartrate and the like); agents useful for calcium regulation (e.g., calcitonin, parathyroid hormone and the like); antibacterial agents (e.g., am ikacin sulfate, aztreonam, chloramphenicol, chloramphenicol palm itate, chloramphenicol sodium succinate, ciprofloxacin hydrochloride, clindamycin hydrochloride, clindamycin palm itate, clindamycin phosphate, metronidazole, metronidazole hydrochloride, gentamicin sulfate, lincomycin hydrochloride, tobramycin sulfate, vancomycin hydrochloride, polymyxin B sulfate, colistimethate sodium, colistin sulfate and the like); antiviral agents (e.g., interferon 7, zidovudine, amantadine hydrochloride, ribavirin, acyclovir and the like); antimicrobials (e.g., cephalosporins (e.g., cefazolin sodium, cephradine, cefaclor, cephapirin sodium, ceftizoxime sodium, cefoperazone sodium, cefotetan disodium, cefutoxime azotil, cefotaxime sodium, cefadroxil monohydrate, ceftazidime, cephalexin, cephalothin sodium, cephalexin hydrochloride monohydrate, cefamandole nafate, cefoxitin sodium, cefonicid sodium, ceforanide, ceftriaxone sodium, ceftazidime, cefadroxil, cephradine, cefuroxime sodium and the like), penicillins (e.g., ampicillin, amoxicillin, penicillin G benzathine, cyclacillin, ampicillin sodium, penicillin G K, penicillin V K, piperacillin sodium, oxacillin sodium, bacampicillin hydrochloride, cloxacillin sodium, ticarcillin disodium, azlocillin sodium, carbenicillin indanyl sodium, penicillin G procaine, methicillin sodium, nafcillin sodium and the like), erythromycins (e.g., erythromycin ethylsuccinate, erythromycin, erythromycin estolate, erythromycin lactobionate, erythromycin stearate, erythromycin ethylsuccinate and the like), tetracyclines (e.g., tetracycline hydrochloride, doxycycline hyclate, minocycline hydrochloride and the like), and the like); antiinfectives (e.g., GM-CSF); bronchodilators (e.g., sympathomimetics (e.g., epinephrine hydrochloride, metaproterenol sulfate, terbutaline sulfate, isoetharine, isoetharine mesylate, isoetharine hydrochloride, albuterol sulfate, albuterol, bitolterol, mesylate isoproterenol hydrochloride, terbutaline sulfate, epinephrine bitartrate, metaproterenol sulfate, epinephrine, epinephrine bitartrate); anticholinergic agents (e.g., ipratropium bromide); xanthines (e.g., aminophylline, dyphylline, metaproterenol sulfate, aminophylline); mast cell stabilizers (e.g., cromolyn sodium); inhalant corticosteroids (e.g., flunisolide, beclomethasone dipropionate monohydrate and the like), salbutamol, beclomethasone dipropionate (BDP), ipratropium bromide, budesonide, ketotifen, salmeterol, xinafoate, terbutaline sulfate, triamcinolone, theophylline, nedocromil sodium, metaproterenol sulfate, albuterol, flunisolide and the like); hormones (e.g., androgens (e.g., danazol, testosterone cypionate, fluoxymesterone, ethyltostosterone, testosterone enanthate, methyltestosterone, fluoxymesterone, testosterone cypionate and the like); estrogens (e.g., estradiol, estropipate, conjugated estrogens and the like), progestins (e.g., methoxyprogesterone acetate, norethindrone acetate and the like), corticosteroids (e.g., triamcinolone, betamethasone, betamethasone sodium phosphate, dexamethasone, dexamethasone sodium phosphate, dexamethasone acetate, prednisone, methylprednisolone acetate suspension, triamcinolone acetonide, methylprednisolone, prednisolone sodium phosphate methylprednisolone sodium succinate, hydrocortisone sodium succinate, methylprednisolone sodium succinate, triamcinolone hexacatonide, hydrocortisone, hydrocortisone cypionate, prednisolone, fluorocortisone acetate, paramethasone acetate, prednisolone tebulate, prednisolone acetate, prednisolone sodium phosphate, hydrocortisone sodium succinate and the like), thyroid hormones (e.g., levothyroxine sodium); and the like); and the like; hypoglycemic agents (e.g., human insulin, purified beef insulin, purified pork insulin, glyburide, chlorpropamide, glipizide, tolbutamide, tolazamide and the like); hypolipidemic agents (e.g., clofibrate, dextrothyroxine sodium, probucol, lovastatin, niacin and the like); proteins (e.g., DNase, alginase, superoxide dismutase, lipase and the like); nucleic acids (e.g., sense or anti-sense nucleic acids encoding any therapeutically useful protein, including any of the proteins described herein and the like); agents useful for erythropoiesis (e.g., erythropoietin); antiulcer or antireflux agents (e.g., famotidine, cimetidine, ranitidine hydrochloride and the like); antinauseants or antiemetics (e.g., meclizine hydrochloride, nabilone, prochlorperazine, dimenhydrinate, promethazine hydrochloride, thiethylperazine, scopolamine and the like); oil-soluble vitamins (e.g., vitamins A, D, E, K and the like); and as well as other drugs such as mitotane, visadine, halonitrosoureas, anthrocyclines, ellipticine and the like, and a combination thereof.

The term "a combination thereof" used for a combination of the bioactive agents disclosed above means a combination of two or more bioactive agents, wherein such combination does not have undesired effect, such as an undesired interaction between or among the bioactive agents. It is understood that some of combinations of the bioactive agents may not be suitable, or may not be desirable, such as those having undesired interactions. For example, a combination of theophylline and ciprofloxacin or warfarin and diflunisal may not be suitable. These combinations or any combinations determined by appropriate guidelines or regulations as not suitable are thus excluded.

The pharmaceutical compositions of this invention disclosed herein can comprise paclitaxel in a range of from 2 mg/ml to 8 mg/ml in an aqueous solution that is free from human serum albumin, organic solvent, detergent, oil or free acid. Paclitaxel itself is insoluble in water. A pharmaceutical composition of this invention can comprise paclitaxel in a range of from 2 mg/ml to 8 mg/ml in one example, 2 mg/ml to 7 mg/ml in another example, 2 mg/ml to 6 mg/ml in yet another example, 3 mg/ml to 8 mg/ml in yet another example, 3 mg/ml to 6 mg/ml in yet another example or 3 mg/ml to 5 mg/ml in yet another example, in an aqueous solution that is free from human serum albumin, organic solvent, detergent, oil or free acid.

One advantage of the instant invention disclosed herein is that the pharmaceutical composition is in aqueous solution having a pH value in a range of from about 7.1 to 10.0, preferred in 7.6 to 10.0, and even preferred in 7.9 to 10.0, even though the bioactive agent is water insoluble or poorly water soluble prior to forming the nanoaggregate. Further, the pharmaceutical composition is free from organic solvent, detergent, oil or free acid, unlike other taxane products currently available, such as Taxol® (paclitaxel) that needs to be solubilized with Cremophor EL (polyethylated castor oil: CrEL) and ethanol, docetaxel that needs polysorbate 80 (Tween 80) and ethanol, and cabazitaxel that needs polysorbate 80, ethanol and citric acid.

The nanoaggregate can be of a size in a range of from about 50 nm to about 100 nm before lyophilization. In a further example, the nanoaggregate can be of a size in a range of from about from 70 to 90 nm before lyophilization.

In a pharmaceutical composition of this invention, the salt component can comprise sodium bicarbonate. The pharmaceutical composition can comprise in a range of from 0.01% to 10% of sodium bicarbonate, percentage based on the total weight of the pharmaceutical composition. The sodium bicarbonate solution can comprise 0.15% sodium bicarbonate and 0.9% sodium chloride solution in water. The sodium bicarbonate solution can comprise about 0.01% to 0.19% in one example, 0.1% to 0.19% in one example, 0.1% to 0.18% in another example, 0.1% to 0.15% in yet another example, 0.12% to 0.19% in yet another example, 0.12% to 0.18% in yet another example, 0.12% to 0.16% in a further example, 4.2% in yet an example, 5% in a further example, 7.5% in an even further example, and 8.4% in a yet another example, of sodium bicarbonate, with or without sodium chloride. All percentages are based on the total weight of the pharmaceutical composition. The term "drug" used herein can be one or more of the bioactive agents disclosed herein. In one example, the drug can be a taxane, such as paclitaxel.

The term "polymer" refers to any polymer suitable for this invention as defined above and hereafter. In examples, a polymer can comprise polyoxazoline or modified polyoxazoline as disclosed herein. In further examples, the polymer can comprise a modified polyoxazoline can comprise one or more second terminal groups, such as an —$NH_2$, —NH, —$NH_3^+$, other basic groups or a combination thereof. In further examples, a polymer can be dissolved in water, saline or sodium bicarbonate (such as a solution comprising to 10% sodium bicarbonate) to produce a polymer solution that can have a pH value in a range of from 8.0 to about 11. Addition of an acid into a solution comprising the polymer and having a pH value from 8.0 to 11 can form a salt of the acid. A pharmaceutical composition of this invention can comprise a combination of sodium bicarbonate and a salt the acid disclosed above and hereafter. A pharmaceutical composition of this invention is free from free acid.

In any of the pharmaceutical compositions disclosed above and hereafter, the nanoaggregate can have a weight ratio of polymer to bioactive agent in a range of from about 2:1 to about 20:1. The nanoaggregate can have a weight ratio of the polymer to the bioactive agent in a range of from about 2:1 to about 20:1 in one example, about 2:1 to about 15:1 in another example, about 2:1 to about 10:1 in yet another example, about 2:1 to about 8:1 in yet another example, about 5:1 to about 10:1 in yet another example, about 5:1 to about 8:1 in yet another example, about 6:1 to about 8:1 in yet another example and 7:1 in yet a further example. When pharmaceutical composition comprises two or more bioactive agents, the ratio of polymer to bioactive agent can be based on the total weight of polymer and the bioactive agents.

In some cases, the pharmaceutical composition can consist of:
a salt component consisting essentially of sodium bicarbonate;
a nanoaggregate comprising a polymer and at least one bioactive agent, wherein the salt component and the nanoaggregate are mixed in an aqueous solution; and
a pharmaceutical suitable carrier;
wherein the polymer is water soluble and comprises at least one first terminal group modified with a hydrophobic moiety and a second terminal group modified with a hydrophilic moiety;
wherein the bioactive agent is water insoluble or poorly water soluble prior to forming the nanoaggregate; and
wherein the pharmaceutical composition has a pH value in a range of from about 7.1 to about 10.

In some cases, the pharmaceutical composition can consist of:
a salt component consisting essentially of sodium bicarbonate;
a nanoaggregate consisting of a polymer and one bioactive agent,
wherein the salt component and the nanoaggregate are mixed in an aqueous solution; and
a pharmaceutical suitable carrier;
wherein the polymer is water soluble and comprises at least one first terminal group modified with a hydrophobic moiety and a second terminal group modified with a hydrophilic moiety;
wherein the bioactive agent is water insoluble or poorly water soluble prior to forming the nanoaggregate; and
wherein the pharmaceutical composition has a pH value in a range of from about 7.1 to about 10.

Sodium bicarbonate, nanoaggregate, carrier, polymer and bioactive agent disclosed herein can be suitable. The term "salt component consisting essentially of sodium bicarbonate" means a solution or a solid that contains sodium bicarbonate that can have water or minor impurities. The term "minor impurities" or "minor impurity" means the impurity is less than 5% in one example, less than 1% in another example, less than 0.1% in yet another example, and less 0.001% in yet another example, of the salt component, percentages based on the total weight of the salt component.

In some cases, the pharmaceutical composition disclosed herein can be free from surfactant, long chain fatty acids, lipids, phosphate, polyphosphate, or a combination thereof. In some cases, the pharmaceutical composition disclosed herein can be free from polyphosphate.

In some cases, the pharmaceutical composition comprising sodium bicarbonate as disclosed herein can provide at least 30% increase in plasma concentrations of the bioactive agent in vivo within 2-4 hours after administration of the pharmaceutical composition compared to that of a control pharmaceutical composition comprising the same bioactive agent without sodium bicarbonate, i.e., free from sodium bicarbonate. In some cases, the pharmaceutical composition comprising sodium bicarbonate as disclosed herein can provide at least 10% decrease in accumulation of the bioactive agent in kidney in vivo within 2-4 hours after administration of the pharmaceutical composition compared to that of a control pharmaceutical composition comprising the same bioactive agent free from sodium bicarbonate. In some cases, the pharmaceutical composition comprising sodium bicarbonate as disclosed can provide at least 30% increase in accumulation of the bioactive agent in tumor cells in vivo within 2-4 hours after administration of the pharmaceutical composition compared to that of a control pharmaceutical composition comprising the same bioactive agent free from sodium bicarbonate. The term "control pharmaceutical composition" used herein throughout this disclosure refers to a pharmaceutical composition having same all other ingredients except sodium bicarbonate, i.e., free from sodium bicarbonate.

Figure 18A:
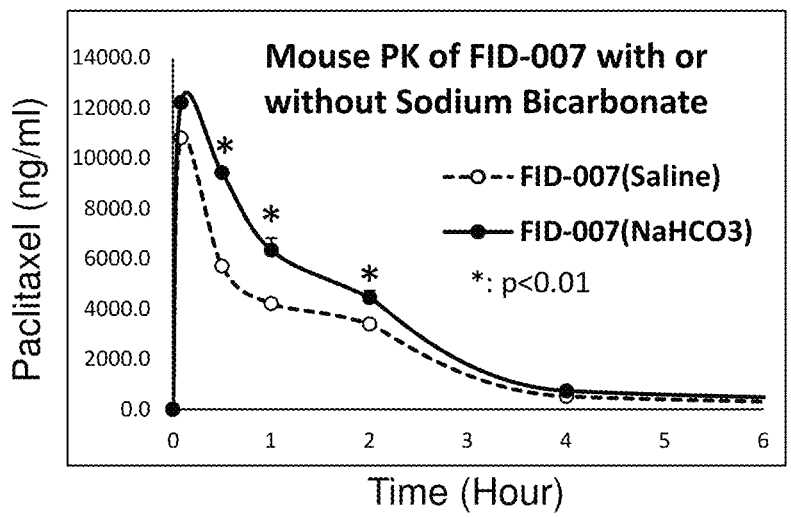
FIG. 18A-FIG. 18E. Effect of sodium bicarbonate on pharmacokinetics and biodistributions of (FIG. 18A) FID-007, (FIG. 18B) Abraxane and (FIG. 18C) Taxol. The solid line and solid circle represent the PKs in the presence of sodium bicarbonate. The dashed line and open circle represent the PKs in the absence of sodium bicarbonate.
Figure 18B:
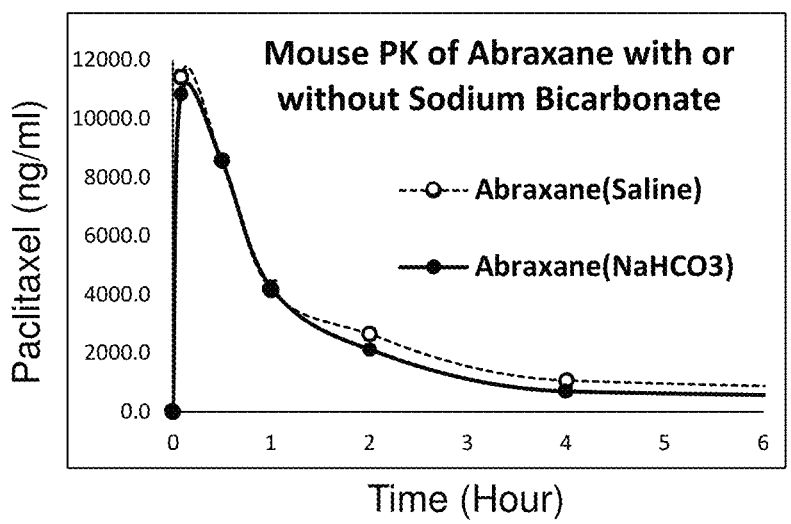
Figure 18C:
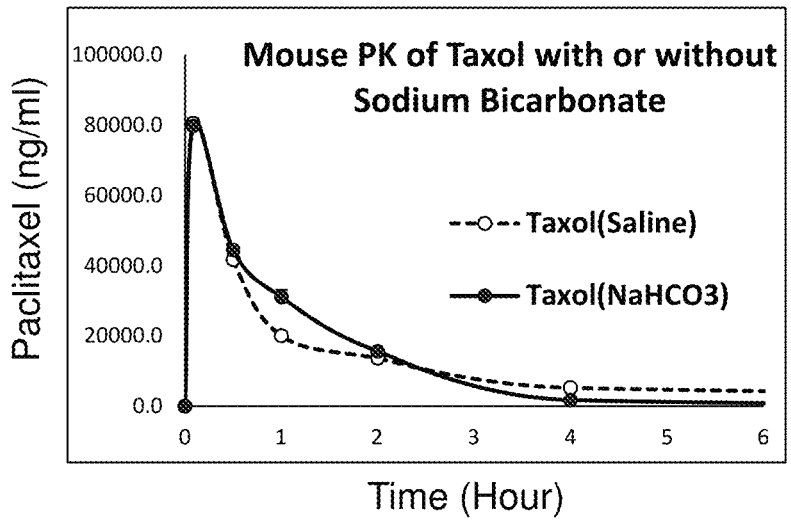

In some cases, the pharmaceutical composition comprising sodium bicarbonate as disclosed herein, for example, FID-007-SB, can provide at least 30% increase in plasma paclitaxel concentrations in vivo within 2-4 hours after administration of the pharmaceutical composition compared to that of FID-007 in saline (free from sodium bicarbonate). In some cases, the pharmaceutical composition can provide at least 50% in one example, at least 60% in another example, at least 65% in yet another example, increase in plasma paclitaxel concentrations in vivo within 2-4 hours after administration, compared to that of FID-007 in saline free from sodium bicarbonate. In some cases, the pharmaceutical composition can provide at least 30% in one example, 50% in another example, at least 60% in yet another example, and at least 65% in yet another example, increase in plasma paclitaxel concentrations in vivo within 0.5 to 2 hours after administration, compared to that of FID-007 in saline (free from sodium bicarbonate). Traditional pharmaceutical compositions comprising paclitaxel without sodium bicarbonate, for example, Abraxane and Taxol, fail to show such increase in plasma paclitaxel concentrations in vivo (FIG. 18A-FIG. 18C).

Not wishing to be bound by a particular theory or mechanism, Applicant believes that the nanoaggregate comprising the polymer and at least one bioactive agent disclosed herein provides improved release of the bioactive agent in vivo, reduced kidney accumulation, increased tumor accumulation, and a combination thereof, in the presence of sodium bicarbonate in vivo.

In any of the pharmaceutical composition disclosed above and hereafter, the nanoaggregate can further comprise a targeting moiety or a targeting agent comprises an antibody, an antigen-binding portion thereof, an antigen, a cell receptor, a cell receptor ligand, a ligand for a cellular protein, a ligand for a membrane protein, a small molecule ligand, a lectin ligand, or a combination thereof.

The targeting agent can be covalently linked to the polymer, non-covalently affixed to the polymer, or a combination thereof. The targeting agent can also be covalently or non-covalently linked to the bioactive agent.

The nanoaggregate of the pharmaceutical composition disclosed above and hereafter can be free from human serum albumin, organic solvent, detergent, oil or free acid. In a further example, the pharmaceutical composition can be free from human serum albumin, organic solvent, detergent, oil or free acid.

The pharmaceutical composition disclosed above and hereafter can further comprise an additional taxane that is formulated free from the polymer, specifically the polymer disclosed herein. The phrase "additional taxane that is formulated free from the polymer" refers to a taxane formulation that comprises a taxane and is free from the polymer disclosed herein, wherein the additional taxane can be a taxane salt, taxane base, taxane formulated with organic solvent, detergent, oil or free acid, protein, lipid or a combination thereof. In one particular example, the additional taxane is free from the polyoxazoline (PEOX) polymer disclosed herein. The pharmaceutical composition can comprise an additional taxane formulated with human serum albumin in one example, taxane formulated with ethanol or Cremaphor® (polyethyoxylated castor oil) in another example, taxane modified with acid, ammonium, alkyls, or aryls in yet another example, taxane formulated in a lipid in yet another example, taxane formulated in a cationic lipid in yet another example, and a combination thereof in a further example. Commercially available taxane formulations, such as Abraxane® available from Celgene under respective trademark and Taxol® available from Bristol-Myers Squibb under respective trademark can be suitable. The pharmaceutical composition can further comprise Abraxane in one embodiment, Taxol in another embodiment, and a combination of Abraxane and Taxol in yet another embodiment. The pharmaceutical composition can comprise a nanoaggregate taxane to an additional taxane that is formulated free from the polymer in a weight ratio in a range of from 0.1:1 to 10:1, wherein the ratio is based on the weight of taxanes.

The pharmaceutical composition disclosed herein can be a cancer treatment drug for treating one or more cancers. The term "cancer" or "cancers" used herein refers to cancer or tumor and can include malignant tumors and benign tumors such as solid tumors and cancers of the blood, such as leukemias. Malignant tumors can spread into, or invade, nearby tissues. In addition, as these tumors grow, some cancer cells can break off and travel to distant places in the body through the blood or the lymph system and form new tumors (metastatic tumor) far from the original tumor (primary cancer). A cancer can include a primary cancer or a metastatic tumor. The pharmaceutical composition disclosed herein can be a cancer treatment drug for treating acoustic neuroma, adenocarcinoma, brainstem glioma, mixed gliomas, basal cell carcinoma, bile duct carcinoma, bladder carcinoma, breast cancer, bronchogenic carcinoma, cervical cancer, choriocarcinoma, colon carcinoma, colon cancer, ependymoma, gastric cancers, germinoma, glioblastoma astrocytoma, head and neck cancers, hemangioblastoma, hepatocellular carcinoma, hepatoma, lung cancers, NSCLC (Non-Small Cell Lung Cancer), lymphoid malignancy, medullary carcinoma, medullary thyroid carcinoma, medulloblastoma, melanoma, menangioma, neuroblastoma, oligodendroglioma, ovarian cancer, pancreatic cancer, papillary adenocarcinomas, papillary carcinoma, papillary thyroid carcinoma, pheochromocytomas, sebaceous gland carcinoma, pinealoma, prostate cancer, renal cell carcinoma, retinoblastoma and brain metastases, Schwannoma craniopharyogioma, sem inoma, squamous cell carcinoma, sweat gland carcinoma, testicular tumor, other known tumors and tumors that are subsequently identified or diagnosed, one or more metastatic tumors derived therefrom, or a combination thereof. In one example, the pharmaceutical composition disclosed herein can be a cancer treatment drug for treating one or more breast cancers, ovarian cancers, lung cancers, NSCLC (Non-Small Cell Lung Cancer), colon cancers, gastric cancers, melanoma, head and neck cancers, pancreatic cancers, one or more metastatic cancers derived therefrom, other cancers disclosed above and hereafter, or a combination thereof.

In any of the pharmaceutical composition disclosed above and hereafter, the nanoaggregate can have a filtration rating through a 0.22 µm filter in a range of from 50 to 100 percent. The filtration rating can be expressed as $R_f$ and is defined in detail in latter sections of this application.

In embodiments, the nanoaggregate can have a filtration rating at least 50%, at least 60%, at least 70%, at least 80%, at least 90% or more; or in a range of 50-100%, 55-100%, 60-100%, 65-100%, 70-100%, 75-100%, 80-100%, 85-100%, 90-100%, 95-100%, 55-95%, 65-95%, 75-95%, 85-95%, 50-95%, 60-95%, 70-95%, 80-95%, 90-95%, 50-90%, 60-90%, 70-90%, 80-90%, 65-90%, 75-90%, 85-90%; or, in any rating, must be 50% or greater.

This invention is also directed to a method for delivering one or more bioactive agents to a subject in need thereof.

The method can comprise forming a nanoaggregate comprising a polymer that has a pH-dependent change in polymer zeta potential, polymer particle size, polymer charge, polymer charge density, or a combination thereof, and at least one bioactive agent; and delivering the nanoaggregate to the subject. Polymers disclosed above and hereafter including symmetrically branched polymers (SBP), asymmetrically branched polymers (ABP), hydrophobically-modified SBPs or ABPs, modified branched polymers (MBP), dendrimers, or a combination thereof, can be suitable. The polymer can be water soluble and comprise at least one first terminal group modified with a hydrophobic moiety and a second terminal group modified with a hydrophilic moiety, as disclosed in this application. The polymer can comprise polyethyleneimine (PEI), polypropyleneimine (PPI), polyamidoamine (PAMAM), polyoxazoline (PDX), or a combination thereof. Aforementioned polyethyleneimine (PEI), polypropyleneimine (PPI), polyamidoamine (PAMAM) and polyoxazoline (PDX) can be suitable. The polyoxazoline can comprise poly(2-oxazoline) (PDX), a poly(2-substituted oxazoline) or a combination thereof, wherein the poly(2-substituted oxazoline) comprises poly(2-methyloxazoline), poly(2-ethyloxazoline) (PEOX), poly(2-propyloxazoline), poly(2-butyloxazoline), or a combination thereof. The second terminal group can be modified with ethylenediamine (EDA) or a derivative of ethylenediamine. A PDX, a PEOX or a modified PEOX can be suitable. Polymer comprising PDX, PEOX and PEOX modified with ethylenediamine (EDA) or a derivative of ethylenediamine can be particularly suitable. Any of the bioactive agent disclosed herein or a combination thereof can be suitable. The water insoluble or poorly water soluble bioactive agent or a combination thereof can be suitable. In one example, the bioactive agent is paclitaxel. One advantage of the method of this invention is the reduction of toxicity and increase bioavailability, such as those disclose herein. The method of this invention disclosed herein can further comprise the step of configuring the nanoaggregate to have a pH value in a range of from about 6.5 to about 10. In examples, the pharmaceutical composition can have a pH in a range of from 6.5 to 10.0, 6.9 to 10.0, 7.0 to 10.0, 7.1 to 10.0, 7.2 to 10.0, 7.3 to 10.0, 7.4 to 10.0, or 7.5 to 10.0. In further examples, the pharmaceutical composition can have a pH in a range of from 7.1 to 10.0, 7.1 to 9.5, 7.2 to 9.5, 7.3 to 9.5, 7.4 to 9.5, or 7.5 to 9.5. In yet further examples, the pharmaceutical composition can have a pH in a range of from 7.6 to 10.0, 7.6 to 9.5, 7.6 to 9.0, 7.6 to 8.5, 7.6 to 8.0 or 7.6 to 7.9. In even further examples, the pharmaceutical composition can have a pH in a range of from 7.8 to 10.0, 7.8 to 9.5, 7.8 to 9.0, 7.8 to 8.5, 7.9 to 9.5, 7.9 to 8.5, or 7.9 to 8.2. In a particular example, the method of this invention disclosed herein can comprise the step of configuring the nanoaggregate to have a pH value in a range of from about 7.1 to about 10. In further examples, the method of this invention disclosed herein can comprise the step of configuring the nanoaggregate to have a pH value in a range of from about 7.1 to about 8.9. In even further examples, the method of this invention disclosed herein can comprise the step of configuring the nanoaggregate to have a pH value in a range of from about 7.6 to about 8.9.

The method can further comprise administering an aqueous basic solution, an oral basic agent, or a combination thereof, to the subject, wherein the aqueous basic solution comprises in a range of from 0.01% to 10% of sodium bicarbonate, percentage based on the total weight of the aqueous basic solution, and can have a pH value in a range of from 7.1 to 10.0. The aqueous basic solution can have a pH value in a range of from 7.1 to 10.0, 7.1 to 9.5, 7.1 to 9.0 or 7.1 to 8.5. In examples, the aqueous basic solution can have a pH value in a range of from 7.6 to 10.0, 7.6 to 9.5, 7.6 to 9.0 or 7.6 to 8.5. The aqueous basic solution or the oral basic agent can be administered to the subject prior, during, after delivering the nanoaggregate, or a combination thereof. The aforementioned aqueous basic solution comprising in a range of from 0.01% to 10% of sodium bicarbonate can be suitable. The aqueous basic solution can be administered to the subject via intravenous (IV) injection, subcutaneous (SC) injection, intramuscular (IM) injection, or intradermal (ID) injection, or a combination thereof. In one embodiment, the aqueous basic solution is administered to the subject via intravenous (IV) injection, subcutaneous (SC) injection, intramuscular (IM) injection, or intradermal (ID) injection. The oral basic agent can include sodium bicarbonate tablet, solution, powder or granule. Commercially available products, such as Brioschi (available from Neobourne Pharma LP., Quebec, Canada), Neut or Sellymin can be suitable. The oral basic agent can be administered to a subject via mouth.

The nanoaggregate can be delivered to the subject via intravenous (IV) injection, subcutaneous (SC) injection, intramuscular (IM) injection, or intradermal (ID) injection, or a combination thereof. In one embodiment, the aqueous basic solution is administered to the subject via intravenous (IV) injection, subcutaneous (SC) injection, intramuscular (IM) injection, or intradermal (ID) injection.

This invention is also directed to a process for producing a pharmaceutical composition, the process comprising the steps of:

(1) forming a nanoaggregate comprising a polymer and at least one bioactive agent by mixing the polymer and the bioactive agent, and optionally, sodium bicarbonate; wherein the nanoaggregate is produced by:
dissolving the polymer in a first solvent selected from an aqueous solution, a first organic solvent or a combination thereof, to form a polymer solution;
dissolving the bioactive agent in a second organic solvent to form a bioactive agent solution; and
mixing the polymer solution and the bioactive agent solution to form the nanoaggregate;
wherein the first organic solvent and the second organic solvent are the same or different; and wherein the second organic solvent is a water miscible organic solvent;

(2) removing the first solvent and the second organic solvent from the nanoaggregate to form a dried nanoaggregate and dissolving the dried nanoaggregate to form an aqueous nanoaggregate solution;

(3) lyophilizing the aqueous nanoaggregate solution to form a lyophilized nanoaggregate; and (4) mixing the lyophilized nanoaggregate with a saline, a sodium bicarbonate solution, water, or a combination thereof, and, optionally, a pharmaceutical suitable carrier to form the pharmaceutical composition;
Wherein the polymer is water soluble and comprises at least one first terminal group modified with a hydrophobic moiety and a second terminal group modified with a hydrophilic moiety;
wherein the bioactive agent is water insoluble or poorly water soluble prior to forming the nanoaggregate; and
wherein the pharmaceutical composition has a pH value in a range of from about 7.1 to about 10.

The first solvent can be selected from an aqueous solution, such as water, saline, a buffer such as PBS, a first organic solvent or a combination thereof. The first organic solvent can be a water miscible organic solvent, such as methanol, ethanol, acetone, propanol, isopropanol, or a combination thereof. The polymer can be dissolved in water in one example, in ethanol in another example, in methanol in a further example, in acetone in yet another example, in a combination of water and ethanol in yet another example, in a combination of ethanol and methanol in yet another example, in a combination of acetone and water in yet another example, in isopropanol in yet another example, and in a combination of water and isopropanol in yet another example. The second organic solvent can be water miscible. If the polymer is dissolved in an aqueous solution, then the second organic solvent is preferably water miscible. If the polymer is dissolved in a first organic solvent, then it is preferred that the first and the second organic solvents are miscible, or the same. Any of the water miscible organic solvent disclosed above or a combination thereof can be suitable. The second organic solvent can comprise ethanol in one example, methanol in another example, or a combination thereof in yet another example.

The dried nanoaggregate can be dissolved in water, saline, a buffer such as PBS, or a combination thereof to form an aqueous nanoaggregate solution.

In any of processes disclosed herein, the pharmaceutical composition has a pH value in a range of from about 7.1 to about 10.0. In examples, the pharmaceutical composition can have a pH in a range of from 7.1 to 10.0, 7.2 to 10.0, 7.3 to 10.0, 7.4 to 10.0, 7.5 to 10.0 or 7.6 to 10.0. In further examples, the pharmaceutical composition can have a pH in a range of from 7.1 to 10.0, 7.1 to 9.5, 7.2 to 9.5, 7.3 to 9.5, 7.4 to 9.5, 7.5 to 9.5. In yet further examples, the pharmaceutical composition can have a pH in a range of from 7.6 to 9.5, 7.6 to 9.0, 7.6 to 8.5, 7.6 to 8.0, or 7.6 to 7.9. In even further examples, the pharmaceutical composition can have a pH in a range of from 7.8 to 9.5, 7.8 to 9.0, 7.8 to 8.5, 7.9 to 9.5, 7.9 to 8.5, or 7.9 to 8.2.

The pharmaceutical composition can be formulated to comprise sodium bicarbonate in a range of from 0.1% to 10%, percentage based on the total weight of the pharmaceutical composition, wherein the sodium bicarbonate is mixed with the polymer solution and the bioactive agent solution to form the nanoaggregate, mixed with the dried nanoaggregate to form the aqueous nanoaggregate solution, mixed with the lyophilized nanoaggregate, or a combination thereof. In one example, a sodium bicarbonate is mixed with the polymer solution and the bioactive agent solution to form the nanoaggregate. In another example, a sodium bicarbonate is mixed with the dried nanoaggregate to form the aqueous nanoaggregate solution. In yet another example, the sodium bicarbonate is mixed with the lyophilized nanoaggregate to form the pharmaceutical composition. In yet another example, the sodium bicarbonate is mixed with the polymer solution and the bioactive agent solution to form the nanoaggregate and then with the lyophilized nanoaggregate to form the pharmaceutical composition.

In the process disclosed herein, if the sodium bicarbonate is included in step (1), a sodium bicarbonate solution having a desired percentage of sodium bicarbonate can be used. If the optional sodium bicarbonate is included in the step (1), it is understood that the amount of sodium bicarbonate used needs to be considered in reaching the desired final percentage of sodium bicarbonate in the pharmaceutical composition. For example, if sufficient sodium bicarbonate is already present, the dried nanoaggregate can be mixed with water or a solution comprising pre-determined amount of sodium bicarbonate so a desired final percentage can be reached.

The process can further comprise the step of filtering the nanoaggregate through a 0.22 μm filter to produce a sterilized nanoaggregate prior to lyophilizing, wherein the nanoaggregate can have a filtration rating ($R_f$) through a 0.22 μm filter in a range of from 50 to 100 percent. In another example, the process can comprise the step of filtering the pharmaceutical composition through a 0.22 μm filter to produce a filtered pharmaceutical composition. The $R_f$ is defined in detail in EXAMPLES section of this application. Briefly, a polymer-drug nanoaggregate sample can be dissolved in water, saline, PBS, or a solvent as described herein to a predetermined final concentration. The sample is then filtered through a selected filter with a pre-determined filtration surface area, such as a 25 mm diameter sterile syringe filter assembly having a 0.22 μm filtration pore size, with a predetermined starting volume $V_0$. A passing volume $V_p$ that passed through the filter can be obtained. Filtration rating $R_f$ for a sample can be calculated based on formula:

$$R_f = V_p/V_0.$$

The filtration rating $R_f$ can be expressed as a percentage or a fraction at a pre-determined filtration surface area. In some cases as disclosed herein, standard sterile filters of 25 mm diameter can be used. The filtration rating $R_f$ can be expressed as a percentage or a fraction with a sterile filter of 25 mm diameter that has a pre-determined filtration surface area. Filtration ratings measured using a different size of filters can be converted or normalized in reference to the standard 25 mm diameter filter. A percentage is used in this application. In embodiments of the process, the nanoaggregate can have a filtration rating at least 50%, at least 60%, at least 70%, at least 80%, at least 90% or more; or in a range of 50-100%, 60-100%, 70-100%, 80-100%, 90-100%, 55-100%, 65-100%, 75-100%, 85-100%, 95-100%, 55-95%, 65-95%, 85-95%, 50-95%, 60-95%, 70-95%, 80-95%, 90-95%, 50-90%, 60-90%, 70-90%, 80-90%, 55-90%, 65-90%, 75-90%, 85-90%; or, in any rate, must be 50% or greater.

In any of processes disclosed above and hereafter, the pharmaceutical composition can comprise in a range of from 0.01% to 10% of sodium bicarbonate, percentage based on the total weight of the pharmaceutical composition. The pharmaceutical composition can comprise about 0.1% to in one example, 0.1% to 0.18% in another example, 0.1% to 0.15% in yet another example, 0.12% to 0.19% in yet another example, 0.12% to 0.18% in yet another example and 0.12% to 0.16% in a further example, 0.1% to 4.2% in an example, 0.1% to 5% in a different example, 0.1% to 7.5% in a further example, and 0.1% to 8.4% in a yet further example, of sodium bicarbonate. All percentages are based on the total weight of the pharmaceutical composition.

The sodium bicarbonate solution can comprise in a range of from 0.1% to 10% sodium bicarbonate and optionally sodium chloride. The sodium bicarbonate solution can comprise about 0.1% to 0.19% in one example, 0.1% to 0.18% in another example, 0.1% to 0.15% in yet another example, 0.12% to in yet another example, 0.12% to 0.18% in yet another example and to 0.16% in a further example, of sodium bicarbonate. In a further example, the sodium bicarbonate can comprise 5% of sodium bicarbonate. In an even further example, the sodium bicarbonate can comprise 8.4% of sodium bicarbonate. All percentages are based on the total weight of the sodium bicarbonate solution. Sodium bicarbonate solutions disclosed herein can be free from buffer or antimicrobial agent. It is understood that if a free acid, such as citric acid, phosphoric acid or other organic acids mentioned above, is present in dried nanoaggregate, the addition of sodium bicarbonate will lead to the reaction between the acid (if any is remaining after lyophilization) and sodium bicarbonate to form a salt, thus resulting in a pharmaceutical composition that is free from free acid.

In any of the processes disclosed herein, the nanoaggregate can have a weight ratio of the polymer to the bioactive agent in a range of from about 2:1 to about 20:1. Any of the aforementioned ratios and any ratios within the aforementioned range can be suitable. In one example, the nanoaggregate can have a weight ratio of polymer to bioactive agent in a range of from about 5:1 to about 8:1.

In any of processes disclosed herein, aforementioned polymers can be suitable. In one example, the polymer can comprise a polyoxazoline (PDX), as disclosed above and hereafter. The polyoxazoline (PDX) can comprise a linear portion, a branched portion, or a combination thereof. The polyoxazoline can comprise poly(2-oxazoline), poly(2-substituted oxazoline) or a combination thereof, wherein the poly(2-substituted oxazoline) can comprise poly(2-methyloxazoline), poly(2-ethyloxazoline), poly(2-propyloxazoline), poly(2-butyloxazoline), or a combination thereof. Particularly, the polymer can have a first terminal group that comprise hydrophobic moiety comprising saturated or unsaturated aliphatic hydrocarbon having 1 to about 22 carbons, an aromatic hydrocarbon, or a combination thereof, and a second terminal group that can comprise a group modified by an amine, amide, imine, imide, carboxyl, hydroxyl, ester, acetate, phosphate, or a combination thereof. In one example, the second terminal group can comprise a group modified by an ethylenediamine (EDA), a derivative of ethylenediamine, or a combination thereof. Any of the polymer suitable for the pharmaceutical composition as disclosed above can be suitable for the process of this invention.

The bioactive agent can be a natural or synthetic small molecule-based drug, inorganic-based drug, biological drug, natural or synthetic large molecule-based drug, modifications and/or derivatives thereof, or a combination thereof. The bioactive agent can be a taxane selected from paclitaxel, docetaxel, cabazitaxel, larotaxel, milataxel, ortataxel, tesetaxel, or a combination thereof. Any of the bioactive agents disclosed above that are suitable for the pharmaceutical composition can be suitable for the process of this invention.

The process disclosed above can further comprise mixing a bioactive agent that is water insoluble or poorly water soluble, such as taxane or any one of the bioactive agents mentioned herein, and one or more additional bioactive agents selected from gemcitabine, rapamycin, temozolomide, platinum-based antineoplastic agent, daunorubicin, doxorubicin, epirubicin, mitomycin, methotrexate, fluorouracil, carboplatin, carmustine, methyl-CCNU, cisplatin, vinorelbine, capecitabine or a combination thereof, to form said pharmaceutical composition. The one or more additional bioactive agents can be mixed together with the polymer and the taxane at the same time or after the polymer and the taxane is mixed to form a nanoaggregate. In one example, the one or more additional bioactive agents are mixed together with the polymer and the taxane. In another example, the one or more additional bioactive agents are mixed after the polymer and the taxane have formed a nanoaggregate. Sodium bicarbonate can be optional when additional bioactive agents are mixed. In one example, a pharmaceutical composition can be formulated to comprise additional bioactive agents and sodium bicarbonate in a range of from 0.1% to 10%, percentage based on the total weight of the pharmaceutical composition. In another example, a pharmaceutical composition can be formulated to comprise additional bioactive agents and is free from sodium bicarbonate.

In another example, the process can comprise the steps of:
(1) forming a nanoaggregate comprising a polymer and at least one bioactive agent by mixing the polymer and the bioactive agent, and optionally, sodium bicarbonate;
(2) mixing the nanoaggregate and one or more additional bioactive agents in an aqueous solution to form a nanoaggregate solution;
(3) lyophilizing the nanoaggregate solution to form a lyophilized nanoaggregate; and
(4) mixing the lyophilized nanoaggregate with a saline, a sodium bicarbonate solution, water, or a combination thereof, and, optionally, a pharmaceutical suitable carrier to form the pharmaceutical composition;
wherein the polymer is water soluble and comprises at least one first terminal group modified with a hydrophobic moiety and a second terminal group modified with a hydrophilic moiety;
wherein each of the at least one bioactive agent is water insoluble or poorly water soluble prior to forming the nanoaggregate and at least one of the one or more additional bioactive agents is water soluble.

In any of the processes of this invention disclosed herein, if at least one organic solvent is present in the nanoaggregate or the nanoaggregate solution, the process can further comprise the step of removing the organic solvent before lyophilization. Rotary evaporation can be suitable for removing the organic solvent. The aforementioned first solvent that is selected from an aqueous solution, such as water, saline, a buffer such as PBS, a first organic solvent or a combination thereof, can be suitable. As mentioned herein, the first organic solvent can be a water miscible organic solvent, such as methanol, ethanol, acetone, propanol, isopropanol, or a combination thereof. In examples, the nanoaggregate can be formed, as disclosed above, by dissolving the polymer in a first solvent selected from an aqueous solution, a first organic solvent or a combination thereof to form a polymer solution, dissolving the bioactive agent in a second organic solvent to form a bioactive agent solution and mixing the polymer solution and the bioactive agent solution. Organic solvent can be removed, such as by rotary evaporation, to form a dried nanoaggregate. The dried nanoaggregate can be dissolved in water, saline, a buffer, a solution of an acid, as mentioned above to form an aqueous nanoaggregate and subsequently mixed with the one or more additional bioactive agents in an aqueous solution to form a nanoaggregate solution.

The nanoaggregate of the pharmaceutical composition produced by the process of this invention can be free from human serum albumin, organic solvent, detergent, oil or free acid. In a further example, the pharmaceutical composition produced by the process of this invention can be free from human serum albumin, organic solvent, detergent, oil or free acid.

The process disclosed above and hereafter can further comprise mixing an additional taxane that is formulated free from the polymer in the pharmaceutical composition. The taxane formulated free from the polymer mentioned above, individually or in a combination thereof, can be suitable. The pharmaceutical composition produced by the process can comprise a nanoaggregate taxane to a taxane that is formulated free from the polymer in a weight ratio in a range of from 0.1:1 to 10:1, wherein the ratio is based on the weight of taxanes.

This invention is further directed to a method for treating a disease of a subject in need thereof. The method comprises administering the subject with the pharmaceutical composition disclosed above and hereafter or a pharmaceutical composition produced by any of the processes disclosed above and hereafter. The method can comprise:

administering the subject with a pharmaceutical composition comprising: a nanoaggregate comprising a polymer and an effective dosage of at least one bioactive agent, and optionally a pharmaceutical suitable carrier, wherein the pharmaceutical composition has a pH value in a range of from about 7.1 to about 10; and administering an aqueous basic solution, an oral basic agent, or a combination thereof, to the subject prior to administering the pharmaceutical composition, during administering the pharmaceutical composition, after administering the pharmaceutical composition, or a combination thereof;

wherein the polymer is water soluble and comprises at least one first terminal group modified with a hydrophobic moiety and a second terminal group modified with a hydrophilic moiety;

wherein the bioactive agent is water insoluble or poorly water soluble prior to forming the nanoaggregate; and wherein the aqueous basic solution comprises in a range of from to 10% of sodium bicarbonate, percentage based on the total weight of the aqueous basic solution.

Aforementioned oral basic agent including sodium bicarbonate tablet, solution, powder or granule, such as commercially available Brioschi, Neut or Sellymin can be suitable. The oral basic agent can be orally administered to a subject prior to administering the pharmaceutical composition, during administering the pharmaceutical composition, after administering the pharmaceutical composition, or a combination thereof. In one example, one or more sodium bicarbonate 650 mg tablets can be suitable.

In some cases, the pharmaceutical composition can further comprise a salt component comprising sodium bicarbonate. In some cases, the salt component can consist of sodium bicarbonate. In some cases, the salt component can consist of sodium bicarbonate, sodium chloride, water, and a combination thereof.

In some examples of the method for treating a disease disclosed herein, the pharmaceutical composition can comprise a sodium bicarbonate; wherein the sodium bicarbonate and the nanoaggregate are mixed in an aqueous solution, and wherein the pharmaceutical composition comprises the sodium bicarbonate in a range of from 0.01% to 10%, percentage based on the total weight of the pharmaceutical composition.

The pharmaceutical composition can have a pH value in a range of from about 7.1 to about 10.0. Any pH value or values in the range specified herein can be suitable. In examples, the pharmaceutical composition can have a pH in a range of from 7.1 to 10.0, 7.2 to 10.0, 7.3 to 10.0, 7.4 to 10.0, 7.5 to 10.0, 7.6 to 10.0. In further examples, the pharmaceutical composition can have a pH in a range of from 7.1 to 10.0, 7.1 to 9.5, 7.2 to 9.5, 7.3 to 9.5, 7.4 to 9.5, or 7.5 to 9.5. In yet further examples, the pharmaceutical composition can have a pH in a range of from 7.6 to 10.0, 7.6 to 9.5, 7.6 to 9.0, 7.6 to 8.5, 7.6 to 8.0, or 7.6 to 7.9. In even further examples, the pharmaceutical composition can have a pH in a range of from 7.8 to 10.0, 7.8 to 9.5, 7.8 to 9.0, 7.8 to 8.5, 7.9 to 9.5, 7.9 to 8.5, or 7.9 to 8.2.

In some cases, 500 mL of sterilized water can be mixed with one prefilled syringe of 8.4% sodium bicarbonate (1 mEq/mL) to form an aqueous basic solution. The aqueous basic solution can be administered to a patient over one hour before the infusion of the pharmaceutical composition and again immediately after. Not wishing to be bound to a particular theory, Applicants believe that administering the sodium bicarbonate solution to the subject is designed to increase the subject's body fluid pH so the pharmaceutical composition can have a change in polymer charge. It is further believed that pH-dependent changes of the polymer, such as the change in polymer charge disclosed herein, can contribute to the reduced renal toxicity effect of the pharmaceutical composition of this invention.

In some cases, the effective dosage of taxane can be about 10 mg/m$^2$ to 200 mg/m$^2$. In some cases, the effective dosage can be in a range of from mg/m$^2$ to 200 mg/m$^2$, 20 mg/m$^2$ to 200 mg/m$^2$, 30 mg/m$^2$ to 200 mg/m$^2$, 40 mg/m$^2$ to 200 mg/m$^2$, 50 mg/m$^2$ to 200 mg/m$^2$, 60 mg/m$^2$ to 200 mg/m$^2$, 70 mg/m$^2$ to 200 mg/m$^2$, 80 mg/m$^2$ to 200 mg/m$^2$, 90 mg/m$^2$ to 200 mg/m$^2$, 100 mg/m$^2$ to 200 mg/m$^2$, 110 mg/m$^2$ to 200 mg/m$^2$, 120 mg/m$^2$ to 200 mg/m$^2$, 130 mg/m$^2$ to 200 mg/m$^2$, 140 mg/m$^2$ to 200 mg/m$^2$, 10 mg/m$^2$ to 150 mg/m$^2$, 10 mg/m$^2$ to 125 mg/m$^2$, 10 mg/m$^2$ to 120 mg/m$^2$, 10 mg/m$^2$ to 100 mg/m$^2$, 10 mg/m$^2$ to 90 mg/m$^2$, 10 mg/m$^2$ to 80 mg/m$^2$, 10 mg/m$^2$ to 70 mg/m$^2$, 10 mg/m$^2$ to 60 mg/m$^2$, 10 mg/m$^2$ to 50 mg/m$^2$, 10 mg/m$^2$ to 40 mg/m$^2$, of the taxane. In some cases, the effective dosage can be in a range of from 80 mg/m$^2$ to 200 mg/m$^2$ of the taxane. In some cases, the effective dosage can be in a range of from 80 mg/m$^2$ to 160 mg/m$^2$ of the taxane. In some cases, the effective dosage can be in a range of from 80 mg/m$^2$ to 125 mg/m$^2$ of the taxane. The effective dosage of taxane can be administered to a subject on a once every week scheme, once every two weeks scheme, once every three weeks scheme or once every four weeks scheme. Multiple schemes can be to forma a treatment cycle. In some cases, the pharmaceutical composition can be infused to a patient. In some cases, an infusion cycle can have 3 once a week infusion with one week break (3w+1w cycle), 4w+1w cycle, 5w+1w cycle, or a continuous infusion. Any of the effective dosages disclosed herein can be combined with one or more subsequent bioactive agents disclosed herein. The taxane can be paclitaxel.

The aqueous basic solution can be administered to the subject prior to, such as a few minutes to a few hours prior to administering the pharmaceutical composition. The aqueous basic solution can also be administered to the subject during administering the pharmaceutical composition, for example, administering the aqueous basic solution at the same or different injection site of the subject. The aqueous basic solution can also be administered to the subject after administering the pharmaceutical composition, such as continued daily injection to the subject with the aqueous basic solution for a few days after administering the pharmaceutical composition. The aqueous basic solution can be administered via intravenous (IV) injection, subcutaneous (SC) injection, intramuscular (IM) injection, or intradermal (ID) injection, or a combination thereof. In one embodiment, the aqueous basic solution is administered to the subject via intravenous (IV) injection, subcutaneous (SC) injection, intramuscular (IM) injection, or intradermal (ID) injection.

In some cases, the bioactive agent can a taxane selected from paclitaxel, docetaxel, cabazitaxel, larotaxel, milataxel, ortataxel, tesetaxel, or a combination thereof. In some cases, the bioactive agent can paclitaxel.

In some cases, the effective dosage can be about 10 mg/m$^2$ to 200 mg/m$^2$ of the taxane. In some cases, the effective dosage can be about 10 mg/m$^2$ to 200 mg/m$^2$ of the paclitaxel.

The method can further comprise administering an additional taxane that is formulated free from the polymer to the subject. The taxane formulated free from the polymer mentioned above, individually or in a combination thereof, can be suitable. A ratio of the taxane in the nanoaggregate to the taxane formulated free from the polymer can be in a range of from 0.1:1 to 10:1, wherein the ratio is based on the weight of taxane. The taxane formulated free from the polymer can be administered together with the pharmaceutical composition or separately to the subject. Commercially available taxane formulations, such as Abraxane® available from Celgene under respective trademark and Taxol® available from Bristol-Myers Squibb under respective trademark can be suitable. The taxane formulated free from the polymer can be Abraxane in one embodiment, Taxol in another embodiment, and a combination of Abraxane and Taxol in yet another embodiment.

The method disclosed above and hereafter can further comprise the step of administering the subject with one or more subsequent bioactive agent selected from a protein, a peptide, an antibody, a fragment of an antibody, a chemical compound, a small molecule drug, one or more chemotherapy drugs, a gemcitabine, a rapamycin, a temozolomide, a platinum-based antineoplastic agent, one or more anti-PD1 antibodies, one or more anti-PD-L1 antibodies, one or more anti-CTLA-4 (cytotoxic T lymphocyte-associated antigen) antibodies, one or more anti-LAG3 (lymphocyte activation gene-3) antibodies, one or more anti-TIM-3 (T cell immunoglobulin and mucin domain-3) antibodies, one or more anti-CD19 antibodies, one or more anti-CD20 antibodies, one or more cytokines, one or more interleukins, interferon α2a, interferon α, granulocyte colony stimulating factor (G-CSF), Neupogen or Filgrastim, T-cell receptor (TCR), chimeric antigen receptor or chimeric antigen T-cell receptor (CAR-T), a vaccine, or a combination thereof.

In some cases, this invention is directed to a method for treating a disease of a subject in need thereof. In some cases, the disease can be one or more cancers comprising adenocarcinoma of the stomach or lower esophagus, AIDS-related Kaposi's sarcoma, Ampullary Carcinoma, angiosarcoma, B cell lymphoma, bile duct cancer, bladder cancer, brain cancer, breast cancer, cervical cancer, cervical carcinoma, cholangiocarcinoma, colon cancer, epithelial cancer, esophageal cancer, esophageal carcinoma, gastric cancer, genitourinary cancer, glioblastoma, head and neck cancer, head and neck carcinoma, head and neck squamous cell carcinoma (HNSCC), hematopoietic cancers, testicular cancer, colon and rectal cancers, Hodgkin lymphoma, Hodgkin's Disease, hormone-refractory prostate cancer, kidney cancer, large bowel cancer, liver cancer, lymphoma, melanoma, metastatic breast cancer, metastatic pancreas cancer, mycosis fungoides, myeloid leukemia, nasopharyngeal carcinoma, nervous system cancer, neuroblastoma, non-small cell lung cancer (NSCLC), Oral Adenoid Cystic Carcinoma, ovarian cancer, pancreatic cancer, prostate cancer, prostatic cancer, pulmonary cancer, renal cancer, Sinonasal Squamous Cell Carcinoma (SCC), skin cancer, small cell lung cancer (SCLC), squamous cell carcinoma of head and neck, squamous cell carcinoma of the head and neck cancer (SCCHN), stage IIB-IV melanoma, T cell lymphoma, triple negative breast cancer (TNBC), upper GI adenocarcinoma, urothelium transitional cell carcinoma, or other cancer or cancers including those cancer or neoplastic disorder or disease to be diagnosed or recognized. The disease can be any of the cancers disclosed above or hereafter.

In some cases, the disease can be one or more cancers comprising Ampullary Carcinoma, Adrenal Gland Cancer, breast cancers, ovarian cancers, lung cancers, NSCLC (Non-Small Cell Lung Cancer), cholangiocarcinoma, colon cancers, gastric cancers, melanoma, nasopharyngeal carcinoma, Neuroendocrine cancer, head and neck cancers, Oral Adenoid Cystic Carcinoma, pancreatic cancers, Sinonasal Squamous Cell Carcinoma (SCC), thyroid cancer, one or more metastatic cancers derived therefrom, or a combination thereof.

In some cases, the pharmaceutical composition can provide less accumulation of the bioactive agent in kidney in a subject when the subject is administered the aqueous basic solution, the oral basic agent, or a combination thereof, compared to without being administered the aqueous basic solution or the oral basic agent. In some cases, the pharmaceutical composition can provide 10%, 20%, 30%, 40%, 50%, 60%, 70%, 80%, or more than 80%, less accumulation in kidney of the bioactive agent in a subject when the subject is administered the aqueous basic solution, the oral basic agent, or a combination thereof, compared to without being administered the aqueous basic solution or the oral basic agent (FIG. 18D), wherein taxane accumulation in kidney of the subject without being administer the aqueous basic solution or the oral basic agent is defined as 100%.

In some cases, the pharmaceutical composition can provide more accumulation of the bioactive agent in tumor cells of the cancers in a subject when the subject is administered the aqueous basic solution, the oral basic agent, or a combination thereof, compared to without being administered the aqueous basic solution or the oral basic agent. In some cases, the pharmaceutical composition can provide 30%, 40%, 50%, 60%, 70%, 80%, 90%, 100%, 110%, 120%, 130%, 140%, 150%, 160%, 170%, 180%, 190%, 200%, or more than 200%, more accumulation in tumor cells of the cancers in a subject when the subject is administered the aqueous basic solution, the oral basic agent, or a combination thereof, compared to without being administered the aqueous basic solution or the oral basic agent (FIG. 18E), wherein taxane accumulation in tumor cells in the subject without being administer the aqueous basic solution or the oral basic agent is defined as 100%.

In some cases, patients with various solid tumors can be administered with the aqueous basic solution over one hour before the infusion of the pharmaceutical composition and again immediately after. The pharmaceutical composition containing the Paclitaxel-Polymer Nanoaggregate and Sodium Bicarbonate can be prepared as described above and hereafter and administered to each patent at a taxane dosage of from 15 mg/m$^2$ to 200 mg/m$^2$ on a "once-a-week for 3 weeks and 1 week break" infusion cycle (3w+1w cycle), 4w+1 cycle, or a continuous infusion cycle for 1 to 12 months. Patients can be treated for multiple infusion cycles. In some cases, patients can have stable disease (SD), partial response (PR) or complete response (CR) at a taxane dosage of 15 to 60 mg/m$^2$, 80 to 100 mg/m$^2$, 80 to 120 mg/m$^2$, 80 to 125 mg/m$^2$, to 140 mg/m$^2$, or 80 to 200 mg/m$^2$.

The term "subject" or "subjects" used throughout this application refers to an animal, a human or a human patient. The term "animal" refers to wild animals, captured or zoo-raised animals and domesticated animals including live stocks, farm animals, pets, laboratory animals, such as horse, cattle, pig, donkey, mule, camel, goat, sheep, monkey, rabbit, dog, cat, mouse, rat, and the like. Warm-blooded animals are suitable. The term "human" refers to a human patient having one or more diseases in need of a treatment, a person having one or more medical conditions unrelated to a treatment, or a healthy person.

The term "antibody", "antibodies" or "fragment of an antibody" can include natural or synthetic antibodies that selectively bind to an antigen. The term includes polyclonal and monoclonal antibodies produced from animals, cells including eukaryotic or prokaryotic cells, cell free systems, or chemical synthesis. In addition to intact immunoglobulin molecules, also included in the term "antibodies" are fragments or polymers of those immunoglobulin molecules, and human or humanized versions of immunoglobulin molecules that selectively bind a target antigen.

The term "aqueous solution" or "aqueous solutions" used throughout this application refers to a solution comprises in a range of from 80% to 100% water, percentage based on the total weight of the aqueous solution. An aqueous solution can further comprise additional components, such as salt, acid, base, buffer, solvent, organic solvent, particles, emulsion, solids or non-solids, detergents, small molecules, large molecules, other ingredients, or a combination thereof.

A subsequent bioactive agent can have a molecular weight in a range of from about 10 to 1,000,000 in one example, 100 to 500,000 in another example, 100 to 200,000 in yet another example, 500 to 200,000 in yet another example, 1,000 to 200,000 in yet another example, 5,000 to 200,000 in yet another example, 10,000 to 200,000 in yet another example, 15,000 to 200,000 in yet another example, 20,000 to 200,000 in yet another example, and 25,000 to 200,000 in yet another example. A bioactive agent can also have a molecular weight in a range of from about 100 to 100,000 in one example, 100 to 75,000 in yet another example, 100 to 50,000 in yet another example, 100 to 30,000 in yet another example, and 100 to 25,000 in yet another example.

A subsequent bioactive agent can comprise a drug, protein, recombinant protein, antibody, Fab antibody fragments, other antibody fragments that bind antigen, enzymes, viruses, virus fragments and a combination thereof. A subsequent bioactive agent can be selected from a peptide, a monoclonal antibody, a fragment of a monoclonal antibody, a polyclonal antibody, a fragment of a polyclonal antibody, a synthetic antibody, a fragment of a synthetic antibody, or a combination thereof. A subsequent bioactive agent can comprise, for example, antibodies or antigen-binding portions thereof, such as, alemtuzumab, bevacizumab, cetuximab, ibritumomab, rituximab, trastuzumab, gemtuzumab, anti-PD1 antibodies (such as Keytruda or pembrolizumab, Opdivo or nivolumab, Bavencio or avelumab, Imfinzi or durvalumab, Tecentriq or atezolizumab), anti-PD-L1 antibodies, anti-CTLA-4 (cytotoxic T lymphocyte-associated antigen, also known as CD152) antibodies, anti-LAG3 (lymphocyte activation gene-3) antibodies, anti-TIM-3 (T cell immunoglobulin and mucin domain-3) antibodies, anti-CD19 antibodies, anti-CD20 antibodies such as tositumomab, cytokines, such as, interleukins, interferon α2a, interferon α, granulocyte colony stimulating factor (G-CSF) or Neupogen also known as Filgrastim, T-cell receptor (TCR), chimeric antigen receptor or chimeric antigen T-cell receptor (CAR-T), peptide hormones, such as, insulin, glucagon, glucagon like peptide-1, erythropoietin (EPO), thyroperoxidase (TPO), follicle stimulating hormone and so on, ligands of cell surface receptors, lectins, nucleic acids, such as siRNAs, ribozymes, antisense nucleic acids, naked nucleic acids and so on, viruses, virus-like particles and the like. Examples include Ecallantide.

A subsequent bioactive agent can comprise a vaccine. A vaccine can comprise an antigen, a toxin, a modified or disabled toxin including natural or synthetic molecules that can cause immunoreaction in a biosystem such as in humans or animals. A vaccine can be attached to the polymer via covalent bonds, non-covalent linkages, or a combination thereof. Commercial vaccines and the vaccines listed by US Centers for Disease Control and Prevention (CDC) can be suitable.

A subsequent bioactive agent described herein can include any chemical or small molecule drug, chemotherapy drugs, inorganic-based drug, biological or large molecule-based drug, modifications or derivatives thereof, and combinations thereof. Chemotherapy drugs listed by NIH National Cancer Institute (https://www.cancer.gov/about-cancer/treatment/drugs) or any future updates can be suitable.

A subsequent bioactive composition can be administered with intravenous (IV), intramuscular (IM), subcutaneous (SC) or intradermal (ID) injections, orally, through inhalation, nasally, through an eye, for example, using drops or an ointment, transdermally, for example, using a patch, or a combination thereof. A combination of any of aforementioned administering routes can also be suitable.

The pharmaceutical composition can be administered to the subject via intravenous (IV) injection, subcutaneous (SC) injection, intramuscular (IM) injection, or intradermal (ID) injection. A combination of intravenous (IV) injection, subcutaneous (SC) injection, intramuscular (IM) injection, or intradermal (ID) injection can also be suitable.

In some cases, suitable to any of the methods disclosed herein, the pharmaceutical composition can provide at least 30% increase in plasma concentrations of the bioactive agent in vivo within 2-4 hours after administration of the pharmaceutical composition compared to that of a control pharmaceutical composition comprising the bioactive agent without sodium bicarbonate in vivo. In some cases, the bioactive agent can comprise paclitaxel.

A nanoaggregate disclosed herein can be a nanocomposite, nanoparticle of one or more materials or components, for example, a polymer alone, a polymer and a bioactive agent such as taxane, wherein at least one dimension of the physical mixture is at nanometer range as defined herein. In the instant disclosure, such a mixture can contain different nanoscale phases or domains formed between a taxane and a branched homopolymer molecule in either solid or liquid state. Nanocomposites can include a combination of a bulk matrix (e.g., branched homopolymers and a taxane) and nanodimensional phase(s), which may exhibit different properties due to dissimilarities of structure and chemistry (e.g., the domain formed by a taxane and the surface groups of branched polymer, as well as the domains formed by the interior of the branched polymers). Since the solubility of the domains/phases may be different, on dissolving the nanocomposite in an aqueous solution, one of the phases may dissolve faster than the other or others, resulting in a gradual breakdown of the composite nanoaggregate leading to a graded and controlled release of the composite components and optionally, reformation of one or more of the components into a novel form, such as, a new nanoaggregate. The terms, "nanocomposite," "nanoparticle", "nanoaggregate", "nanoaggregates", "aggregate" and "aggregates" are equivalent and are used interchangeably herein.

The size of the nanoaggregate described in the disclosure ranges from about 10 to about 500 nm in diameter in one example, from about 30 nm to about 300 nm in diameter in another example, from 50 to 100 nm in yet another example, and from 70 to 90 nm in a further example. Nanoaggregates may exhibit size-related properties that differ significantly from those observed for microparticles or bulk materials.

Figure 11:
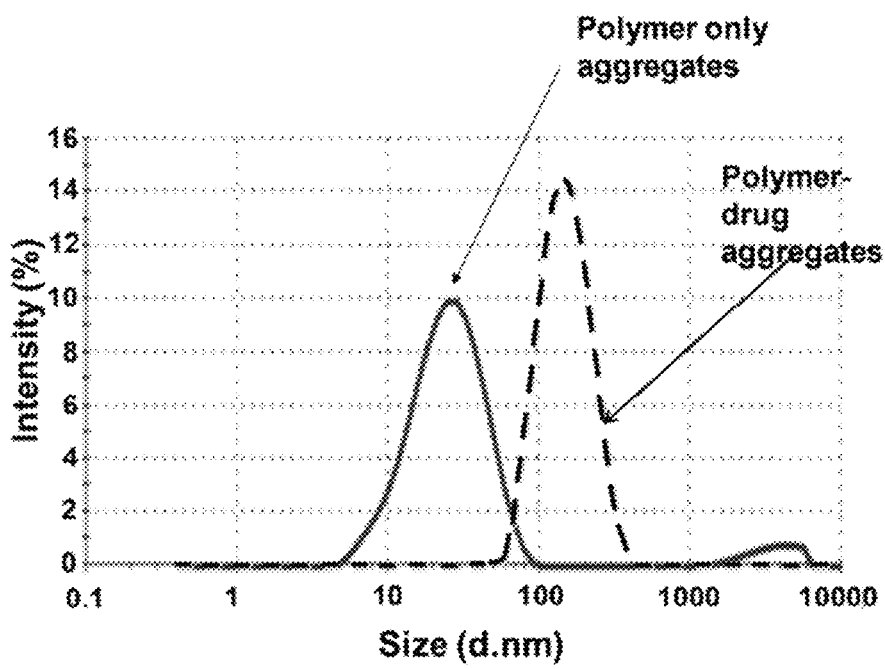
FIG. 11. Examples of the size comparison of polymer-only and polymer-drug nanoaggregates with the polymer concentration at 25 mg/mL and the drug concentration at 5 mg/mL in saline. The polymer is a hydrophobically-modified, randomly-branched PEOX and the drug is paclitaxel.
Figure 12:
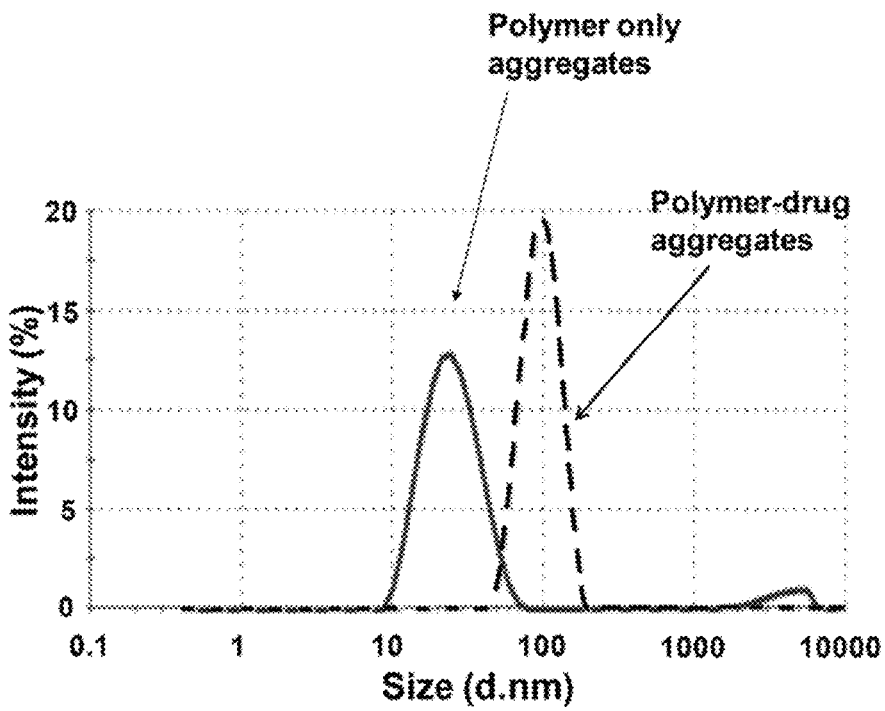
FIG. 12. Examples of the size comparison of polymer-only and polymer-drug nanoaggregates with the polymer concentration at 2.5 mg/mL and the drug concentration at 0.5 mg/mL in saline. The polymer is a hydrophobically-modified, randomly-branched PEOX and the drug is paclitaxel.
Figure 13:
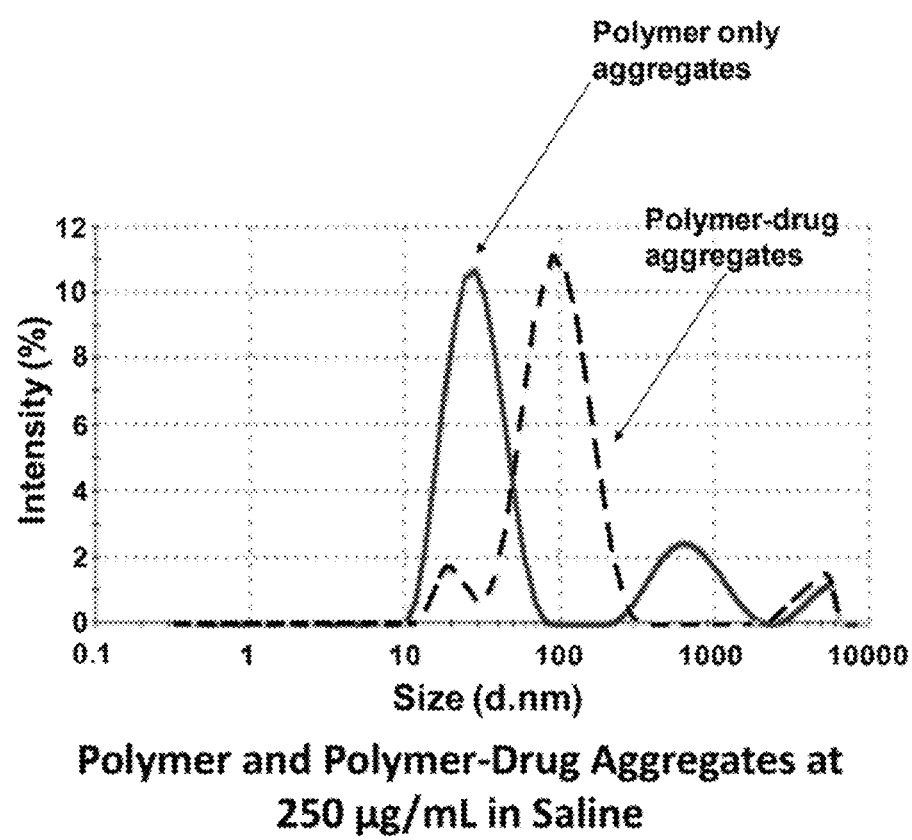
FIG. 13. Examples of the size comparison of polymer-only and polymer-drug nanoaggregates with the polymer concentration at 250 µg/mL and the drug concentration at 50 µg/mL in saline. The polymer is a hydrophobically-modified, randomly-branched PEOX and the drug is paclitaxel.
Figure 14:
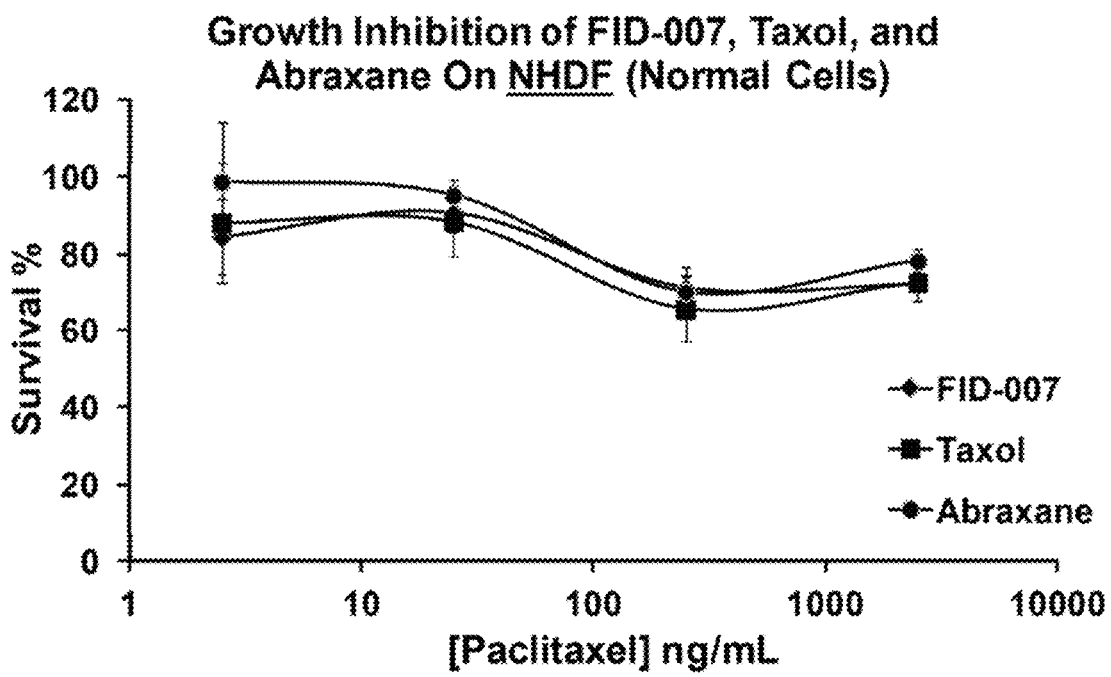
FIG. 14. Examples of representative results of normal cell survival on exposure to three taxane formulations.

On mixing hydrophobically-modified SBP's or ABP's with a water insoluble or poorly water soluble taxane, such as, paclitaxel, a distinct physical nanoaggregate is formed of size distinct from nanoaggregates formed only of polymer (FIG. 11, FIG. 12 and FIG. 13). When the homopolymer and taxane concentrations decrease, the size and distribution of the polymer/taxane nanoaggregates become much more similar to that of polymer only nanoaggregates suggesting taxane is released from the induced nanoaggregates or nanoparticles. The broad size distribution of polymer-only nanoaggregates is similar to that observed for other structures composed of lipid, whether or not associated with a taxane. On the other hand, the taxane-induced nanoaggregates of interest are of a particular size of narrower distribution, that is, unique nanoaggregates of certain size are produced. As taxane concentration in the nanoaggregate decreases, homopolymer concentration in the nanoaggregate decreases, nanoaggregate concentration decreases or any combination thereof, the nanoaggregates of interest release paclitaxel, as evidenced by a reduction of nanoaggregate size and/or a broader distribution of nanoaggregate size. The broader distribution may result from a mixture of homopolymer-only nanoaggregates and polymer/taxane nanoaggregates of varying size due to taxane release, until the only nanoaggregates observed are those which have the characteristics of those which are homopolymer only. In other words, taxane is released gradually after introduced into a host, such as, in the circulatory system. That mechanism is important for various drug delivery applications including, intravenous (IV), oral, transdermal, ocular, intramuscular and the like modes of administration, and where a delayed release or sustained release profile may be desirable.

Suitable weight ratios of polymer to taxane are in a range of from 2:1 to as mentioned above. The nanoaggregate can have a weight ratio of the polymer to the bioactive agent, such as the taxane, in a range of from about 2:1 to about 20:1, 2:1 to 15:1, 5:1 to 10:1, 5:1 to 8:1, 6:1 to 8:1 including 6.1:1, 6.2:1, 6.3:1, 6, 4:1, 6.5:1, 6.6:1, 6.7:1, 6.8:1, 6.9:1, 7:1, 7.1:1, 7.2:1, 7.3:1, 7.4:1, 7.5:1, 7.6:1, 7.7:1, 7.8:1, 7.9:1 and any ratios within the range. In one example, the nanoaggregate can have a weight ratio of polymer to taxane at about 7:1. The polymer can comprise the polyoxazoline disclosed herein.

The combination of the molar ratio of monomer to initiator in the polymerization and the weight ratio of polymer to taxane in the nanoparticles determines large scale manufacturability of the drug nanoparticles, nanoparticle size, and efficacy as a tumor-reducing treatment. As an example, taxane-induced nanoaggregates prepared with a polymer:taxane weight ratio of 5:1, using a polymer synthesized with 100:1 monomer to initiator molar ratio results in larger nanoparticles, for example, in the 120-160 nm range before lyophilization (One example is shown in Table 1). Such large nanoparticles are difficult to pass through a 0.22 μm filter (a required sterilization step for injectables) when manufactured in large quantities.

In comparison, when a polymer synthesized using a monomer to initiator molar ratio in a range of from 50:1 to 80:1, such as of 60:1, is mixed with taxane at a polymer to taxane weight ratio of 7:1, the nanoparticles formed are in a range of from 70 to 90 nm in size before lyophilization, which allows the particles to pass through a 0.22 μm filter with little difficulty.

The nanoaggregate can have a filtration rating through a 0.22 μm filter in a range of from 50 to 100 percent. Applicants unexpectedly discovered that polyoxazoline polymers with a specific range of monomer to initiator molar ratios provide an advantage in filtration for the manufacturing: polymers having monomer to initiator molar ratios in a range of from 50:1 to about 80:1, such as $C_{18}PEOXABP60$, can produce polymer-drug nanoaggregates that can pass through a 0.22 μm membrane filter with a filtration rating $R_f$ of about 50% to 100% for producing sterile drug nanoaggregate preparations, while polymers having a monomer to initiator molar ratio of 100:1 ($C_{18}PEOXABP100$) or greater produce polymer-drug nanoaggregates that have less than 50% filtration rating. Such a low filtration rating leads to low yield of production, material waste and longer filtration process resulting in reduced productivity for manufacturing and therefore, is not desired.

Such a difference in filtration is unexpected since, based on the $D_{90}$ values, both polymer-drug nanoaggregates have 90% of particles of sizes smaller than 173 nm and 209 nm (See Table 1), respectively, all less than 220 nm (the pore size of a 0.22 μm filter) and both would be able to have a majority of particles to pass through a 0.22 μm filter. Not wishing to be bound by any particular theory or mechanism, Applicants believe that a polymer having a monomer to initiator molar ratios 100:1 or greater, the nanoaggregate may have undesired particle size distribution, inter-particle interactions, particle-filter interactions, or a combination thereof, so when particles are forced to become close to each other, or close to filter materials, such as being filtered through a 0.22 μm filter, nanoaggregate particles may further aggregate or interact causing the filter to be clogged leading to a low filtration rating. Applicants unexpectedly discovered that by choosing a monomer to initiator molar ratios in a specific 50:1 to 80:1 range, one can overcome the filter clogging problem leading to easier manufacturing, reduced waste and increased productivity.

As disclosed above and hereafter, the taxane-induced nanoaggregates also can be linked with a targeting moiety or group including, but not limited to, an antibody (or antigen-binding portion thereof), antigen, cognate carbohydrates (e.g., sialic acid), a cell surface receptor ligand, a moiety that binds a cell surface receptor, such as, prostate-specific membrane antigen (PSMA), a moiety that binds a cell surface saccharide, an extracellular matrix ligand, a cytosolic receptor ligand, a growth factor, a cytokine, an incretin, a hormone, a lectin, a lectin target, such as, a galactose, a galactose derivative, an N-acetylgalactosamine, a mannose, a mannose derivative and the like, a vitamin, such as, a folate, a biotin and the like, an avidin, a streptavidin, a neutravidin, etc., to form a conjugate so that the targeting group(s) are incorporated with nanocomposite particle of interest (FIG. 10A-10B).

Taxane and modified homopolymer can be suspended individually in suitable buffers and/or solvents, such as, a buffer, methanol, acetone, ethanol and the like, at suitable concentrations, such as those which are established for in vivo use, generally in milligram, microgram or nanogram quantities. Then, the two solutions are mixed at a suitable temperature, such as, room temperature or at another temperature known to be acceptable for maintaining integrity of the taxane and homopolymer, for a suitable period of time, such as, one hour, two hours and so on. Other incubation times can vary from minutes to hours as the nanoaggregates of interest are stable once formed. The nanoaggregates can be concentrated or collected practicing methods known in the art, for example, by filtration, centrifugation, evaporation, lyophilization, dialysis and the like. The nanoaggregates can be desiccated for extended shelf life.

For example, a taxane, such as, paclitaxel, can be dissolved in methanol or ethanol in various amounts of up to 40 mg/mL. A hydrocarbon ($CH_3(CH_2)_{17}$)-modified randomly branched PEOX60 (monomer to initiator molar ratios=60:1) (herein referred to as $C_{18}PEOX60$) can be prepared as taught herein and dissolved at varying concentrations of up 100 mg/mL in methanol or ethanol.

The two solutions then can be mixed in various volumes to result in final homopolymer to taxane weight ratios in the mixtures ranging from 2:1 to 20:1 and rotary evaporated to dryness. The mixtures then can be re-dissolved in water or saline, followed by sterile filtration with a 0.22 µm filter and lyophilization for 20 to 72 hours depending on volume to yield a dried nanoaggregate or dry powder.

The size of the nanoaggregates or nanoparticles, as measured by light scattering, can range from about 50 to about 100 nm in one example, from about 60 to about 100 nm in another example, from about 70 to about 100 nm in yet another example and from about 70 to 95 nm in yet another example before lyophilization. The pharmaceutical composition can comprise the nanoaggregate is of a size in a range of from about 110 to about 150 nm in diameter after lyophilization. The size can be measured by reconstitution of the dried nanoaggregate in a saline, a sodium bicarbonate solution, water, buffer or a combination thereof. The size of the nanoaggregate can be measured by reconstitution of the dried nanoaggregate in a buffer such as a phosphate-buffered (PBS) in one example, in a combination of PBS and saline (sodium chloride) in another example, and in a combination of saline and sodium bicarbonate in a further example.

A pharmaceutical composition comprising the nanoaggregate disclosed herein can be formulated to be compatible with the intended administering route and can comprise one or more pharmaceutically suitable carriers. Examples of routes of administration include parenteral, e.g., intravenous, intradermal, subcutaneous, oral (e.g., inhalation), transdermal (topical), transmucosal and rectal administration. Solutions or suspensions used for parenteral, intradermal or subcutaneous application can include one or more pharmaceutically suitable carriers, such as a sterile diluent, such as, water for injection, saline, oils, polyethylene glycols, glycerine, propylene glycol or other synthetic solvents; antibacterial agents, such as, benzyl alcohol or methyl parabens; antioxidants, such as, ascorbic acid or sodium bisulfite; chelating agents, such as, EDTA; buffers, such as, acetates, citrates or phosphates; and agents for the adjustment of tonicity, such as, sodium chloride or dextrose. pH can be adjusted with acids or bases, such as HCl or NaOH. The parenteral preparation can be enclosed in ampoules, disposable syringes or multiple dose vials made of glass or plastic as an article of manufacture. The pharmaceutical composition can be packaged in a container, pack or dispenser together with instructions for administration.

Pharmaceutical compositions suitable for injectable use include sterile aqueous solutions or dispersions and sterile powders for the extemporaneous preparation, of sterile injectable solutions or dispersions. For intravenous administration, suitable carriers include physiological saline, bacteriostatic water or phosphate-buffered saline (PBS). The composition is sterile and is fluid to the extent that syringability exists. The composition must be stable under the conditions of manufacture and storage and must be preserved against the contaminating action of microorganisms, such as, bacteria and fungi. The pharmaceutical composition can comprise one or more solvents or dispersion medium containing, for example, water, ethanol, polyol (for example, glycerol, propylene glycol, liquid PEG, polysorbates and the like) and suitable mixtures thereof. Some pharmaceutically suitable carriers can be used for maintaining proper fluidity of the composition, for example, by the use of a coating such as lecithin, by the maintenance of the required particle size in the case of dispersion, use of a thickener and the use of surfactants. Further pharmaceutically suitable carrier can include various antibacterial and antifungal agents, for example, parabens, chlorobutanol, phenol, ascorbic acid and the like, to prevent or inhibit growth or action of microorganisms. Isotonic agents, for example, sugars, polyalcohols, such as, mannitol, sorbitol or sodium chloride, can be included in the composition as a pharmaceutically suitable carrier. An agent that delays absorption, for example, aluminum monostearate or gelatin can also be used as a pharmaceutically suitable carrier.

In a further embodiment, the pharmaceutical composition can comprise one or more pharmaceutically suitable carriers that will protect the compound against rapid elimination from the body of a subject, such as, a controlled release formulation, including implants and microencapsulated delivery systems. Biodegradable, biocompatible polymers can be used, such as ethylene vinyl acetate, polyanhydrides, polyglycolic acid, collagen, polyorthoesters and polylactic acid. Methods for preparation of such formulations will be apparent to those skilled in the art. The materials also can be obtained commercially, for example, from Alza Corporation and Nova Pharmaceuticals, Inc.

It can be advantageous to formulate oral or parenteral compositions in dosage unit form for ease of administration and uniformity of dosage. Dosage unit form as used herein refers to physically discrete units suited as unitary dosages for a subject to be treated; each unit containing a predetermined quantity of active compound calculated to produce a desired therapeutic endpoint. The dosages, for example, preferred route of administration and amounts are obtainable based on empirical data obtained from preclinical and clinical studies, practicing methods known in the art. The dosage and delivery form can be dictated by and can be dependent on the characteristics of the PAA, the polymer, the particular therapeutic effect to be achieved, the characteristics and condition of the recipient and so on. For repeated administrations over several days or longer, depending on the condition, the treatment can be sustained until a desired endpoint is attained.

The progress of the therapy can be monitored by conventional techniques and assays, as well as patient input.

This invention is further directed to a use of a salt component, a nanoaggregate, and optionally a pharmaceutical suitable carrier, for manufacturing a medicament for the treatment of a cancer, wherein the salt component comprises sodium bicarbonate, the nanoaggregate comprises a polymer and at least one bioactive agent and wherein the polymer and the at least one bioactive agent are mixed in an aqueous solution to form the nanoaggregate; and wherein the polymer is water soluble and comprises at least one first terminal group modified with a hydrophobic moiety and a second terminal group modified with a hydrophilic moiety; wherein the bioactive agent is water insoluble or poorly water soluble prior to forming the nanoaggregate; and wherein the medicament has a pH value in a range of from about 7.1 to about 10. In examples, the medicament can have a pH in a range of from 7.1 to 10.0, 7.2 to 10.0, 7.3 to 10.0, 7.4 to 10.0, or 7.5 to 10.0. In further examples, the medicament can have a pH in a range of from 7.1 to 7.1 to 9.5, 7.2 to 9.5, 7.3 to 9.5, 7.4 to 9.5 or 7.5 to 9.5. In yet further examples, the medicament can have a pH in a range of from 7.6 to 10.0, 7.6 to 9.5, 7.6 to 9.0, 7.6 to 8.5, 7.6 to 8.0, or 7.6 to 7.9. In even further examples, the medicament can have a pH in a range of from 7.8 to 10.0, 7.8 to 9.5, 7.8 to 9.0, 7.8 to 8.5, 7.9 to 9.5, 7.9 to 8.5, or 7.9 to 8.2.

In some cases, the salt component can consist of sodium bicarbonate. In some cases, the salt component can consist of sodium bicarbonate, sodium chloride, water, and a combination thereof.

According to the use herein, the cancer can be one or more breast cancers, ovarian cancers, lung cancers, NSCLC (Non-Small Cell Lung Cancer), colon cancers, gastric cancers, melanoma, head and neck cancers, pancreatic cancers, one or more metastatic cancers derived therefrom or a combination thereof.

According to the use herein, the polymer can comprise a linear polymer, a branched polymer, a symmetrically branched polymer, an asymmetrically branched polymer, a dendrimer, a dendrigraft polymer, a comb-branched polymer, a star-branched polymer, or a combination thereof, wherein the first terminal group comprises hydrophobic moiety comprising saturated or unsaturated aliphatic hydrocarbon having 1 to about 22 carbons, an aromatic hydrocarbon, or a combination thereof, and the second terminal group comprises a group modified by an amine, amide, imine, imide, carboxyl, hydroxyl, ester, acetate, phosphate, or a combination thereof. The second terminal group can comprise a group modified by an ammonia, a derivative of ammonia, an ethylenediamine (EDA), a derivative of ethylenediamine, a piperazine, a derivative of piperazine, tris(2 aminoethyl)amine, 4-(aminomethyl)piperidine, 1,3-diaminopropane, 2,2'-(ethylenedioxy)bis(ethylamine), diethylenetriamine, 1,4,7,10-tetraazacyclododecane, hexamethylenediamine, triethylenetetramine, 1,8-diaminooctane, or a combination thereof. The polymer can comprise a polyoxazoline (PDX) that comprises a linear portion, a branched portion, or a combination thereof. In examples, the polyoxazoline can comprise poly(2-oxazoline), poly(2-substituted oxazoline) or a combination thereof, wherein the poly(2-substituted oxazoline) comprises poly(2-methyloxazoline), poly(2-ethyloxazoline), poly(2-propyloxazoline), poly(2-butyloxazoline), or a combination thereof. The polyoxazoline can comprise a molar ratio of monomer to initiator in a range of from 50:1 to 80:1. In the use herein, the at least one bioactive agent can be a taxane selected from paclitaxel, docetaxel, cabazitaxel, larotaxel, milataxel, ortataxel, tesetaxel, or a combination thereof.

The use of sodium bicarbonate to adjust acidity or to enhance chemical drug treatment to cancer in animal models have been reported. However, human clinical data on the role of sodium bicarbonate treatment in cancer is still missing (Faes & Dormond, Medicinal Chemistry, 5(12), 540-544, 2015). There has been no data on the combination of sodium bicarbonate and taxane in cancer treatment. Further, it is known that Taxol has sharply increased degradation rates in aqueous solutions at a pH above 7 (Montaseri et al., Iranian J. of Pharm. Sci., (1):43-51, 2004 and Tian et al., J. of Pharm. Sci, Vol. 97(3):1224-1235, 2008) and there is no report on stable taxane in aqueous solutions at a pH above 8.

Applicants unexpected discovered that the polymer-drug nanoaggregate disclosed herein provides stability of taxane in alkaline conditions, such as at a pH value in a range of from 7.1 to 10.0 despite of well known instability of paclitaxel in alkaline conditions (Sigma-Aldrich® product information sheet for paclitaxel, Cat. No.: T1912 and T7402, Sigma-Aldrich, under respective registered trademark, Montaseri et al., and Tian et al.). Applicants further discovered that the polymer-drug nanoaggregate disclosed herein provides a stable taxane solution without the need for other solubilizer or solvents such as Cremophor EL (polyethylated castor oil: CrEL) and ethanol for paclitaxel (Taxol®), polysorbate 80 (Tween 80) and ethanol for docetaxel, polysorbate 80, ethanol and citric acid for cabazitaxel (Ojima, et al., Expert Opin Ther Pat., 26(1):1-20, 2016).

Figure 16:
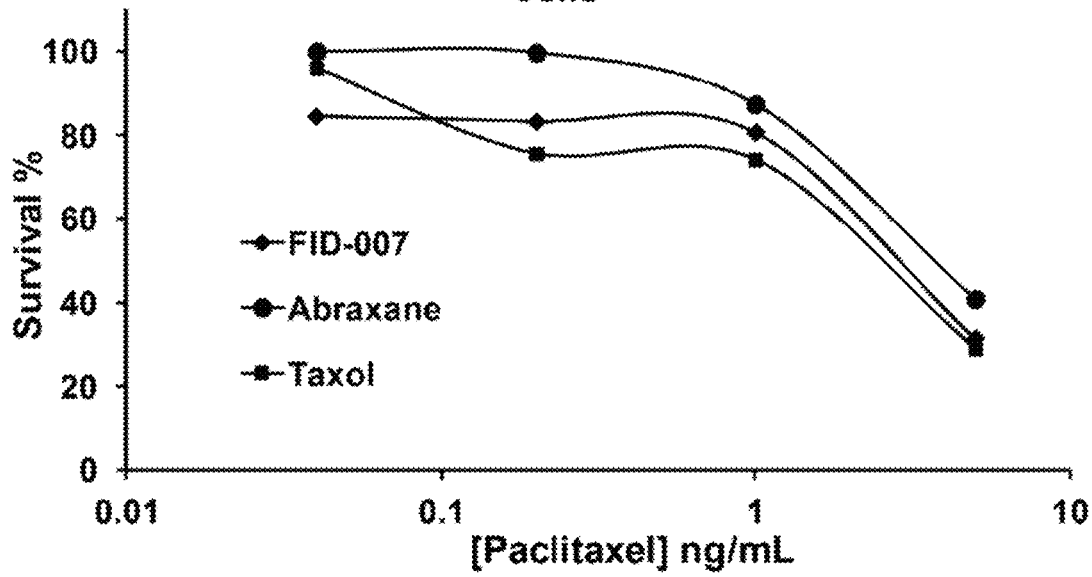
FIG. 16. Examples of representative results of MDA-MB-231 triple negative breast cancer cells cytotoxicity on exposure to three different taxane formulations.
Figure 17:
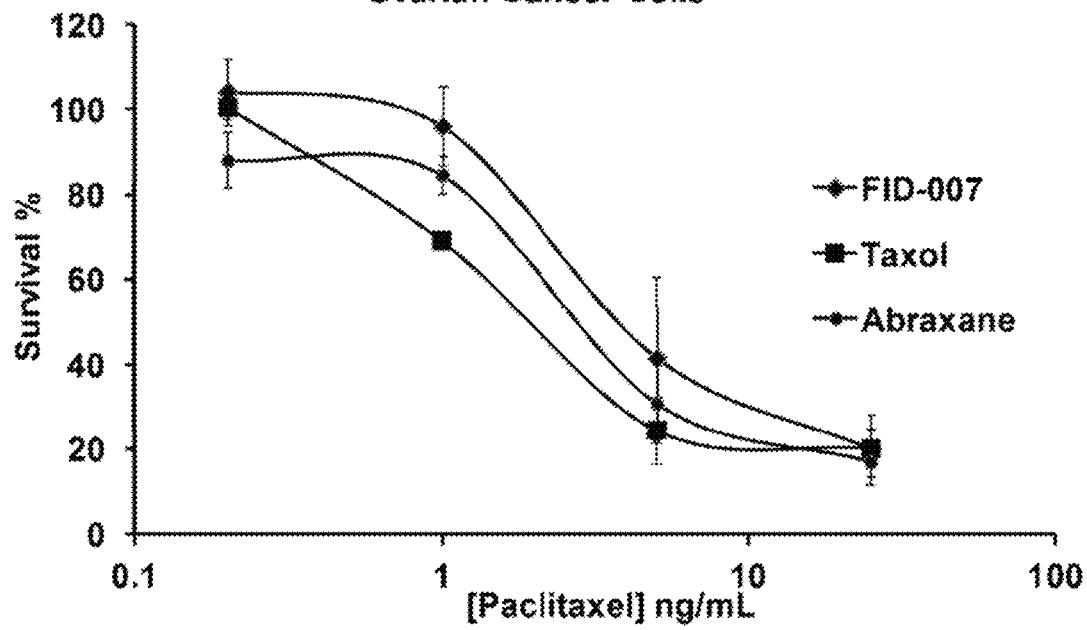
FIG. 17. Examples of representative results of OV-90 ovarian cancer cells cytotoxicity on exposure to three different taxane formulations.
Figure 18D:
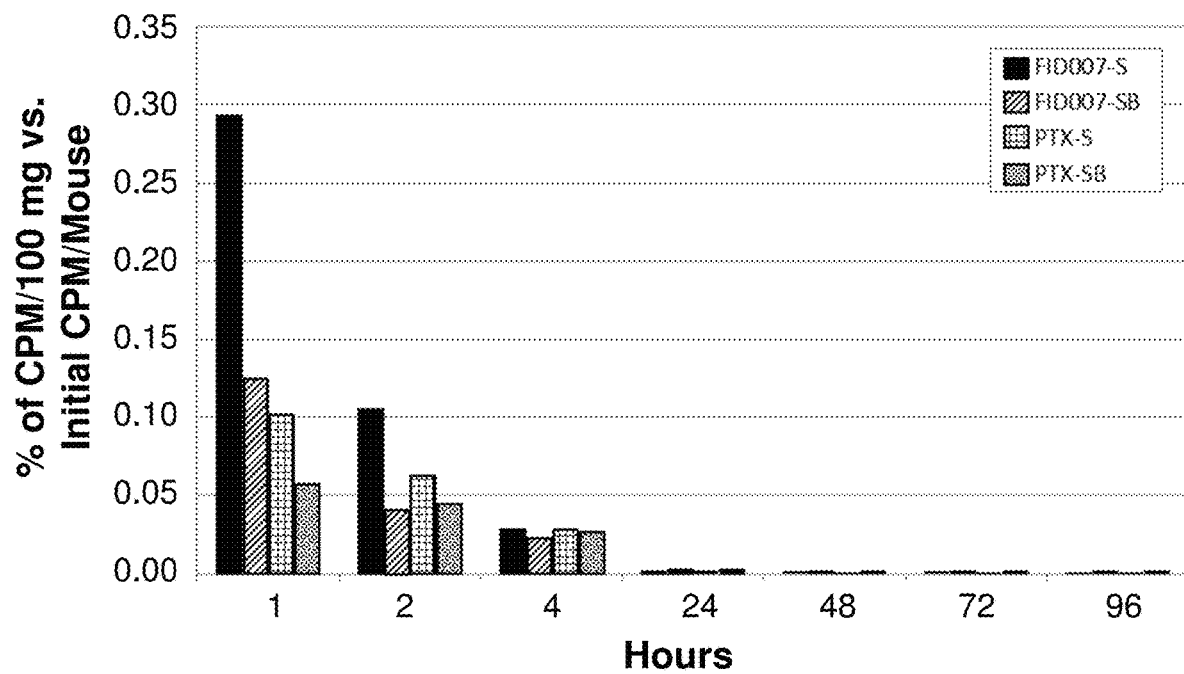

Applicants further discovered that a pharmaceutical composition as disclosed herein provides additional renal benefits to subjects administered with the pharmaceutical composition: more than 50% reduction in paclitaxel (PTX) accumulation in the kidney has been observed when a combination of taxane polymer-drug nanoaggregate and sodium bicarbonate (FID-007-SB) are injected to a subject as described herein compared to those without sodium bicarbonate (paclitaxel alone or paclitaxel with polymer FID-007), leading to reduced renal toxicity (See non-limiting Example "Kidney Toxicity" hereafter and FIG. 18D). The pharmaceutical composition comprising the taxane polymer-drug nanoaggregate and sodium bicarbonate further helps reducing chemotherapy drug induced renal toxicity significantly in mice. This is in addition to the previously discovered benefits that the pharmaceutical composition comprising the taxane polymer-drug nanoaggregate alone has low toxicity to non-cancer normal cells and high toxicity to cancer cells as shown in FIG. 14-FIG. 17.

Applicants even further discovered that the modified PEOX polymer, such as the ethylenediamine (EDA) or other amine modified PEOX, has a pH-dependent change in polymer zeta potential, polymer particle size, polymer charge, polymer charge density, or a combination thereof. Not wishing to be bound by any particular theory, applicants believe that a polymer having such characters, such as EDA modified PEOX polymer as disclosed herein, can provide a unique feature so that the polymer properties including polymer charge can change based on pH environment. As a consequence, the polymer-drug nanoaggregate produced in this invention, such as the polymer-paclitaxel nanoaggregate, may exit kidney easily leading to less renal toxicity when body pH is adjusted by a basic agent such as sodium bicarbonate. At the same time, balanced hydrophilicity and hydrophobicity of the polymer of this invention provides protection to the hydrophobic drug, such as paclitaxel, from degradation, in addition to increasing the drug bioavailability as mentioned herein.

Figure 18E:
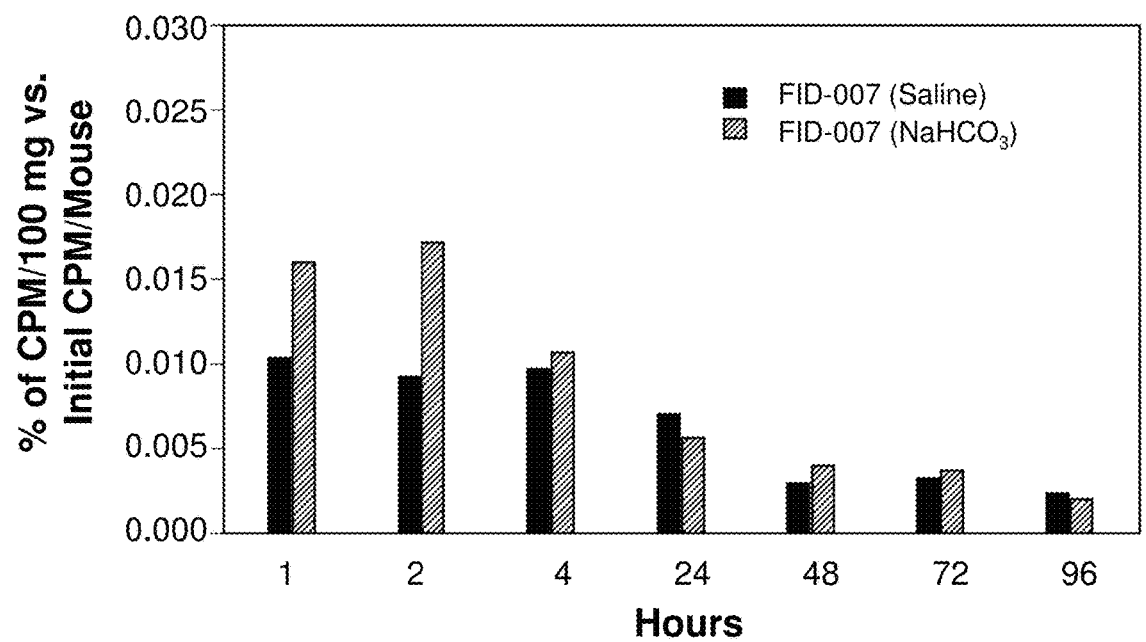

Applicants further unexpectedly discovered that a combination of taxane polymer-drug nanoaggregate and sodium bicarbonate as disclosed herein provides increased bioavailability of paclitaxel as evidenced in pharmacokinetics (PK profiles) showing significantly higher paclitaxel concentrations in earlier hours after administering (0-2 hours) (FIG. 18A) in addition to reduced renal toxicity described in this application. As comparisons, combinations with sodium bicarbonate have no detectable effects on pharmacokinetics of Abraxane and Taxol (FIG. 18B-FIG. 18C). Tissue distribution data showed that a combination of taxane polymer-drug nanoaggregate and sodium bicarbonate as disclosed herein had lowered accumulation in kidney a few hours after administration compared to paclitaxel (PTX) (FIG. 18D), while accumulation in a tumor had stayed higher for many hours (FIG. 18E). The prolonged accumulation of PTX in tumor cells is believed to increase the chance of tumor growth inhibition and may indicate a better potency of the taxane polymer-drug nanoaggregate FID-007 compare to PTX. These data demonstrate that the invention disclosed in this application having the combination of the polymer-drug nanoaggregate and sodium bicarbonate is distinct from what is known in the industry. Not wishing to be bound by a particular theory, applicants believe that the pharmaceutical composition of this invention has the properties as described above and hereafter so that the combination of the polymer-drug nanoaggregate and sodium bicarbonate provides enhanced drug stability, suitable polymer-drug particle size, optimized pH range for polymer charge, etc., that may contribute to the benefits at least in aspects such as water solubility of water insoluble drug, high filtration rating for easy manufacturing, reduced renal toxicity and increased bioavailability of the drug.

The instant disclosure now will be exemplified in the following non-limiting examples.

Examples

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Materials

Symmetrically branched PPI dendrimers were purchased from Sigma-Aldrich. Symmetrically branched PEI dendrimers and dendrigrafts were prepared according to procedures provided in U.S. Pat. Nos. 4,631,337, 5,773,527, 5,631,329 and 5,919,442. All antibodies were purchased from Sigma-Aldrich, Biodesign or Fitzgerald. Different generation PAMAM dendrimers were purchased from Dendritech, Inc.

Other modified branched polymers (MBPs) including symmetrically branched polymers (SBP) and asymmetrically branched polymers (ABP), polymer-IgG or other antibody conjugates, polymer modified with thio-groups, Maleimide-R-activated (MAL-R) antibody-polymer conjugates, and others, were prepared as described previously, see at least US Patent Publication Nos.: 2015/0366818, 2014/0314664, herein incorporated by reference.

Alkyl-Modified Random Asymmetrically Branched Poly(2-ethyloxazoline) (PEOX) with Primary Amine Chain End Group The synthesis of $CH_3-(CH_2)_{17}$-PEOX-ABP60 ($C_{18}$PEOXABP60 is an arbitrary name to denote the molar ratio of monomer to initiator in the initial reaction) is provided as a general procedure for the preparation of core shell structures. A mixture of $CH_3(CH_2)_{17}$—Br (5.61 g) in 500 ml of toluene was azeotroped to remove water with a distillation head under $N_2$ for about 15 min. 2-Ethyloxazoline (100 g) was added dropwise through an addition funnel and the mixture was allowed to reflux between 24 and 48 hours. On completion of the polymerization, 10.1 g of EDA were added to the reactive polymer solution to introduce the amine function group. The molar ratio of polyoxazoline reactive chain end to EDA was 1 to 10.

Alternatively, N-Boc-piperazine or water (e.g., with 1N $Na_2CO_3$) can be added to terminate the reaction. Morpholine or PEI also can be added to the reactive polymer solution to terminate the reaction. The crude product was re-dissolved in methanol and then precipitated from a large excess of diethyl ether. The bottom layer was re-dissolved in methanol and dried by rotary evaporation and vacuum to give an asymmetrically random branched PEOX polymer as a white solid.

Other asymmetrically randomly branched polymers, such as, poly(2-methyloxazoline), were prepared in a similar manner. All the products were analyzed by SEC (Size-Exclusion Chromatography) and NMR (Nuclear magnetic resonance).

Paclitaxel Formulation and Nanoparticle Preparation

As a general procedure, paclitaxel was dissolved in methanol to a concentration of up to 40 mg/mL. A $C_{18}$PEOXABP60 polymer was separately dissolved to a concentration of up to 100 mg/mL in methanol. The two solutions were then mixed at various volumes to result in final polymer to paclitaxel weight ratios in the mixtures ranging from 3:1 to 10:1. The mixtures subsequently were lyophilized for 20 to 96 hours depending on volume.

The size of the nanoaggregates as measured by light scattering ranged from about 70 nm to 100 nm in diameter before lyophilization.

Alternatively, both paclitaxel and the $C_{18}$PEOXABP60 polymer can be dissolved in a common solvent, such as, acetone, methanol, or ethanol and then dropwise added to water while being stirred or sonicated, followed by sterile filtration with a 0.22 μm filter. The final product then can be generated by lyophilization and the size of the nanoaggregates measured by light scattering (LS). $C_{18}$PEOXABP80 and $C_{18}$PEOXABP50 polymers were prepared in a similar manner.

The $C_{18}$PEOXABP60 polymer is water soluble and can be dissolved in water to produce at least a 12% solution (weight percent).

Other taxane-induced polymer-drug nanoaggregates or nanoparticles using various hydrophobically surface-modified branched polymers, such as, $C_4$, $C_6$, $C_{12}$ or $C_{22}$ hydrocarbon-modified randomly branched PEOX, PEI and PPI polymers; $C_4$, $C_6$, $C_{12}$, $C_{18}$ and $C_{22}$ hydrocarbon-modified PAMAM, PEI and PPI dendrimers and dendrigrafts; and $C_4$, $C_6$, $C_{12}$, $C_{18}$ and $C_{22}$ hydrocarbon-modified branched PLL/polymers can be prepared in a similar manner.

Nanoparticle with a 7:1 $C_{18}$PEOXABP60 Polymer:Paclitaxel Ratio $C_{18}$PEOXABP60 (700 mg) was dissolved in 9.33 mL of methanol to yield a 75 mg/mL solution. A 15 mg/mL solution of paclitaxel was also prepared by dissolving 100 mg in 6.67 mL of methanol. The two solutions were mixed for 20 minutes resulting in a solution containing 6.25 mg paclitaxel and 43.75 mg polymer per mL, providing a solution with a 7:1 polymer:drug ratio. The mixture was placed on a rotary evaporator and the methanol removed to dryness. The resultant solid was redissolved with stirring in 33.3 ml of water to a final paclitaxel concentration of 3 mg/mL. The solution preparation was passed through a 0.8 μm filter and then a 0.22 μm filter. The filtrate was lyophilized over a 24-72 hour period depending on the amount used. The vial was stoppered and the ready-to-use white powder was stored at room temperature. That preparation was designated as FID-007.

Nanoparticle Measurement

The size of various polymers, polymer-only nanoaggregates, as well as drug-induced polymer-drug nanoaggregates was measured by a dynamic light scattering (DLS) method using a Malvern Zetasizer Nano-ZS Zen3600 particle size analyzer (Malvern Panalytical Inc., Westborough, MA 01581, USA).

Particle Size and Filtration of Nanoaggregates

Particle sizes of polymers having different monomer to initiator molar ratios and polymer to drug weight ratios are shown in Table 1. The numeral in the polymer identifier indicates molar ratio of monomer to initiator used for making that polymer. Different molar ratios of ethyloxazoline monomer to initiator were used to make polymer, polyethyloxazoline (PEOX). $C_{18}$PEOXABP200 indicates a molar ratio of ethyloxazoline to initiator of 200:1, and $C_{18}$PEOXABP100 has a molar ratio of 100:1 (as provided in the cited reference, PCT Pub. No. WO 2012/094620).

$C_{18}$PEOXABP200, $C_{18}$PEOXABP100, $C_{18}$PEOXABP80, $C_{18}$PEOXABP60 and $C_{18}$PEOXABP50 polymers were prepared as described above and in PCT Pub. No. WO 2012/094620. The same initiator was used for all polymers. $C_{18}$ refers to a $C_{18}$ moiety located at a terminus of a polymer.

Two different weight ratios of polymer to drug were used to make the drug nanoaggregates, 5:1 and 7:1. Nanoaggregates were prepared as described above and the sizes were determined measured by light scattering (LS) described herein. Mean sizes (d, nm) and $D_{90}$ sizes obtained from light scattering measurements are shown in Table 1.

TABLE 1

Particle Sizes of Nanoaggregates.

| Polymer | Polymer/Drug Ratio | Nanoaggregate Size (d, nm) | $D_{90}$ |
|---|---|---|---|
| $C_{18}$PEOXABP200 (Comparative 1) | 5:1 | >200 | — |
| $C_{18}$PEOXABP100 (Comparative 2) | 5:1 | 159 | — |
| $C_{18}$PEOXABP100 (Comparative 3) | 7:1 | 120 | 209 |
| $C_{18}$PEOXABP80 (Example 1) | 7:1 | 94 | — |
| $C_{18}$PEOXABP60 (Example 2) | 7:1 | 99 | 173 |
| $C_{18}$PEOXABP50 (Example 3) | 7:1 | 89 | — |

As shown in Table 1, a polymer having monomer to initiator molar ratios of 100:1 or higher yields polymer-drug nanoaggregates over 100 nm in size (mean size). A polymer having monomer to initiator molar ratio of 80:1, 60:1 or produced polymer-drug nanoaggregates having a mean size of less than 100 nm.

$D_{90}$ value (also known as D(v,0.9)) is available from Malvern Zetasizer Nano-ZS Zen3600 particle size analyzer. $D_{90}$ represents the particle size (diameter) corresponding to 90% cumulative (from 0 to 100%) undersize particle size distribution. A specific $D_{90}$ value means that 90% of particle size distribution is below that value. $D_{90}$ values for polymer-drug aggregates prepared from $C_{18}$PEOXABP100 (Comparative) and $C_{18}$PEOXABP60 are shown in Table 1: 90% of aggregate from $C_{18}$PEOXABP100-drug (Comparative) having particle size less than 209 nm and 90% aggregate from $C_{18}$PEOXABP60-drug having particle size less than 173 nm.

Measurement of Filtration Rating

As required, for example, for testing with cell lines, for in vivo studies or for clinical injections, a drug nanoaggregate preparation was sterilized by passing the preparation through a 0.22 µm membrane filter. Polymer-drug nanoaggregates prepared above were measured for their filtration ratings $R_f$ according to the following procedure:

Each of the polymer-drug nanoaggregate samples was prepared and dissolved in water as described above to a same final concentration. A final paclitaxel concentration of 3 mg/mL was used for samples shown in Table 2.

A starting volume ($V_0$) of each sample was loaded into a sterile syringe. Then a single use, a 25 mm sterile 0.22 µm syringe filter assembly (available from Pall Corporation, Ann Arbor, MI, USA) was affixed to the syringe. A $V_0$ volume of 9 ml was used for each sample hereafter. For a 25 mm filter, starting volume is typically in a range of from 9 to 10 ml.

Each sample was then forced to pass through the 0.22 µm filter assembly by depressing the plunger of the syringe with a constant pressure until all sample volume passes through the filter or the plunger can no longer move forward under the same pressure.

Sample volume remaining in the syringe ($V_1$) was recorded. The passing volume ($V_p$) (also referred to as "filtered volume") was calculated based on the formula $V_p=V_0-V_1$. Alternatively, the sample that passed through the filter can be collected and $V_p$ can be determined by measuring the volume of the collected sample, i.e., filtered volume.

A filtration rating $R_f$ for each sample was calculated based on formula:

$$R_f = V_p/V_0$$

For polymer-drug nanoaggregates prepared from $C_{18}$PEOXABP60 and paclitaxel, all 9 ml passed through the filter, $V_p=9$, resulting in $R_f=100\%$ (or 9/9, i.e., 1.0).

For comparative polymer-drug aggregates prepared from $C_{18}$PEOXABP100 and paclitaxel, only about 4.4 ml passed through the filter with $V_p=4.4$, resulting in $R_f=48.9\%$ (or 4.4/9, i.e., 0.489). Data are shown in Table 2.

The data demonstrates that the monomer to initiator molar ratio and polymer to drug weight ratio have a direct impact on the ability of drug nanoaggregates to pass through a 0.22 µm membrane filter for producing sterile drug nanoaggregate preparations. The data represent multiple measurements with multiple samples.

TABLE 2

Filtration rating of polymer-drug nanoaggregates.

| | Example 4 | Comparative 4 |
|---|---|---|
| Polymer | $C_{18}$PEOXABP60 | $C_{18}$PEOXABP100 |
| Polymer: Drug Ratio | 7:1 | 7:1 |
| Filter Pore Size | 0.22 µm | 0.22 µm |
| Filtration rating ($R_f$) | 100% (9 ml of 9 ml) | 48% (4.4 ml of 9 ml) |

Activity Testing

Metabolism in viable cells produces, "reducing equivalents," such as, NADH or NADPH. Such reducing compounds pass electrons to an intermediate electron transfer reagent that can reduce the tetrazolium product, MTS (Promega), into an aqueous, soluble formazan product, which is colored. At death, cells rapidly lose the ability to reduce tetrazolium products. The production of the colored formazan product, therefore, is proportional to the number of viable cells in culture.

The CellTiter 96® Aqueous products (Promega) are MTS assays for determining the number of viable cells in culture. The MTS tetrazolium is similar to MTT tetrazolium, with the advantage that the formazan product of MTS reduction is soluble in cell culture medium and does not require use of a solubilization solution. A single reagent added directly to the assay wells at a recommended ratio of 20 µl reagent to 100 µl of culture medium was used. Cells were incubated 1-4 hours at 37° C. and then absorbance was measured at 490 nm.

Toxicity and Efficacy of Nanoencapsulated Paclitaxel/PEOXABP60 (FIB-007)

As previously described, nanoencapsulated paclitaxel was prepared using $C_{18}$PEOXABP60 polymer with a polymer to paclitaxel ratio of 7:1. That preparation, given the designation FID-007, was compared to Taxol and Abraxane in cytotoxicity studies with normal human dermal fibroblast cell lines and various cancer cell lines, and in in vivo studies of toxicity (maximum tolerated dose, MTD) and inhibition of tumor growth in three mouse xenograft models.

In Vitro Activity of FID-007

Figure 15:
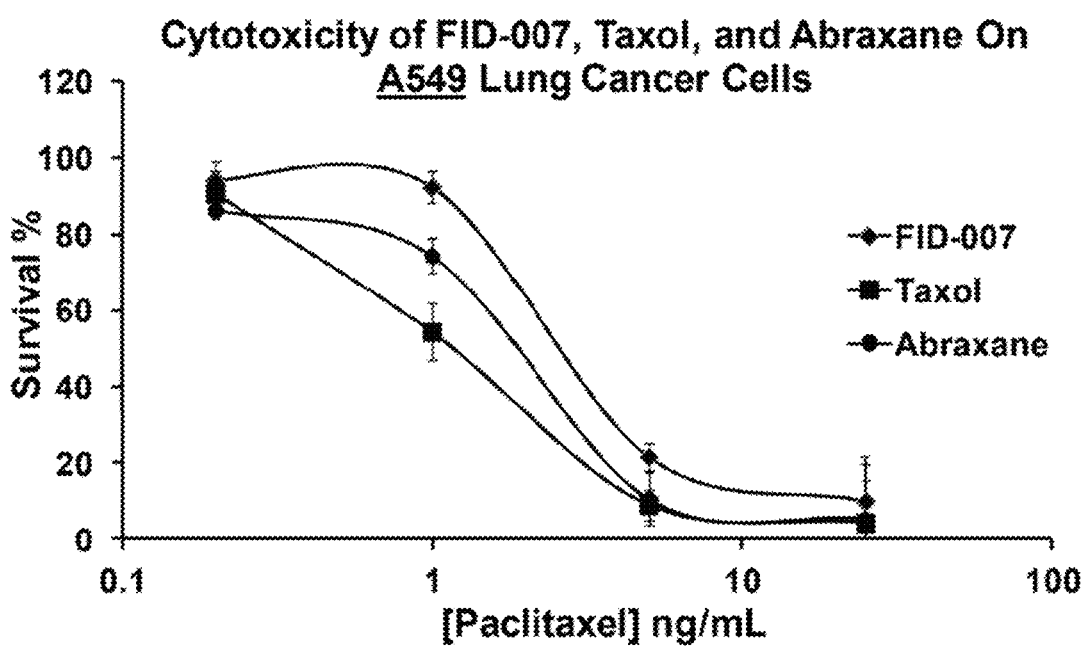
FIG. 15. Examples of representative results of A549 lung cancer cell cytotoxicity on exposure to three different taxane formulations.

FID-007 was tested with Taxol and Abraxane on normal human fibroblast cells and on various cancer cell lines in in vitro cytotoxicity experiments. While FID-007 inhibits the proliferation of a range of human cancer cell lines in vitro including lines originating from breast, ovarian and lung cancer cells, FID-007 exhibited lower toxicity to normal cells, similar to the levels observed with Taxol and Abraxane. Overall, FID-007 was 10 times less toxic to normal cells than to tumor cells, exhibiting a very high $EC_{50}$ greater than 100 µM (comparing FIG. 14 with FIG. 15-FIG. 17). FID-007 was active in a 72-h toxicity assay in human lung cancer cell line A549 with an $IC_{50}$ of 2.8 ng/mL (FIG. 15). FID-007 was cytotoxic to MDA-MB-231 (triple negative breast cancer cells) with an $IC_{50}$ of 4.9 ng/mL (FIG. 16). FID-007 was cytotoxic to OV-90 (ovarian cancer cells) with an $IC_{50}$ of 5.0 ng/mL (FIG. 17). With all three cancer cell lines, FID-007 cytotoxicity was comparable to that of Taxol and Abraxane.

In Vivo Activity of FID-007

A series of experiments was performed to determine in vivo tolerability, activity, and basic pharmacokinetics of FID-007 administered intravenously (I.V.) in mice, as compared to Taxol and Abraxane. FID-007 was well tolerated up to 150 mg/kg daily dosing. To confirm antineoplastic activity, FID-007 was administered via IV daily at well-tolerated, doses to mice in three different mouse xenograft models (including lung, ovarian and breast cancers). In general, FID-007 was better tolerated in mouse xenograft models than standard cytotoxic agents that have similar targets, such as Taxol and Abraxane, and selectively inhibited the growth of tumors.

The PK profiles of FID-007, Taxol and Abraxane in the presence and absence of sodium bicarbonate are shown in FIG. 18A-FIG. 18C. The PK profiles The PK profiles were obtained by injecting mice with following drugs: FID-007, Abraxane and Taxol with or without sodium bicarbonate. The CD-1 mice (male, 4-6 weeks) were obtained from Charles River (Charles River Laboratories International, Inc., Wilmington, MA, USA). Three formulations including Taxol, Abraxane, FID-007 were prepared by reconstituting each of the drugs using saline. A final concentration of 3 mg/mL was made for Taxol and Abraxane, and 5 mg/mL for FID-007. Then 20 mg/kg (90-100 µl) of Taxol or Abraxane, 20 mg/kg (50-60 µl) of FID-007 was administered to the mice via tail vein. Multiple blood samples were collected at time of 5 (0.08 h), 30 min (0.5 h), 1, 2, 4, 6, 8, 24 h following IV administration. For each time point, triplicate samples were performed (n=3). The blood samples were collected using a syringe with 21 G needle and a heparinized tube. The plasma was separated by centrifugation at 10,000 rpm for 5 min and transferred to a 1.5 ml centrifuge tube. Samples were stored at −80° C. until analysis. Concentrations of paclitaxel in mouse blood treated with FID-007 with sodium bicarbonate (FID-007-SB) were significantly (p<0.05) higher compared to the one without sodium bicarbonate (FID-007-S, in saline), especially within first 2 hours post administration (FIG. 18A, solid line and dashed line): 0.5 h, p=0.00075; 1 h, p=0.0071; and 2 h, p=0.0096 time points, respectively, as determined by t test. The increase of paclitaxel concentrations in vivo was at least 30% for FID-007 with sodium bicarbonate (FID-007-SB) compared to FID-007 without sodium bicarbonate (in saline only) (FID-007-S) (Table 3, % of Increase) 0.5 to 2 hours after administration.

TABLE 3

Increase in Paclitaxel plasma concentrations (ng/ml) in vivo.

| Time Point | FID-007-S | FID-007-SB | % of Increase | p Value |
|---|---|---|---|---|
| 0 | 0 | 0 | N/A | N/A |
| 0.08 (5 minutes) | 10,799 ± 159 | 12,209 ± 164 | 13.1% | p = 0.2 (Not significant) |
| 0.5 | 5,698 ± 42 | 9,417 ± 24 | 65.3% | p = 0.00075 |
| 1 | 4,211 ± 180 | 6,338 ± 481 | 50.5% | p = 0.0071 |
| 2 | 3,397 ± 36 | 4,446 ± 274 | 30.9% | p = 0.0096 |

N/A: Not applicable. p value less than 0.05 is considered statistically significant.

Paclitaxel concentrations were measured using HPLC as described before. All animals in the sodium bicarbonate groups received additional 3.2 g sodium bicarbonate (SB) per kg body weight (about 200 mM) per day at 24 hours and 1 hour prior to the drug administration. All drugs and sodium bicarbonate were administered to animals via intravenous (IV) injection through tail vein. Half-life of FID-007 in mice was determined using an optimized HPLC method to be approximately 9.3 hours in the absence of sodium bicarbonate. Liver and spleen, followed by blood were the organs with the highest concentration of FID-007 at 1 hour.

The single dose MTD of FID-007 was compared to that of Taxol and Abraxane in a study wherein various doses of the drugs were administered through the tail vein of healthy CD-1 mice and SCID (immune deficient) mice over the course of several weeks. Control mice were administered saline. The single dose MTD for Taxol, Abraxane, and FID-007 on CD-1 mice was found to be 20 mg/kg, 240 mg/kg, and 175 mg/kg, respectively. No major side effects were observed in all the mice that survived. However, weight gain was observed in all the treatment groups of Abraxane and FID-007 as compared to the control groups (treated with saline). Abraxane at 120 mg/kg and above caused a dose-dependent increase in weight. The same was observed with FID-007 at closes of 150 mg/kg and higher.

The multiple dose MTD of FID-007 was determined similarly by administering FID-007 (100 and 150 mg/kg) to healthy CD-1 and SCID mice (10 weeks, females) via the tail vein at day 0, day 3 and day 6. Animals were monitored twice per day and weighed every 3 days. The multiple dose MTD for FID-007 in CD-1 mice was determined to be 100 mg/kg and was 30 mg/kg in SCID mice with some side effects immediately after injection. The FID-007 multiple dose groups did not have excessive weight gain as compared to the control group.

The in vivo efficacy of FID-007 in inhibiting tumor growth was compared to that of Taxol and Abraxane in tumor xenograft mouse models of human lung, breast and ovarian cancer. Sixty female and male SCID mice (6-8 weeks, 20-26 g, Charles River, 40 female mice for breast and ovarian cancer, 20 male mice for lung cancer) were injected on each side of the torso (left and right) with mL of suspension of long A549, breast MDA-MB-231 or ovarian OV90 cells in serum-free medium. Cells were cultured previously in a humidified incubator (37° C., 5% $CO_2$, 95% air). Doses of $3 \times 10^6$ (A549), 107 (MDA-MB-231), and 6 (OV-90) cells were used per mouse tumor. The tumors were allowed to grow for 7 to 9 days before treatment started, and all tumor volume measurements were obtained using a digital caliper (VWR Inc.). The tumor volumes were calculated, by the formula $(W^2 \times L)/2$, where W is the maximum tumor width and L is the maximum tumor length. Tumor and body weight measurements were obtained on the same day prior to the first treatment, then every three days. Day 0 was designated as the first day of treatment. On day 0, the animals that developed tumors were divided randomly into live groups [about 4 mice (8 tumors) per group], with each treatment group representing a wide range of tumor sizes.

Abraxane (80 mg/kg), FID-007 (20 mg/kg), Taxol (20 mg/kg) and $C_{18}PEOXABP60$ polymer starting material, designated as NanoCarrier-001B, (20 mg/kg) were prepared fresh for each injection. Saline was used as a vehicle control. The drugs or saline were administered via IV through tail vein injection every three days. Drug doses were chosen to be equitoxic for all treatment groups based on the previously determined single and multiple dose MTD. Lung, breast and ovarian cancer groups each received a total of four injections. Injection volume for control, Abraxane and FID-007 was 0.1 mL per injection throughout the entire study. Due to the viscosity of the Taxol formulation, 0.2 mL per injection were administered for the 20 mg/kg dose. Average body weight and tumor volume measurements were calculated by averaging all the animals within the same group. The mice were euthanized with isoflurane 21 days from the last treatment for lung cancer and ovarian cancer, and 10 days for breast cancer. Blood and isolated serum, as well as tumor tissues and liver were collected and stored at −80° C.

The biodistribution and elimination of both FID-007 and paclitaxel drugs for each of the samples under either normal or alkaline physiological condition (saline or SB groups) were measured. The level of tritium paclitaxel ($^3$H-PTX) in each sample was measured as CPM (counts per minute), then normalized to percent CPM (% of CPM) to represent the $^3$H-PTX level in each sample per time point relative to the initial level of $^3$H-PTX that was administered to each individual animal. Tissue distribution data showed that a combination of taxane polymer-drug nanoaggregate and sodium bicarbonate as disclosed herein had lowered accumulation in kidney, about at least 50%, at least within 2 hours after administration compared to paclitaxel (PTX) (FIG. 18D), while accumulation in a lung tumor had stayed higher, about at least 30%, for at least within 2 hours (FIG. 18E).

Figure 19:
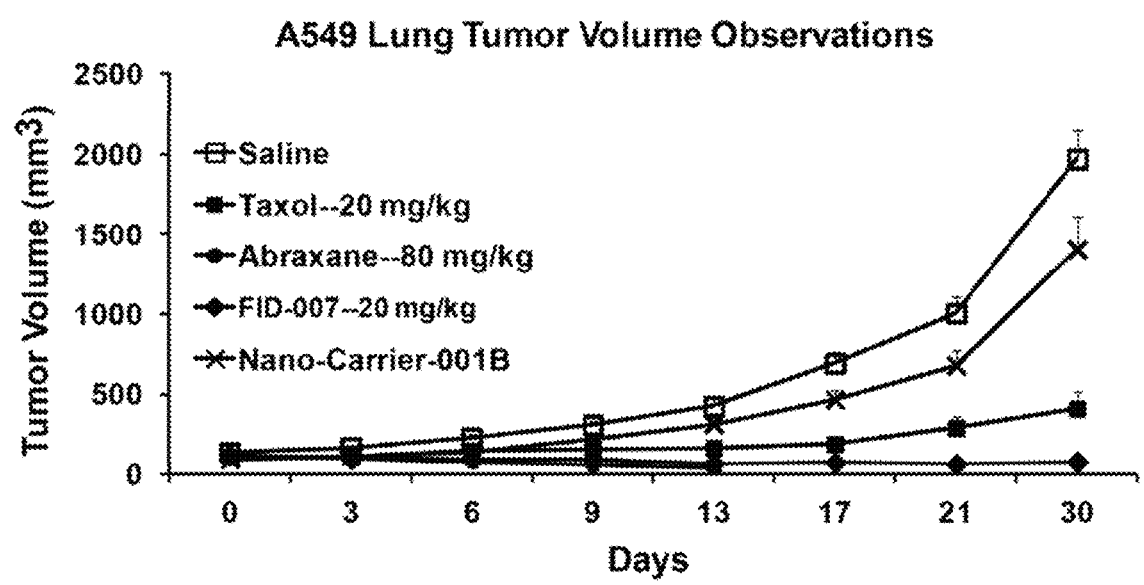
FIG. 19. Examples of A549 lung cancer tumor volume in a mouse xenograft model with two control treatments and exposure to three different taxane formulations.
Figure 20:
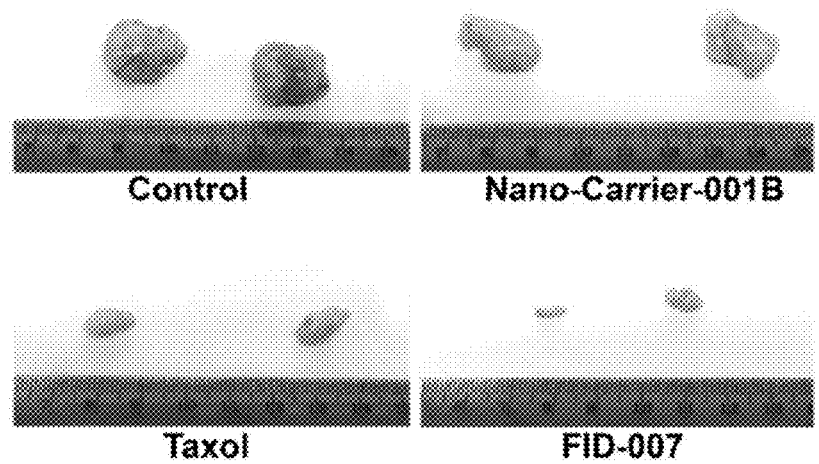
FIG. 20. Examples of images of excised lung cancer cell tumors grown as xenografts in a mouse and treatment of the mice with two controls and two forms of taxane.
Figure 21:
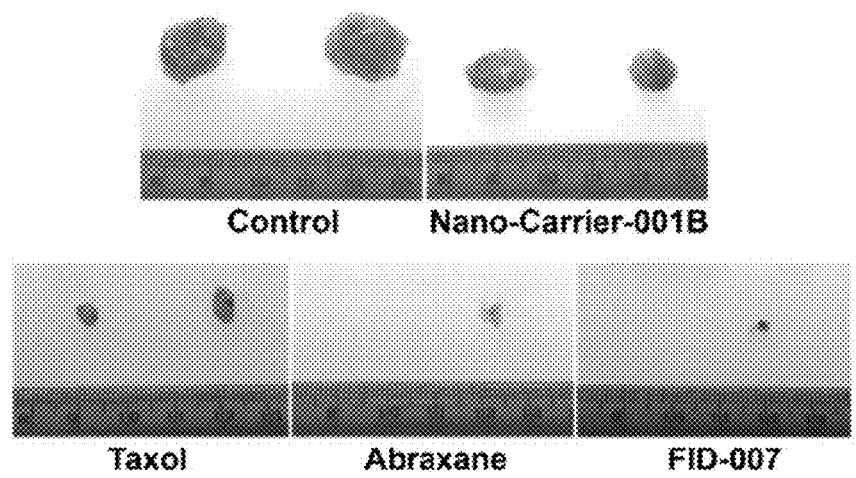
FIG. 21. Examples of images of excised ovary cancer cell tumors grown as xenografts in a mouse and treatment of the mice with two controls and three forms of taxane.

For the lung cancer (A549) xenograft group, overall, no deaths occurred in any of the treatment groups. Probably due to the toxicity of Taxol, heavy breathing and inactivity were observed in the first 30 minutes post treatment in a couple of mice. Average body weight and tumor volume measurements were calculated by averaging all the animals within the same group. The overall average body weight gains for saline control, Taxol, FID-007 and Nano vehicle control (NanoCarrier-001B) were 6.05%, 5.87%, 6.38% and 12.3%, respectively. However, all mice in the Abraxane group developed bad neurotoxicity and lost >20% weight. Those mice were sacrificed at 13 days. Tumor volumes increased by 1827 mm$^3$ for the saline control group and 1311 mm$^3$ for the NanoCarrier-001B vehicle control group, and by 305.8 mm$^3$ for the Taxol group. However, FID-007 groups had a reduction in tumor volumes by 39.7 mm$^3$ (FIG. 19). FIG. 20 and FIG. 21 show representative images of tumors of the corresponding treatment groups.

Figure 22:
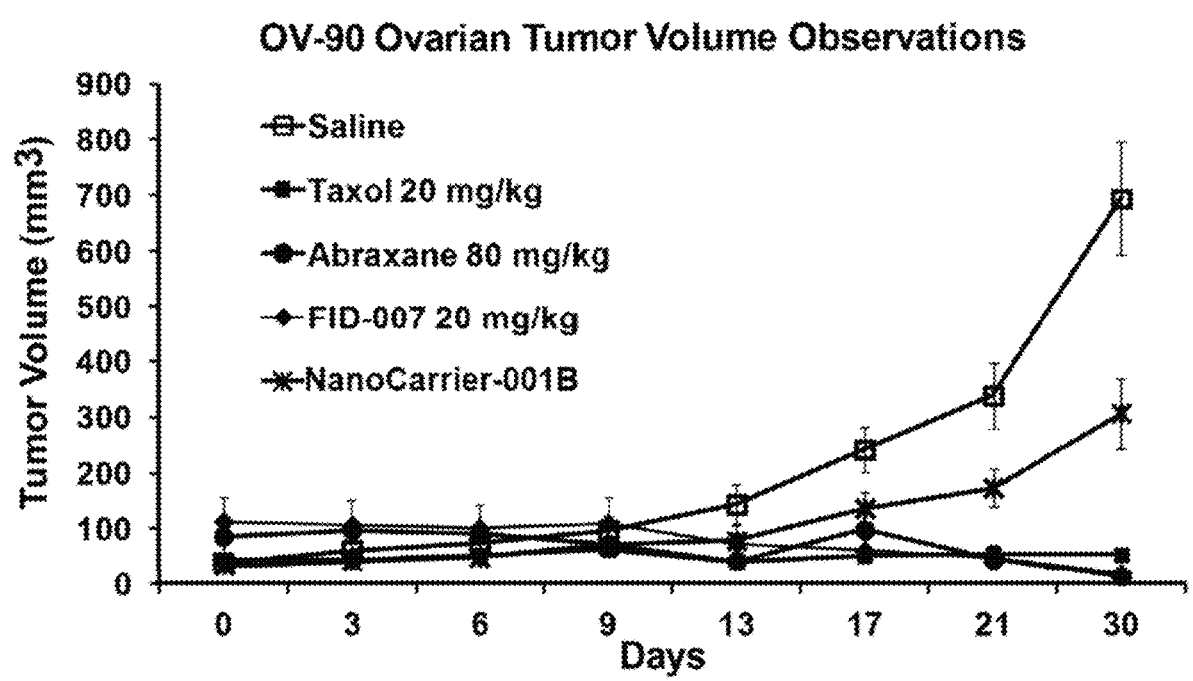
FIG. 22. Examples of the impact of two negative controls and three formulations of taxane on ovarian cancer tumor size in a mouse xenograft model.

For the breast cancer (MDA-MB-231) xenograft group, no deaths occurred in any of the treatment groups. Possibly due to the toxicity of Taxol, heavy breathing and inactivity were observed in the first 30 minutes post treatment. In the Abraxane group, all mice showed side effects of weak hind legs and 20% body weight loss after three treatments, leading to a decision to stop the 4th treatment for that group. Average body weight and tumor volume measurements were calculated by averaging all the animals within the same group. The overall average body weight gains for saline, Taxol, FID-007 and NanoCarrier-001B were 3.76%. 0.46%, 1.8%, and 4.2%, respectively. For the Abraxane group, average body weight drop was 7.66%. Tumor volumes increased by 328.6 mm$^3$ and 458.8 mm$^3$ in the saline and NanoCarrier-001B groups, respectively. In the FID-007, Taxol and Abraxane groups, tumor volumes decreased by 108.7 mm$^3$, 75.5 mm$^3$ and 70.2 mm$^3$, respectively. Tumor volume observations are shown in FIG. 22.

For the ovarian cancer (OV-90) xenograft group, the Taxol treatment group showed some toxicity with heavy breathing and inactivity observed in the first 30 minutes post treatment in two mice. The average body weight gain was 3.23%, 17.1%, 13.5%, 15.4% and 2.24% in the saline control, Taxol, Abraxane, FID-007 and NanoCarrier-001B control groups, respectively. Tumor volumes increased by 652.7 mm$^3$, 271.9 mm$^3$ and 9.1 mm$^3$ in saline control, NanoCarrier-001B control and Taxol groups, respectively, while there was a decrease in tumor volume in the FID-007 groups by 93.1 mm$^3$ and in the Abraxane group (80 mg/kg) by 72.4 mm$^3$ (FIG. 22).

FID-007 demonstrated in vitro cytotoxicity to lung, breast and ovarian cell lines similar to the established antineoplastic drugs Taxol and Abraxane while maintaining a low level of toxicity to normal cells. The in vivo efficacy of FID-007 in inhibiting tumor growth and reducing tumor mass was as good as or significantly better than the two approved drugs in mouse xenograft models of human lung, breast, and ovarian cancers.

Paclitaxel-Polymer Nanoaggregate and Sodium Bicarbonate

FID-007 itself is a white lyophilized powder. To produce the pharmaceutical composition of this invention, FID-007 was reconstituted with a saline diluent (0.9% Sodium Chloride Injection, USP) containing 0.15% of sodium bicarbonate (USP) to form FID-007-SB. FID-007-SB was packaged into bottles with each bottle contains 50 mg of paclitaxel, without over fill. The final reconstituted formulation will contain 4 mg/mL paclitaxel. The pH value for FID-007-SB was about 8.16-8.73.

Kidney Toxicity

Seven CD-1 mice (two females and five males, about 2-month-old, weight 30-37 g) were used in this 4-day study. Two females were assigned for 2-day time point and two males for 3-day and 4-day respectively. The single remaining male was used as control. Animals were randomly assigned to FID-007 (without sodium bicarbonate) or FID-007-SB (sodium bicarbonate) treatment group with one animal per time point. All animals in the FID-007-SB group also received additional 3.2 g sodium bicarbonate (SB) per kg body weight (about 200 mM) per day at 24 hours and 1 hour prior to the FID-007 treatment, followed by once every 24 hours post the FID-007 administration until the day of sacrifice (no SB treatment on sacrificing day). All FID-007, FID-007-SB and sodium bicarbonate were administered to animals via intravenous (IV) injection through tail vein.

Dosing was done on day 0 with 20 mg/kg equivalent Paclitaxel. Sample collection was scheduled on day 2, 3 and 4 after the treatment. Mice were euthanized with isoflurane on the day of sacrifice. Kidney was dissected free of connective and adipose tissues, then sectioned through the frontal plane of the body and washed in PBS thoroughly before fixing in formalin.

Collected kidney samples were fixed in 10% buffered formalin for 8-24 hours then processed properly before the paraffin embedding. Paraffin blocks were sectioned into 2 μm and Hematoxylin & Eosin staining was performed. In this short term 4-day study, mice received FID-007 with co-treatment of the sodium bicarbonate showed evident reduced toxicity to kidney cells compared to mice without co-treated with SB, especially on day 3 and day 4 post the drug treatment.

Accumulation of $^3$H-paclitaxel in kidney was also measured. SCID mice were divided into 3 treatment groups and administered following drugs: (a) paclitaxel in saline, (b) FID-007 and (c) FID-007-SB with $^3$H-paclitaxel used in preparing each of the drugs. At the first hour post administration, mice in FID-007-SB group showed 57% reduction in the accumulation of $^3$H-paclitaxel in kidney compared to paclitaxel in saline and FID-007 groups in saline without sodium bicarbonate. At the second hour post administration, mice in FID-007-SB group showed 62.5% reduction in the accumulation of $^3$H-paclitaxel in kidney compared to FID-007 group without sodium bicarbonate. The reduction was consistent throughout the 4-day (96 hour) post administration period tested.

These data indicate that FID-007 with sodium bicarbonate (FID-007-SB) can reduce kidney accumulation of the drug and can provide benefits in minimizing renal toxicity.

Paclitaxel Stability Assay

Stability of the pharmaceutical composition nanoaggregates FID-007-SB was measured for 0-147 hours at RT in 0.12% sodium bicarbonate. Paclitaxel degradation products Baccatin III, 10-Deacetyl Paclitaxel, 7-Epi Paclitaxel were measured with HPLC. Data are shown in Table 4. Contrary to common knowledge as published previously, paclitaxel nanoaggregates formed from paclitaxel and $C_{18}$PEOXABP60 polymer were stable in alkaline conditions at about pH 8.16-8.73 in sodium bicarbonate solution.

Comparison data for paclitaxel in sodium bicarbonate solution without the $C_{18}$PEOXABP60 polymer is not available due to insolubility of paclitaxel in water.

TABLE 4

Stability of Paclitaxel at alkaline pH at room temperature.

| Time in 0.12% SBC in Full saline | Paclitaxel (mg/mL) | Baccatin III (mg/mL) | 10-Deacetyl Paclitaxel (mg/mL) | 7-Epi Paclitaxel (mg/mL) |
|---|---|---|---|---|
| 0 hr | 0.532 | 0.001 | 0.003 | 0.011 |
| 147 hr | 0.528 | 0.002 | 0.003 | 0.016 |

Polymer Nanoaggregate Size

Figure 23:
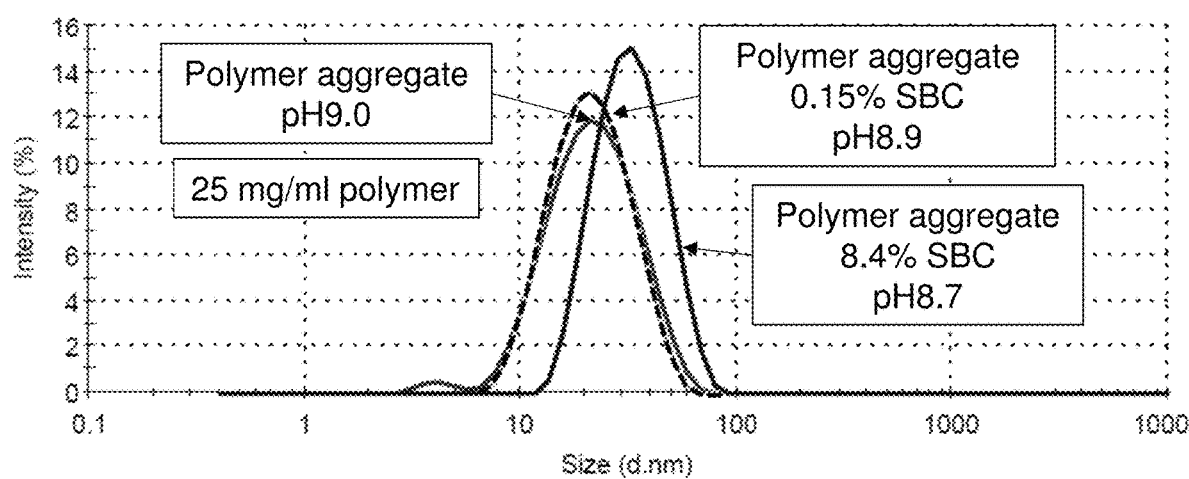
FIG. 23. Examples of polymer nanoaggregate sizes at different pH values with 25 mg/ml polymer as measured with light scattering (LS).

Sizes of polymer nanoaggreagtes were measured by a dynamic light scattering (DLS) method using a Malvern Zetasizer Nano-ZS Zen3600 particle size analyzer. Polymer $C_{18}$PEOXABP60 was dissolved in saline (0.9% sodium chloride), 0.15% sodium bicarbonate in saline (0.15% SBC) and 8.4% sodium bicarbonate in saline (8.4% SBC) at a polymer concentration of 25 mg/ml (FIG. 23). See Table 5 below. Saline alone had a measured pH 5.1. Saline with 0.15% sodium bicarbonate without polymer had a measured pH 8.4. Saline with 8.4% sodium bicarbonate without polymer had a measured pH 8.2.

TABLE 5

Polymer Solutions and pH Values.

| Polymer | Polymer Concentration | Sodium Chloride | Sodium Bicarbonate | pH |
|---|---|---|---|---|
| $C_{18}$PEOXABP60 | 25.0 mg/ml | 0.9% | — | 9.0 |
| $C_{18}$PEOXABP60 | 25.0 mg/ml | 0.9% | 0.15% | 8.9 |
| $C_{18}$PEOXABP60 | 25.0 mg/ml | 0.9% | 8.4% | 8.7 |
| $C_{18}$PEOXABP60 | 2.5 mg/ml | 0.9% | — | 9.0 |

TABLE 5-continued

Polymer Solutions and pH Values.

| Polymer | Polymer Concentration | Sodium Chloride | Sodium Bicarbonate | pH |
|---|---|---|---|---|
| $C_{18}$PEOXABP60 | 2.5 mg/ml | 0.9% | 0.15% | 8.9 |
| $C_{18}$PEOXABP60 | 2.5 mg/ml | 0.9% | 8.4% | 8.7 |

LS measurement data are shown in FIG. 23. In the absence of sodium bicarbonate, polymer solutions had a pH9 with polymer concentrations of 25 mg/ml in saline. In the presence of sodium bicarbonate and at pH8.7, polymer aggregate sizes changed significantly.

When polymer was dissolved in a PBS buffer to have a pH 7.45, no size difference in polymer aggregates was observed in the presence or absence of sodium bicarbonate.

Treatment Responses in Cancer Patients

Five hundred mL of sterilized water was mixed with one prefilled syringe of 8.4% sodium bicarbonate (1 mEq/mL) to form an aqueous basic solution. Patients with various solid tumors were selected for treatment using a standard 3+3 dose escalation design. Each patient was administered with the aqueous basic solution prepared above over one hour before the infusion of the pharmaceutical composition and again immediately thereafter. The pharmaceutical composition containing the Paclitaxel-Polymer Nanoaggregate and Sodium Bicarbonate was prepared as described above and administered to each patent via intravenous (IV) injection at a paclitaxel dosage of from 15 mg/m$^2$ to 125 mg/m$^2$ on Days 1, 8, and 15 of a 28-day cycle. Twenty-five patients were treated across 6 dose levels. There were no treatment discontinuations due to toxicity. Twenty-two patients were evaluable for response by RECIST 1.1 with a PR rate of 14% (PR in pancreatic, biliary tract and non-small cell lung cancer) and disease control rate of 59%. PK is linear and dose proportional. There is no paclitaxel accumulation after weekly dosing, and the t½ is between 18-26 hours. Four patients had stable disease (SD) at a paclitaxel dosage of 15 to 60 mg/m$^2$. More than ten patients had stable disease (SD) or partial response (PR) at a paclitaxel dosage of 80 to 125 mg/m$^2$. Patients having following solid cancers received treatments: Adrenal Gland Cancer, Ampullary carcinoma, Breast Cancer, Cholangio-carcinoma (Cholangiocarcinoma), HNSCC, Nasopharyngeal Carcinoma, NSCLC, Oral Adenoid Cystic Carcinoma, Pancreatic cancer, Sinonasal SCC. Preliminary evidence of anti-tumor activity was observed in heavily pre-treated patients across different tumor types. As used herein: SD (Stable Disease), neither sufficient tumor shrinkage nor sufficient increase as referenced to the smallest sum LD (sum of the longest diameter) since the treatment started; PR (Partial Response), at least a 30% decrease in the sum of the LD of the tumor as referenced to the baseline sum LD.

Additional Numbered Embodiments

1. A method for delivering one or more bioactive agents to a subject in need thereof, the method comprising:
   forming a nanoaggregate comprising a polymer that has a pH-dependent change in polymer zeta potential, polymer particle size, polymer charge, polymer charge density, or a combination thereof, and at least one bioactive agent that is water insoluble or poorly water soluble prior to forming the nanoaggregate; and delivering the nanoaggregate to the subject.

2. The method of embodiment 1 further comprising the step of configuring the nanoaggregate to have a pH value in a range of from about 7.1 to about 10.
3. The method of any one of embodiments 1-2 further comprising administering an aqueous basic solution, an oral basic agent, or a combination thereof, to the subject and, wherein the aqueous basic solution comprises in a range of from 0.01% to 10% of sodium bicarbonate, percentage based on the total weight of the aqueous basic solution, and has a pH value in a range of from 7.1 to 10.0, the aqueous basic solution or the oral basic agent is administered to the subject prior, during, after delivering the nanoaggregate or a combination thereof.
4. The method of any one of embodiments 1-3, wherein the polymer is water soluble and comprises at least one first terminal group modified with a hydrophobic moiety and a second terminal group modified with a hydrophilic moiety.
5. The method of any one of embodiments 1-5, wherein the polymer comprises a polyethyleneimine (PEI), polypropyleneimine (PPI), polyamidoamine (PAMAM), polyoxazoline (PDX), or a combination thereof.
6. The method of embodiment 5, wherein the polyoxazoline comprises a poly(2-oxazoline), a poly(2-substituted oxazoline) or a combination thereof, wherein the poly(2-substituted oxazoline) comprises poly(2-methyloxazoline), poly(2-ethyloxazoline), poly(2-propyloxazoline), poly(2-butyloxazoline), or a combination thereof, and the second terminal group is modified with ethylenediamine (EDA) or a derivative of ethylenediamine.
7. Use of a salt component, a nanoaggregate, and optionally a pharmaceutical suitable carrier, for manufacturing a medicament for the treatment of a cancer, wherein the salt component comprises sodium bicarbonate, the nanoaggregate comprises a polymer and at least one bioactive agent and wherein the polymer and the at least one bioactive agent are mixed in an aqueous solution to form the nanoaggregate; and
wherein the polymer is water soluble and comprises at least one first terminal group modified with a hydrophobic moiety and a second terminal group modified with a hydrophilic moiety;
wherein the bioactive agent is water insoluble or poorly water soluble prior to forming the nanoaggregate; and
wherein the medicament has a pH value in a range of from about 7.1 to about 10.0.
8. According to embodiment 7, wherein the medicament has a pH in a range of from 7.6 to 10.0.
9. According to any one of embodiments 7-8, wherein the cancer is one or more breast cancers, ovarian cancers, lung cancers, NSCLC (Non-Small Cell Lung Cancer), colon cancers, gastric cancers, melanoma, head and neck cancers, pancreatic cancers, one or more metastatic cancers derived therefrom or a combination thereof.
10. According to any one of embodiments 7-9, wherein the polymer comprises a linear polymer, a branched polymer, a symmetrically branched polymer, an asymmetrically branched polymer, a dendrimer, a dendrigraft polymer, a comb-branched polymer, a star-branched polymer, or a combination thereof, wherein the first terminal group comprises hydrophobic moiety comprising saturated or unsaturated aliphatic hydrocarbon having 1 to about 22 carbons, an aromatic hydrocarbon, or a combination thereof, and the second terminal group comprises a group modified by an amine, amide, imine, imide, carboxyl, hydroxyl, ester, acetate, phosphate, or a combination thereof.
11. According to any one of embodiments 7-10, wherein the second terminal group comprises a group modified by an ammonia, a derivative of ammonia, an ethylenediamine (EDA), a derivative of ethylenediamine, a piperazine, a derivative of piperazine, tris(2 aminoethyl)amine, 4-(aminomethyl)piperidine, 1,3-diaminopropane, 2,2'-(ethylenedioxy)bis(ethylamine), diethylenetriamine, 1,4,7,10-tetraazacyclododecane, hexamethylenediamine, triethylenetetramine, 1,8-diaminooctane, or a combination thereof.
12. According to any one of embodiments 7-11, wherein the polymer comprises a polyoxazoline (PDX) that comprises a linear portion, a branched portion, or a combination thereof.
13. According to embodiment 12, wherein the polyoxazoline comprises poly(2-oxazoline), poly(2-substituted oxazoline) or a combination thereof, wherein the poly(2-substituted oxazoline) comprises poly(2-methyloxazoline), poly(2-ethyloxazoline), poly(2-propyloxazoline), poly(2-butyloxazoline), or a combination thereof.
14. According to embodiment 13, wherein the polyoxazoline comprises a molar ratio of monomer to initiator in a range of from 50:1 to 80:1.
15. According to any one of embodiments 7-14, wherein the at least one bioactive agent is a taxane selected from paclitaxel, docetaxel, cabazitaxel, larotaxel, milataxel, ortataxel, tesetaxel, or a combination thereof.

What is claimed is:
1. A pharmaceutical composition comprising:
a salt component comprising sodium bicarbonate;
a nanoaggregate comprising a polymer and at least one bioactive agent, wherein said at least one bioactive agent is a taxane, wherein said salt component and said nanoaggregate are mixed in an aqueous solution; and
optionally a pharmaceutical suitable carrier;
wherein said polymer is water soluble and comprises at least one first terminal group modified with a hydrophobic moiety and a second terminal group modified with a hydrophilic moiety, wherein said polymer comprises a polyoxazoline (POX) that comprises a linear portion, a branched portion, or a combination thereof, wherein said polyoxazoline comprises poly(2-oxazoline), poly(2-substituted oxazoline) or a combination thereof, wherein said poly(2-substituted oxazoline) comprises poly(2-methyloxazoline), poly(2-ethyloxazoline), poly(2-propyloxazoline), poly(2-butyloxazoline), or a combination thereof;
wherein said bioactive agent is water insoluble or poorly water soluble prior to forming said nanoaggregate; and
wherein said pharmaceutical composition has a pH value in a range of from 7.8 to 10.
2. The pharmaceutical composition of claim 1, wherein said polymer has a pH-dependent change in polymer zeta potential, polymer particle size, polymer charge, polymer charge density, or a combination thereof.
3. The pharmaceutical composition of claim 1, wherein said polyoxazoline comprises a molar ratio of monomer to initiator in a range of from 50:1 to 80:1.
4. The pharmaceutical composition of claim 1, wherein said at least one bioactive agent is a natural or synthetic small molecule-based drug, inorganic-based drug, biological drug, natural or synthetic large molecule-based drug, modifications and/or derivatives thereof, or a combination thereof.

5. The pharmaceutical composition of claim 1, wherein said taxane is selected from paclitaxel, docetaxel, cabazitaxel, larotaxel, milataxel, ortataxel, tesetaxel, or a combination thereof.

6. The pharmaceutical composition of claim 1, wherein said pharmaceutical composition comprises two or more bioactive agents and wherein at least one of said two or more bioactive agents is water insoluble or poorly water soluble.

7. The pharmaceutical composition of claim 6, wherein said pharmaceutical composition comprises a taxane and one or more additional bioactive agents selected from gemcitabine, rapamycin, temozolomide, platinum-based antineoplastic agent, daunorubicin, doxorubicin, epirubicin, mitomycin, methotrexate, fluorouracil, carboplatin, carmustine, methyl-CCNU, cisplatin, vinorelbine, capecitabine, or a combination thereof.

8. The pharmaceutical composition of claim 1, wherein said nanoaggregate is of a size in a range of from about 50 nm to about 100 nm before lyophilization.

9. The pharmaceutical composition of claim 1, wherein said nanoaggregate has a weight ratio of said polymer to said bioactive agent in a range of from about 2:1 to about 20:1.

10. The pharmaceutical composition of claim 1, wherein said nanoaggregate has a weight ratio of said polymer to said bioactive agent in a range of from about 5:1 to about 8:1.

11. The pharmaceutical composition of claim 1, wherein said nanoaggregate further comprises a targeting moiety comprises an antibody, an antigen-binding portion thereof, an antigen, a cell receptor, a cell receptor ligand, a ligand for a cellular protein, a ligand for a membrane protein, a small molecule ligand, a lectin ligand, or a combination thereof.

12. The pharmaceutical composition of claim 1, wherein said nanoaggregate is free from human serum albumin, organic solvent, detergent, oil, or free acid.

13. The pharmaceutical composition of claim 1, wherein said pharmaceutical composition is free from human serum albumin, organic solvent, detergent, oil, or free acid.

14. The pharmaceutical composition of claim 1, wherein said nanoaggregate has a filtration rating through a 0.22 pm filter in a range of from 50 to 100 percent.

15. The pharmaceutical composition of claim 1, wherein said salt component consists of sodium bicarbonate.

16. The pharmaceutical composition of claim 15, wherein said pharmaceutical composition comprises in a range of from 0.01% to 10% of sodium bicarbonate, percentage based on the total weight of the pharmaceutical composition.

17. The pharmaceutical composition of claim 1, further comprising an additional taxane that is formulated free from said polymer.

18. The pharmaceutical composition of claim 1, wherein said pharmaceutical composition is a cancer treatment drug for treating one or more cancers.

19. The pharmaceutical composition of claim 18, wherein said one or more cancers are one or more breast cancers, ovarian cancers, lung cancers, NSCLC (Non-Small Cell Lung Cancer), colon cancers, gastric cancers, melanoma, head and neck cancers, pancreatic cancers, one or more metastatic cancers derived therefrom, or a combination thereof.

20. The pharmaceutical composition of claim 1, wherein said pharmaceutical composition provides at least 30% increase in plasma concentrations of said bioactive agent in vivo within 2-4 hours after administration of said pharmaceutical composition compared to that of a control pharmaceutical composition comprising said bioactive agent without sodium bicarbonate in vivo.

21. The pharmaceutical composition of claim 1,
wherein said pharmaceutical composition comprises in a range of from 0.01% to 10% of sodium bicarbonate, percentage based on the total weight of the pharmaceutical composition;
wherein said polymer comprises poly(2-oxazoline), poly (2-substituted oxazoline), or a combination thereof, wherein said poly(2-substituted oxazoline) comprises poly(2-methyloxazoline), poly(2-ethyloxazoline), poly (2-propyloxazoline), poly(2-butyloxazoline), or a combination thereof; and
wherein said at least one bioactive agent is a taxane selected from paclitaxel, docetaxel, cabazitaxel, larotaxel, milataxel, ortataxel, tesetaxel, or a combination thereof.

22. The pharmaceutical composition of claim 1,
wherein said pharmaceutical composition comprises in a range of from 0.01% to 10% of sodium bicarbonate, percentage based on the total weight of the pharmaceutical composition;
wherein said polymer comprises poly(2-ethyloxazoline); and
wherein said at least one bioactive agent comprises paclitaxel.

23. The pharmaceutical composition of claim 22, wherein the poly(2-ethyloxazoline) comprises the hydrophobic moiety that comprises a hydrocarbon comprising 18 carbons.

24. The pharmaceutical composition of claim 23, wherein the poly(2-ethyloxazoline) comprises a second terminal group modified with a hydrophilic moiety comprising a functional group modified by an ethylenediamine (EDA), or an EDA derivative, at a ratio of said second terminal group to EDA of 1:10.

25. The pharmaceutical composition of claim 3, wherein the polyoxazoline comprises a second terminal group modified with a hydrophilic moiety comprising a functional group modified by an ethylenediamine (EDA), or an EDA derivative, at a ratio of said second terminal group to EDA of 1:10.

26. The pharmaceutical composition of claim 1, wherein said pharmaceutical composition is free from surfactant, long chain fatty acids, lipids, polyphosphate, or a combination thereof.

27. The pharmaceutical composition of claim 1, wherein said pharmaceutical composition provides for a reduced kidney accumulation of about 62.5% of the at least one bioactive agent compared to a comparable pharmaceutical composition without sodium bicarbonate when administered to a subject intravenously.

28. The pharmaceutical composition of claim 5, wherein said pharmaceutical composition has a pH value in a range of from about 8.16 to 8.73, and wherein said pharmaceutical composition comprises less than 4% of paclitaxel degradation products after storage at said pH of 8.16 to 8.73 at room temperature for 147 hours.

29. The pharmaceutical composition of claim 1, wherein said pharmaceutical composition has a pH value in a range of from 7.9 to 10.

* * * * *